US011990007B2

(12) United States Patent
Marks et al.

(10) Patent No.: US 11,990,007 B2
(45) Date of Patent: May 21, 2024

(54) SYSTEM AND METHOD OF PROVIDING A HOLD AND SPIN FEATURE GAME WITH PROGRESSIVE PLAY METERS

(71) Applicant: Aristocrat Technologies, Inc., Las Vegas, NV (US)

(72) Inventors: Daniel Marks, Decatur, GA (US); Hua Xu, Marietta, GA (US); Dinesh Dua, Alpharetta, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 300 days.

(21) Appl. No.: 17/305,995

(22) Filed: Jul. 19, 2021

(65) Prior Publication Data

US 2021/0366242 A1 Nov. 25, 2021

Related U.S. Application Data

(63) Continuation of application No. 16/558,735, filed on Sep. 3, 2019, now Pat. No. 11,069,199.

(Continued)

(51) Int. Cl.

*G07F 17/00* (2006.01)
*G07F 17/32* (2006.01)
*G07F 17/34* (2006.01)

(52) U.S. Cl.

CPC .......... *G07F 17/34* (2013.01); *G07F 17/3213* (2013.01); *G07F 17/3251* (2013.01); *G07F 17/3255* (2013.01); *G07F 17/3258* (2013.01); *G07F 17/3265* (2013.01); *G07F 17/3267* (2013.01)

(58) Field of Classification Search

None

See application file for complete search history.

(56) References Cited

U.S. PATENT DOCUMENTS

D423,483 S 4/2000 Hodgson
6,491,584 B2 12/2002 Graham (Continued)

OTHER PUBLICATIONS

Australian Examination Report No. 1 for App. No. AU2022200049, dated Feb. 22, 2023, 1-3 pages.

(Continued)

*Primary Examiner* — Paul A D'Agostino

(74) *Attorney, Agent, or Firm* — Weaver Austin Villeneuve & Sampson LLP

(57) ABSTRACT

A gaming machine provides a base game, from which a hold and spin feature game is triggered when a determined number of configurable symbols are displayed in a base game outcome. When the feature game is triggered, the configurable symbols are held in place on the display one or more spins are provided during the feature game in which to collect additional configurable symbols. Any additional configurable symbols are retained on the display during subsequent spins until the feature game is completed. The player is awarded a prize based on the values carried by the configurable symbols. The gaming machine includes one or more progressive play meters that are incremented when spin award symbols are displayed in base game outcomes. When the feature game is triggered, the number of spins provided in the feature game is determined based on the value carried by one of the progressive play meters.

20 Claims, 53 Drawing Sheets

Related U.S. Application Data

(60) Provisional application No. 62/727,805, filed on Sep. 6, 2018, provisional application No. 62/726,740, filed on Sep. 4, 2018.

(56) References Cited

U.S. PATENT DOCUMENTS

| | | | | |
|---|---|---|---|---|
| 6,604,740 | B1 | 8/2003 | Singer | |
| D479,531 | S | 9/2003 | Yanagida | |
| D519,515 | S | 4/2006 | Mugura | |
| 7,070,501 | B2 | 7/2006 | Cormack | |
| D544,871 | S | 6/2007 | Lim | |
| 7,326,109 | B2 | 2/2008 | Baerlocher | |
| 7,559,837 | B1 | 7/2009 | Yoseloff | |
| D603,416 | S | 11/2009 | Poling | |
| 7,632,184 | B2 | 12/2009 | Gauselmann | |
| 7,675,514 | B2 | 3/2010 | Ni | |
| 7,758,414 | B1 | 7/2010 | Marks | |
| D622,283 | S | 8/2010 | Van Os | |
| 7,874,915 | B2 | 1/2011 | Caspers | |
| D648,735 | S | 11/2011 | Arnold | |
| 8,231,456 | B2 | 7/2012 | Zielinski | |
| D664,992 | S | 8/2012 | Pizzutelli | |
| D665,418 | S | 8/2012 | Pizzutelli | |
| D665,419 | S | 8/2012 | Pizzutelli | |
| 8,298,070 | B2 | 10/2012 | Kato | |
| 8,360,851 | B2 | 1/2013 | Aoki | |
| 8,460,094 | B2 | 6/2013 | Bigelow, Jr. | |
| 8,491,390 | B2 | 7/2013 | Cregan | |
| D687,449 | S | 8/2013 | Van Os | |
| 8,562,418 | B2 | 10/2013 | Gomez | |
| D695,755 | S | 12/2013 | Hwang | |
| 8,608,539 | B2 | 12/2013 | Itagaki | |
| 8,690,659 | B2 | 4/2014 | Moody | |
| 8,702,489 | B2 | 4/2014 | Cuddy | |
| D709,515 | S | 7/2014 | Elston | |
| D715,827 | S | 10/2014 | Lacour | |
| D717,826 | S | 11/2014 | Lacour | |
| D718,331 | S | 11/2014 | Lacour | |
| D744,509 | S | 12/2015 | Moriya | |
| D745,036 | S | 12/2015 | Joynes | |
| D746,294 | S | 12/2015 | Jung | |
| 9,202,337 | B2 | 12/2015 | Lee | |
| 9,240,105 | B2 | 1/2016 | Kadlec | |
| D750,097 | S | 2/2016 | Kim | |
| D751,111 | S | 3/2016 | Zhou | |
| D752,091 | S | 3/2016 | Zhou | |
| D754,154 | S | 4/2016 | Moon | |
| D754,155 | S | 4/2016 | Moon | |
| D760,739 | S | 7/2016 | Jung | |
| D761,300 | S | 7/2016 | Haitani | |
| D761,802 | S | 7/2016 | Moon | |
| D761,845 | S | 7/2016 | Haitani | |
| 9,396,616 | B2 | 7/2016 | Baerlocher | |
| D763,305 | S | 8/2016 | Hashimoto | |
| D763,867 | S | 8/2016 | Moon | |
| D766,943 | S | 9/2016 | Moriya | |
| D771,075 | S | 11/2016 | Moriya | |
| D775,157 | S | 12/2016 | Perach | |
| D775,648 | S | 1/2017 | Snell | |
| D776,694 | S | 1/2017 | Kim | |
| 9,536,392 | B1 | 1/2017 | Luciano, Jr. | |
| D791,802 | S | 7/2017 | Solop | |
| D805,529 | S | 12/2017 | Hersh | |
| 9,836,917 | B2 | 12/2017 | Bennett | |
| D810,767 | S | 2/2018 | Sharma | |
| D813,880 | S | 3/2018 | Davis | |
| D813,881 | S | 3/2018 | Davis | |
| D823,877 | S | 7/2018 | Ludwick | |
| 10,147,264 | B1 | 12/2018 | Halvorson | |
| D837,828 | S | 1/2019 | Gros | |
| D847,172 | S | 4/2019 | Nishiura | |
| 10,262,501 | B2 | 4/2019 | Satterlie | |
| D847,834 | S | 5/2019 | Toth | |
| D869,483 | S | 12/2019 | Wilde | |
| D875,109 | S | 2/2020 | Upton | |
| D881,223 | S | 4/2020 | Tuomey | |
| D890,192 | S | 7/2020 | Cortesi | |
| 10,733,846 | B2 | 8/2020 | Wright | |
| D895,645 | S | 9/2020 | Sanborn | |
| D896,235 | S | 9/2020 | Tedesco | |
| 10,818,145 | B2 | 10/2020 | Kendall | |
| D904,452 | S | 12/2020 | Kroon | |
| D905,095 | S | 12/2020 | Park | |
| 10,896,567 | B2 | 1/2021 | Rizos | |
| D912,158 | S | 3/2021 | Marks | |
| D914,051 | S | 3/2021 | Paul | |
| D940,177 | S | 1/2022 | Tuomey | |
| D942,466 | S | 2/2022 | Degens | |
| 2005/0070354 | A1 | 3/2005 | Baerlocher | |
| 2005/0075163 | A1 | 4/2005 | Cuddy | |
| 2007/0060321 | A1 | 3/2007 | Vasquez | |
| 2007/0184887 | A1 | 8/2007 | Cannon | |
| 2007/0213114 | A1 | 9/2007 | Caspers | |
| 2008/0026822 | A1 | 1/2008 | Walker | |
| 2008/0076513 | A1 | 3/2008 | Esses | |
| 2008/0113779 | A1 | 5/2008 | Cregan | |
| 2009/0061985 | A1 | 3/2009 | Inamura | |
| 2009/0104977 | A1 | 4/2009 | Zielinski | |
| 2009/0104986 | A1 | 4/2009 | Englman | |
| 2010/0016061 | A1 | 1/2010 | Gomez | |
| 2010/0029381 | A1 | 2/2010 | Vancura | |
| 2010/0120495 | A1 | 5/2010 | Frank | |
| 2010/0120499 | A1 | 5/2010 | Cohen | |
| 2010/0234089 | A1 | 9/2010 | Saffari | |
| 2010/0234091 | A1 | 9/2010 | Baerlocher | |
| 2011/0003636 | A1* | 1/2011 | Thomas | G07F 17/34 463/30 |
| 2011/0105216 | A1 | 5/2011 | Cohen | |
| 2011/0107223 | A1 | 5/2011 | Tilton | |
| 2011/0118010 | A1 | 5/2011 | Brune | |
| 2011/0130191 | A1 | 6/2011 | Englman | |
| 2011/0136562 | A1 | 6/2011 | Loat | |
| 2011/0263317 | A1 | 10/2011 | Marks | |
| 2012/0289325 | A1 | 11/2012 | Kyte | |
| 2012/0289326 | A1 | 11/2012 | Englman | |
| 2013/0065663 | A1 | 3/2013 | Johnson | |
| 2013/0159928 | A1 | 6/2013 | Joynes | |
| 2013/0252704 | A1 | 9/2013 | Gilbertson | |
| 2013/0260864 | A1 | 10/2013 | Gomez | |
| 2013/0273997 | A1 | 10/2013 | Stewart | |
| 2013/0310157 | A1 | 11/2013 | Baerlocher | |
| 2014/0040810 | A1 | 2/2014 | George | |
| 2014/0051494 | A1* | 2/2014 | Marks | G07F 17/3265 463/20 |
| 2014/0051496 | A1 | 2/2014 | Meyer | |
| 2014/0059490 | A1 | 2/2014 | Grace | |
| 2014/0094256 | A1* | 4/2014 | Hilbert | G07F 17/34 463/20 |
| 2014/0094271 | A1* | 4/2014 | Wabschall | G07F 17/3255 463/25 |
| 2014/0137020 | A1 | 5/2014 | Sharma | |
| 2014/0141866 | A1 | 5/2014 | Irwin, Jr. | |
| 2014/0162751 | A1* | 6/2014 | Ryan | G07F 17/3267 463/20 |
| 2014/0274348 | A1 | 9/2014 | Baerlocher | |
| 2014/0323198 | A1 | 10/2014 | Tuck | |
| 2014/0349734 | A1 | 11/2014 | Saunders | |
| 2015/0018070 | A1 | 1/2015 | Meyer | |
| 2015/0031444 | A1 | 1/2015 | Colvin | |
| 2015/0080090 | A1* | 3/2015 | Nicely | G07F 17/34 463/20 |
| 2015/0206397 | A1 | 7/2015 | Nelson | |
| 2015/0248810 | A1 | 9/2015 | Wortmann | |
| 2015/0262457 | A1* | 9/2015 | Jhanb | G07F 17/3267 463/20 |
| 2015/0287269 | A1 | 10/2015 | Berman | |
| 2015/0310699 | A1 | 10/2015 | Meyer | |
| 2015/0332560 | A1 | 11/2015 | Fulton | |
| 2016/0042597 | A1* | 2/2016 | Olive | G07F 17/3262 463/21 |
| 2016/0253873 | A1* | 9/2016 | Olive | G07F 17/3258 463/20 |

(56) References Cited

U.S. PATENT DOCUMENTS

| | | | | |
|---|---|---|---|---|
| 2016/0328926 | A1 | 11/2016 | Boese | |
| 2017/0032611 | A1 | 2/2017 | Luong | |
| 2017/0053496 | A1 | 2/2017 | Borissov | |
| 2017/0092066 | A1* | 3/2017 | Watkins | G07F 17/34 |
| 2017/0148274 | A1 | 5/2017 | Olive | |
| 2017/0154498 | A1* | 6/2017 | Olive | G07F 17/3267 |
| 2017/0301177 | A1 | 10/2017 | Pawloski | |
| 2017/0309119 | A1 | 10/2017 | San | |
| 2018/0082546 | A1 | 3/2018 | Mariscal | |
| 2018/0130286 | A1 | 5/2018 | Berman | |
| 2018/0268659 | A1 | 9/2018 | Chesworth | |
| 2019/0043313 | A1 | 2/2019 | Cong | |
| 2019/0051096 | A1 | 2/2019 | San | |
| 2019/0102986 | A1 | 4/2019 | Nelson | |
| 2019/0355218 | A1 | 11/2019 | Christiaan | |
| 2020/0074791 | A1 | 3/2020 | Uberuaga | |
| 2021/0069594 | A1 | 3/2021 | Sensui | |
| 2023/0018779 | A1* | 1/2023 | Xu | G07F 17/3262 |

OTHER PUBLICATIONS

Notice of Allowance dated Jul. 24, 2023 for U.S. Appl. No. 29/817,828 (pp. 1-9).
Harley Davidson Slot Machine, https://www.youtube.com/watch?v=SFMgMDDwbOg.
Harley Davidson Slot Machine, https://www.youtube.com/watch?v=2obOXY-IV9U.
Office Action dated Sep. 25, 2020 for U.S. Appl. No. 16/566,446 (pp. 1-11).
Notice of Allowance dated Nov. 18, 2020 for U.S. Appl. No. 16/558,735 (pp. 1-7).
Office Action dated Dec. 3, 2020 for U.S. Appl. No. 16/539,749 (pp. 1-9).
Supplemental Notice of Allowability dated Jan. 25, 2021 for U.S. Appl. No. 16/558,735 (pp. 1-2).
Notice of Allowance dated Jan. 28, 2021 for U.S. Appl. No. 16/566,446 (pp. 1-9).
Office Action dated Aug. 5, 2020 for U.S. Appl. No. 16/558,735 (pp. 1-9).
Office Action dated Jun. 8, 2021 for U.S. Appl. No. 29/726,817 (pp. 1-10).
Notice of Allowance dated Feb. 24, 2021 for U.S. Appl. No. 16/558,735 (pp. 1-7).
Corrected Notice of Allowability dated Apr. 7, 2021 for U.S. Appl. No. 16/566,446 (pp. 1-2).
Office Action dated Apr. 15, 2021 for U.S. Appl. No. 29/662,088 (pp. 1-9).
Buffalo Diamond Slot Machine from Aristocrat, This Week in Gambling, dated Oct. 12, 2019, youtube.com [online]. Retrieved Apr. 10, 2021 from internet <URL:https://www.youtube.com/watch?v=se1ET2x989U> (Year: 2019).
Notice of Allowance dated May 7, 2021 for U.S. Appl. No. 16/539,749 (pp. 1-8).
Notice of Allowance dated May 27, 2021 for U.S. Appl. No. 16/558,735 (pp. 1-7).
Notice of Allowance dated May 28, 2021 for U.S. Appl. No. 29/662,088 (pp. 1-5).
Notice of Allowance dated Sep. 3, 2021 for U.S. Appl. No. 29/726,817 (pp. 1-7).
Office Action (Notice of Allowance and Fees Due (PTOL-85)) dated Sep. 7, 2021 for U.S. Appl. No. 16/539,749 (pp. 1-7).
Office Action dated Jan. 7, 2021 for U.S. Appl. No. 16/415,459 (pp. 1-12).
Australian Examination Report No. 1 for App. No. AU2019268090, dated Jan. 6, 2021, 6 pages.
Office Action (Final Rejection) dated Jul. 28, 2021 for U.S. Appl. No. 16/415,459 (pp. 1-27).
Office Action (Non-Final Rejection) dated Oct. 13, 2021 for U.S. Appl. No. 16/415,459 (pp. 1-10).
Office Action (Notice of Allowance and Fees Due (PTOL-85)) dated Apr. 14, 2022 for U.S. Appl. No. 17/301,400 (pp. 1-8).
Office Action dated May 5, 2022 for U.S. Appl. No. 29/794,637 (pp. 1-6).
Buffalo Diamond Slot Review—Aristocrat, dated Apr. 26, 2019, sitandgoplanet.com [online]. Retrieved May 2, 2022 from Internet <URL: https://web.archive.org/web/20190426092058/https://www.sitandgoplanet.com/casino/buffalo-diamond.html> (Year: 2022).
Office Action (Notice of Allowance and Fees Due (PTOL-85)) dated Jun. 16, 2022 for U.S. Appl. No. 16/415,459 (pp. 1-7).
Office Action (Notice of Allowance and Fees Due (PTOL-85)) dated Feb. 2, 2022 for U.S. Appl. No. 16/539,749 (pp. 1-5).
Office Action (Final Rejection) dated Feb. 15, 2022 for U.S. Appl. No. 16/415,459 (pp. 1-9).
Office Action (Non-Final Rejection) dated Mar. 14, 2022 for U.S. Appl. No. 17/301,400 (pp. 1-6).
Office Action (Non-Final Rejection) dated Sep. 28, 2023 for U.S. Appl. No. 17/957,727 (pp. 1-23).
Office Action (Non-Final Rejection) dated Dec. 21, 2023 for U.S. Appl. No. 17/719,579 (pp. 1-10).
★New Slot!★ Harley Davidson Motor Cycles (IGT) Slot Machine Bonus, available at <https://www.youtube.com/watch?v=Gue2SsYiWH8>, Jul. 31, 2017.
Office Action (Notice of Allowance and Fees Due (PTOL-85)) dated Jan. 18, 2024 for U.S. Appl. No. 17/957,727 (pp. 1-7).

* cited by examiner

240

1130

240

240

240

240

240

1130

240

240

SYSTEM AND METHOD OF PROVIDING A HOLD AND SPIN FEATURE GAME WITH PROGRESSIVE PLAY METERS

CROSS-REFERENCE TO RELATED APPLICATIONS

The present application claims priority to, and is a continuation of, U.S. patent application Ser. No. 16/558,735, filed Sep. 3, 2019 and entitled "SYSTEM AND METHOD OF PROVIDING A HOLD AND SPIN FEATURE GAME WITH PROGRESSIVE PLAY METERS", which is hereby incorporated by reference in its entirety. This application claims priority to U.S. Provisional Patent Application Nos. 62/726,740, filed Sep. 4, 2018, and 62/727,805, filed Sep. 6, 2018, both titled SYSTEM AND METHOD OF PROVIDING A HOLD AND SPIN FEATURE GAME WITH PROGRESSIVE SPIN METERS, which are all hereby incorporated by reference herein in their entireties.

BACKGROUND

Electronic gaming machines ("EGMs") or gaming devices provide a variety of wagering games such as slot games, video poker games, video blackjack games, roulette games, video bingo games, keno games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical wagering games use a random number generator (RNG) to randomly determine the outcome of each game. The wagering game is designed to return a certain percentage of the amount wagered back to the player (RTP=return to player) over the course of many plays or instances of the game. The RTP and randomness of the RNG are critical to ensuring the fairness of the games and are, therefore, highly regulated. Upon initiation of play, the RNG randomly determines a game outcome and symbols are then selected which correspond to that outcome. Notably, some games may include an element of skill on the part of the player and are, therefore, not entirely random.

In existing gaming systems, feature games, secondary or bonus games, may be triggered for players in addition to the base game. A feature game gives players an additional opportunity to win prizes, or the opportunity to win larger prizes, than would otherwise be available in the base game. Feature games can also offer altered game play to enhance player enjoyment.

The popularity of such gaming machines with players is heavily dependent on the entertainment value of the machine relative to other gaming options and the player's gambling experience. Operators of gaming businesses therefore strive to provide the most entertaining, engaging, and exciting machines to attract customers to use the machines while also providing a machine that allows the player to enjoy their gambling experience. Accordingly, there is a continuing need for gaming machine manufacturers to develop new games in order to maintain or increase player enjoyment.

SUMMARY

Aspects of the present disclosure relate to gaming machines and electronic gaming methods in which a feature game may be triggered during play of a base game.

In an embodiment, a video slot machine includes a base game and a feature game that may be triggered by the base game.

In some embodiments, the base game may use a plurality of symbol display positions arranged in a matrix or an array of rows and columns. In some embodiments, the columns may be reels that spin and stop to populate the display matrix with game symbols.

In some embodiments, the symbols appearing in the display positions can produce a scatter pay award. In some embodiments, the scatter pay award may be based on the appearance of special symbols ("scatter symbols") in the display matrix. The particular symbols do not need to appear in any predefined order or orientation relative to the symbol positions of the array.

In response to the appearance of the special symbols to form a scatter pay award, a scatter pay bonus feature may be conducted to determine the amount of the award to the player.

In some embodiments, the appearance of a number, such as six (6) or more, of special symbols in a base game outcome in the display matrix will trigger the scatter pay bonus feature.

In an embodiment, the special symbols may include configurable symbols that have at least a common component and a variable component, wherein the variable component is indicative of a value of a prize that is associated with a respective configurable symbol.

In some embodiments, the configurable symbols may include value symbols, which each display a respective numeric value, e.g., a number of credits or currency.

In some embodiments, the configurable symbols may include jackpot symbols, which each display the name of a particular jackpot, e.g., a MINI jackpot, MINOR jackpot, MAXI jackpot, MAJOR jackpot or GRAND jackpot. In some embodiments, at least some of the jackpots may have fixed values. In some other embodiments, at least some of the jackpots may be progressive jackpots whose value increases for each wager that is placed on a base game by the amount proportional to said wager.

In various embodiments, a predetermined number of spins are awarded to the player in the scatter pay bonus feature. In some embodiments, the scatter pay bonus feature game may be a hold and spin feature game where all of the configurable symbols are held in place in the display matrix for the predetermined number of spins and the symbols in the remaining symbol positions are spun. The spin of symbols in the remaining symbol positions may be accomplished by individual reel strips. The resulting spin may produce additional configurable symbols which are, in turn, added to the "hold" symbols and remain fixed for any remaining spins. After the predetermined number of spins are completed, the sum total value of all "hold" symbols is awarded to the player.

In some embodiments, the configurable symbols may include repeater symbols whose value is not determined until a feature game is triggered. In an embodiment, the value of the repeater symbol is generated based on the value(s) of one or more of the configurable symbols that trigger a respective feature game. In an embodiment, the value of the repeater symbol is determined by summing the values of the configurable symbols that trigger a respective feature game. For example, in an instance where a feature game is triggered by configurable symbols having values of 10 credits, 10 credits, 10 credits, 20 credits, 20 credits, 50 credits, 40 credits, and the repeater symbol's value would be 160 credits. Any repeater symbols that spin up during the ensuing feature game would be set to 160 credits in this example.

In some embodiments, the value of the repeater symbols may change across feature spins: i) at random, ii) according to defined table/order, iii) based upon results of a feature spin, iv) wager level, v) number of initiating feature initiating symbols, vi) number of symbols collected in feature, vii) based upon the combined result of multiple players game events, wager level or other criteria across multiple linked gaming units (i.e., progressive repeater value), and/or viii) any combination of the foregoing.

In some embodiments, the configurable symbols may include mystery symbols whose value is not revealed at the time the mystery symbol is displayed. In an embodiment, the value of a mystery symbol may be determined, e.g., randomly, and any time following its display. The mystery symbol may then be modified to display its determined value.

In some embodiments, mystery symbols may be displayed in connection with play of both the base game and the feature game. Accordingly, in some embodiments, it is possible fora mystery symbol to be part of the defined number of triggering symbols in a base game. For example, a base game result could include a mystery symbol along with five other configurable symbols. In such instance, the value of the mystery symbol may be determined and displayed prior to determining the value of the repeater symbol. If additional mystery symbols are awarded during the assigned value ensuing feature game, the value could be assigned this same value or other values may be separately determined.

In some embodiments, the value of a mystery symbol may be determined and awarded to the player during play of the base game if the base game outcome does not trigger the feature game. For example, assuming 6 configurable symbols are required to trigger a feature game, the appearance of a mystery symbol in a base game outcome with fewer than 6 configurable symbols may result in the award of the determined mystery symbol value to the player even though the feature game would not be triggered.

In some embodiments, the awards assigned to mystery symbols may be selected from a set of awards that includes (1) credit values, e.g., 10 credits, 20 credits, 50 credits, 100 credits, 500 credits, etc., (2) jackpot values, e.g., MINI, MINOR, MAXI, and GRAND, and/or (3) fixed prizes, e.g., cars, electronics, etc. In some embodiments, the awards assigned to mystery symbols during the base and feature games may be selected from the same set of possible awards. In some other embodiments, different sets of possible awards may be available during the base and feature games. For example, in some embodiments, the mystery symbol awards may be limited to jackpot awards and/or fixed prizes during the base game, while the possible awards during the feature game may also include credit values.

In some embodiments, a first valuation game may be provided to determine the value of the mystery symbols. The first valuation game may be in the form of a first spinning wheel game, where a wheel spins and randomly stops to determine a value for one or more mystery symbols. The wheel may include of a plurality of sections that each display a respective value, such as a numeric value (e.g., a number of credits or currency), or jackpot label (e.g., mini, minor, major maxi, or grand) that is associated with a jackpot amount (e.g., \$50, \$500, \$1,000, \$5,000, \$10,000). The wheel may, for example, spin vertically or horizontally across a game screen forming part of the slot machine device.

In some embodiments, a single wheel spin may be used to determine the value for any displayed mystery symbols. For example, where the triggering base game outcome has four value symbols and three mystery symbols, the first valuation game is triggered. If the first valuation game results in a value of \$100, then each of the three mystery symbols are converted from a question mark symbol to \$100.

In other embodiments, the wheel may be separately spun for each displayed mystery symbol. Accordingly, in some embodiments, the example may result in three wheel spins (one for each mystery symbol) during the first valuation game.

In various embodiments, the first valuation game may not display a wheel, but instead may display the values in a different arrangement such as a reel, a grid, etc. In certain embodiments, the first valuation game may not display a wheel, a reel, or values and instead may make a random determination to select one value from a range or group of values and display the selected value and use it for the one or more mystery symbols.

In various embodiments, one or more mystery symbols may be replaced with a sum of the values of symbols displaying a value.

In other embodiments, the value of the mystery symbols may be set in other ways. For example, a random event may cause a value to be set on a mystery symbol. Also, there may be a player skill feature where the skill level of the player is determined or is based on particular data regarding the particular player, and the value of the mystery symbol is set accordingly. Also, pick n' pop may be used to set the value of the mystery symbol.

Also, different levels of mystery symbols may be used, such that some levels are of higher average values than others. For example, blue mystery symbols may use a blue wheel with lower average values and gold mystery symbols may use a gold wheel with higher average values.

The first valuation game may also be used to determine the value of any additional mystery symbols that are collected during the feature game. In some embodiments, the first valuation game may be triggered following any spin that produces one or more new mystery symbols. Alternatively, the first valuation game may be conducted upon completion of the feature game. As discussed above, a single spin may be used to determine the value of all newly awarded mystery symbols. Alternatively, individual spins may be conducted to separately determine the value of each respective mystery symbol.

In some embodiments, an enhanced award may be awarded if the display matrix is completely filled with configurable symbols during the hold and spin feature game. For example, in some embodiments, the enhanced award may be a multiplier, such as a 2× or 3× multiplier of the "held" symbols, or an award of a jackpot value.

In some embodiments, the enhanced award may be determined using a second valuation game. The second valuation game may be a second spinning wheel game that provides different and/or enhanced values from those used in the first spinning wheel game. For example, the second spinning wheel game may include multipliers (i.e., 2× or 3×) or multipliers with jackpots (i.e., 2×+Grand or 3×+Major). The multiplier value indicated by the spin of the second display wheel affects the sum total value of all "hold" configurable symbols collected in the hold and spin game (i.e., "2×" will double the sum total value); the jackpot enhances the hold and spin award by the amount of the jackpot (i.e., $50, $500 or $5000 will be added to the sum total value).

Certain embodiments of the present disclosure are directed to a hold and spin feature game with one or more progressive spin or play meters (e.g., counters); it will be understood that while the examples herein may be directed to a feature game in which virtual reels are spun for each play of the feature game, other feature games providing similar functionality may provide outcomes through a technique other than using virtual reels. In recognition of that, the terms "play" and "spin," when used with respect to an element of the feature games discussed herein, may be used interchangeably. The progressive play meters may be adjusted during play of the feature game and used to determine the number of plays of a feature game awarded when the feature game is triggered. In some embodiments, only a single progressive play meter may be provided. In other embodiments, the feature game may include multiple feature levels, where each feature level has a respective progressive play meter. In some embodiments, the feature levels may be designated by different colors or symbols. For example, some embodiments may include three feature levels, where each feature level is designated by a different color, e.g., a first or yellow level, a second or green level, and a third or blue feature level.

The progressive play meters may be incremented (and/or decremented) based on events occurring during play of the base game. For example, in some embodiments, the base game may include spin award symbols (which may also be thought of as "play award symbols") that increment one or more of the progressive play meters when they appear in a base game outcome. In some embodiments, the spin award symbols may be in the form of configurable symbols that can also function to trigger the hold and spin feature game. For example, in certain embodiments, the spin award symbols may be value, jackpot, mystery, and/or repeater symbols that include a further designation, e.g., a color, a ribbon, or medal, to indicate that they also function as spin award symbols.

In some embodiments, the spin award symbols may only appear in certain symbol positions of the display matrix. For example, in some embodiments, the spin award symbols may only appear in a specific column or row of the display matrix. In other embodiments, the spin award symbols may appear in any symbol position in the display matrix.

In some embodiments, respective spin award symbols may be associated with each feature level. In such embodiments, the appearance of a particular level (e.g., color) spin award symbol in a base game outcome causes the respective progressive play meter to be incremented. For example, in an embodiment with three feature levels a first, e.g., yellow spin award symbol, may increment the progressive play meter for the first, e.g., yellow level, a second, e.g., green spin award symbol, may increment the progressive play meter for the second, e.g., green, level, while a third, e.g., blue spin award symbol, may increment the progressive play meter for the third, e.g., blue, feature level.

In some embodiments, each spin award symbol causes a respective progressive play meter to increment by one spin. In other embodiments, the number of spins awarded may vary, e.g., randomly. In some embodiments, different increment amounts may be provided for each of the feature levels. For example, in an embodiment with three feature levels, the first, e.g., yellow, level may increment by 1 spin for each yellow spin award symbol, the second, e.g., green, level may increment by 2 spins for each green spin symbol, while the third, e.g., blue, level may increment by 3 spins for each blue spin symbol.

Some embodiments may also include special symbols that cause one or more of the progressive play meters to decrement. For example, in some embodiments, the spin award symbols may carry negative values that decrement the associated progressive play meter.

In some embodiments, one or more of the feature levels may also include an associated multiplier which is awarded for filling the display matrix with configurable symbols during the feature game. For example, in an embodiment with three feature levels, a 2× multiplier may be associated with the first, e.g., yellow, feature level, a 3× multiplier may be associated with the second, e.g., green, feature level, while a 4× multiplier may be associated with the third, e.g., blue, feature level.

When a hold and spin feature game is triggered, i.e., by appearance of the designated number of triggering symbols in a base game outcome, the feature level(s) for the hold and spin feature game may be determined in a variety of ways. For example, if a spin award symbol appears in the trigger base game outcome, the level of the spin award symbol may be used to select the feature level for the hold and spin feature game. For example, if the triggering base game outcome includes a first level, e.g., yellow, spin award symbol, the feature game may be played using the first, e.g., yellow, feature level. In such an instance, the number of spins shown on the first level progressive play meter would be awarded for the feature game.

In some embodiments, multiple spin awards symbols may appear in a triggering base game outcome. In such embodiments, the appearance of multiple spin award symbols may result in the award of multiple instances of the hold and spin feature game. For example, if the triggering base game outcome includes a first, e.g., yellow, level spin award symbol and third, e.g., blue, level spin award symbol, two separate instances of the feature game may be initiated. Specifically, one game instance using the progressive play meter and associated multiplier of the first feature level and a second instance using the progressive play meter and multiplier for the third feature level. In such embodiments, the triggering base game outcome may be fully replicated such that the hold and spin feature begins with at least two identical display matrices that may be played independently during the hold and spin feature game. In particular, separately for each game instance, the configurable symbols in a respective game instance may be held in place while any non-configurable symbols are replaced with a symbol selected from the set of configurable and non-configurable symbols.

In other embodiments, only a single hold and spin feature game may be awarded even when multiple spin award symbols are displayed in a triggering base game outcome. In such embodiments, the feature level may be randomly selected, either with or without player input. Alternatively, in some embodiments, the highest level of the displayed spin award symbols may be used to select the feature level. For example, if the triggering base game outcome includes a first, e.g., yellow, level spin award symbol and third, e.g., blue, level spin award symbol, the feature may be played at the third feature level.

If a triggering base game outcome does not include any spin award symbols, the feature level may be determined in a variety of ways. In some embodiments, the lowest feature level may be assigned for the hold and spin feature game. In other embodiments, the gaming device may randomly assign the feature level, either with or without player input. For example, in some embodiments, the gaming device may present the player with a plurality of picks, where each pick corresponds to a feature level, e.g., yellow, green, or blue. The controller may award a feature level to the player in response to the player's selection of one of the picks. In other embodiments, a spinning wheel game may be used to determine the feature level for the hold and spin game.

In some embodiments, separate progressive play meters may be maintained for each bet denomination and/or wager amount. For example, in some embodiments, the gaming device may provide for plurality of different bet denominations, such as 1 cent, 2 cents, 5 cents and 10 cents. In such embodiments, respective sets of progressive play meters may be provided for each bet denomination. For example, in an embodiment with three feature levels, respective first, second and third progressive meters may be separately provided for each bet denomination. Additionally or alternatively, each bet denomination may provide a plurality of different wager amounts, e.g., 75 credits, 150 credits, 225 credits, 300 credits and 375 credits. In such embodiments, each wager amount may include a respective set of progressive credit meters. For example, where three feature levels are provided, respective first, second, and third progressive meters may be separately provided for each wager amount. In some embodiments, the number of feature levels (and according progressive play meters) may be the same for each denomination and/or wager amount. In other embodiments, a different number of feature levels may provide some or all of the bet denominations and/or wager amounts. For example, in some embodiments, the number of feature levels may increase with higher wager amounts. For example, a first wager amount may have one feature level, a second wager amount may provide two feature levels, and a third wager amount may provide three feature levels, etc.

In some embodiments, the increment frequency of the progressive play meters may be the same across all bet levels. In other embodiments, the increment frequency of the progressive play meters may depend on the bet level, where a higher bet level has a higher increment frequency.

In some embodiments, the progressive play meters may be specific to a given gaming machine. In other embodiments, the progressive play meters may be linked between a plurality of gaming machines, i.e., spin award symbols associated with a progressive play meter that are obtained by any player on any of the gaming machines in the plurality of gaming machines may cause that progressive play meter to increment (or decrement, as appropriate), and that progressive play meter may be used when the feature game is triggered on any of the gaming machines in the plurality of gaming machines in association with that progressive play meter. In some embodiments, the progressive play meters may include both machine specific and linked progressive play meters. For example, in an embodiment with three feature levels, the progressive play meters for the first and second progressive levels may be machine specific, while the progressive play meter(s) for the third feature level may be linked progressive play meters.

In some embodiments, the hold and spin feature game may end if the player fills the display matrix with configurable symbols, even if more spins remain in the feature. In other embodiments, the player may be allowed to continue playing the hold and spin feature until all of the awarded spins have been used. In this later embodiment, if the display matrix is filled and spins remain, the gaming device may award the displayed credit values (subject to any applicable award enhancer, e.g., multiplier), and then clear the held symbols from the display matrix before continuing with the remaining spins. In some embodiments, the values carried by the configurable symbols may be increased each time the matrix is filled and cleared during the feature game. For example, the configurable symbols may initially carry values ranging from 25 to 150 credits. Following the matrix being filled and cleared a first time, the values of the configurable symbols may range between 30 and 250 credits, for example. Additionally, in some embodiments, the multiplier may be increased each time the matrix is filled during the hold and spin feature. For example, a 2× multiplier may be provided for filling the matrix a first time, a 3× multiplier may be applied for filling the matrix a second time, a 5× multiplier may be provided for filling the matrix a third time, etc.

Following the award and completion of a feature game, one or more of the progressive play meters may be reset to a respective default or seed number of spins. In some embodiments, the same default number of spins may be provided for each feature level. In other embodiments, a different number of default spins may be provided for each feature level. For example, in an embodiment with three levels, the progressive play meter for the first, e.g., yellow, feature level may initially be set to 8 spins, the progressive play meter for the second, e.g., green, feature level may initially be set to 12 spins, and the progressive play meter for the third, e.g., blue, feature level may initially be set to 15 spins. In some embodiments, only the progressive play meter for the awarded feature level is reset. In other embodiments, one or more additional progressive play meters may also be reset to their default value. For example, in embodiments where progressive play meters are maintained for different denominations and/or wager amounts, the progressive play meters that were in play when the feature was triggered may be reset to their default values.

BRIEF DESCRIPTION OF THE DRAWINGS

Features and advantages of certain embodiments of the present disclosure will become apparent from the following description of embodiments thereof, by way of example only, with reference to the accompanying drawings, in which.

Figure 1:
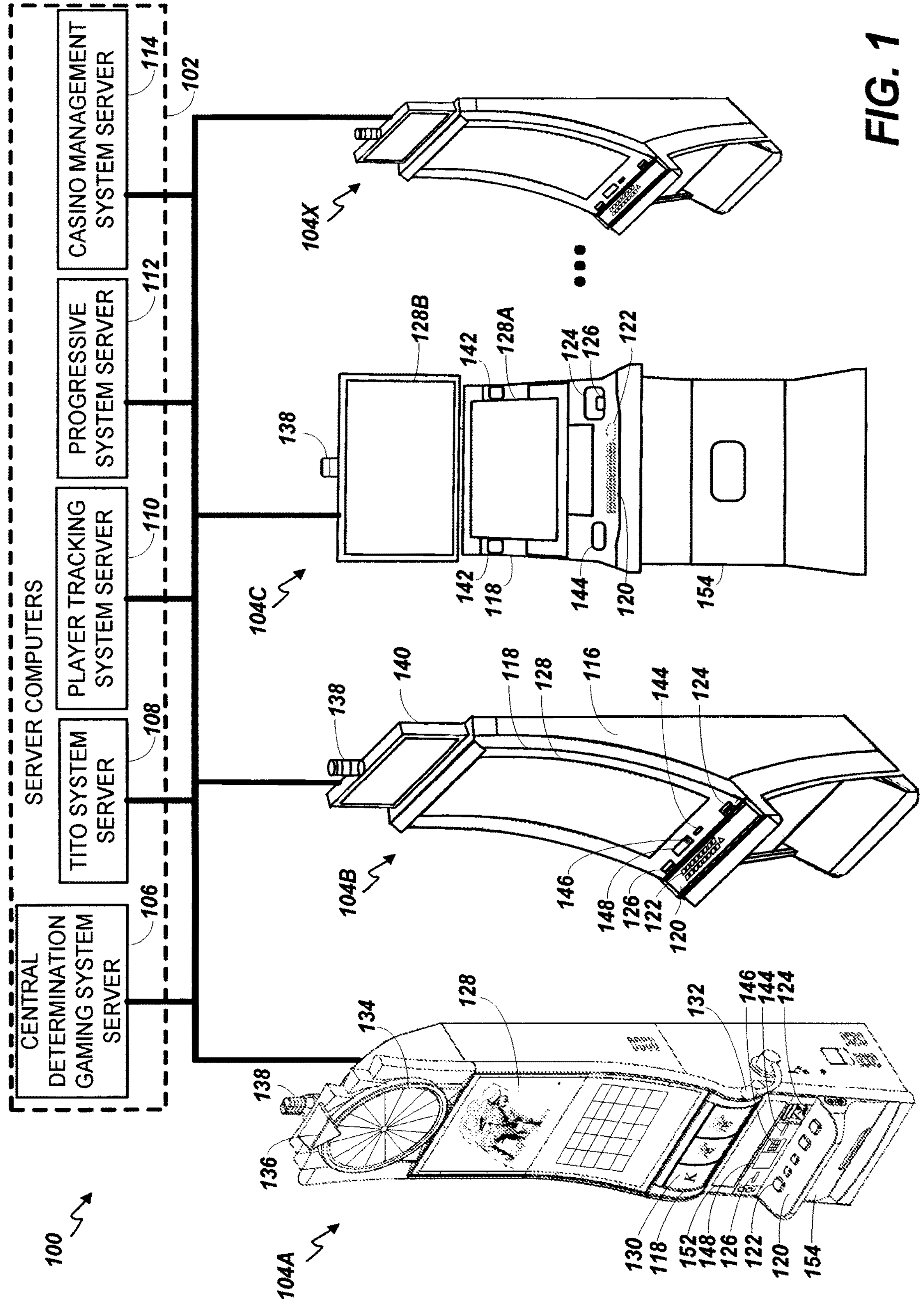
FIG. 1 is an example diagram showing several EGMs networked with various gaming-related servers.

The foregoing summary, as well as the following detailed description of certain embodiments of the present disclosure, will be better understood when read in conjunction with the appended drawings. For the purpose of illustrating the disclosure, certain embodiments are shown in the drawings. It should be understood, however, that the present invention is not limited to the arrangements and instrumentality shown in the attached drawings.

DETAILED DESCRIPTION

Referring to the drawings, there are shown example embodiments of gaming machines having components which enable the implementation of a base game from which a hold and spin feature game may be triggered.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the server computers 102 described herein.

Moreover, in some implementations at least some of the EGMs may be "thin-client" or "thick-client" EGMs that are not configured for stand-alone determination of game outcomes, etc. Such client EGMs may be configured for communication with one or more of the different server computers 102 described herein, including but not limited to the central determination gaming system server 106. Some such client EGMs may, for example, be configured to accept tickets and/or cash (e.g., via a bill validator that also functions as a ticket reader) to load credits onto the client EGM, a "ticket-out" printer for outputting a credit ticket when a cash out button is pressed, a player tracking card reader, etc. Some client EGMs may include a transceiver for wireless communication with a player's mobile device, (e.g., for communication with a player's smartphone, tablet and/or mobile gaming device) a keypad 146, and/or an illuminated display 148 for reading, receiving, entering, and/or displaying player tracking information. A client EGM may include a display system, an audio system, etc., for presenting attract sequences, game presentations, etc. The game presentations may include game outcomes determined by another device, such as the central determination gaming system server 106.

The server computers 102 also may include a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over a network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 117 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 127 which may be used to determine an outcome to the game.

In many configurations, the gaming device 104A may have a main display 128 (e.g., video display monitor) mounted to, or above, the gaming display area 127. The main display 128 can be, e.g., a high-resolution LCD, plasma, LED, or OLED panel which may be flat or curved as shown, a cathode ray tube, or other conventional electronically controlled video monitor. The main display 128 may be of one or more various orientations (i.e., landscape or portrait), aspect ratios and resolutions. In some implementations, the main display 128 may include a touchscreen.

In some embodiments, the bill validator 124 may also function as a "ticket-in" reader that allows the player to use a casino-issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A may have hardware meters for purposes including ensuring regulatory compliance and monitoring the player credit balance. In addition, there can be additional meters that record the total amount of money wagered on the gaming machine, total amount of money deposited, total amount of money withdrawn, and total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in the EGM 104A. In such embodiments, a game controller (not shown in FIG. 1) within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
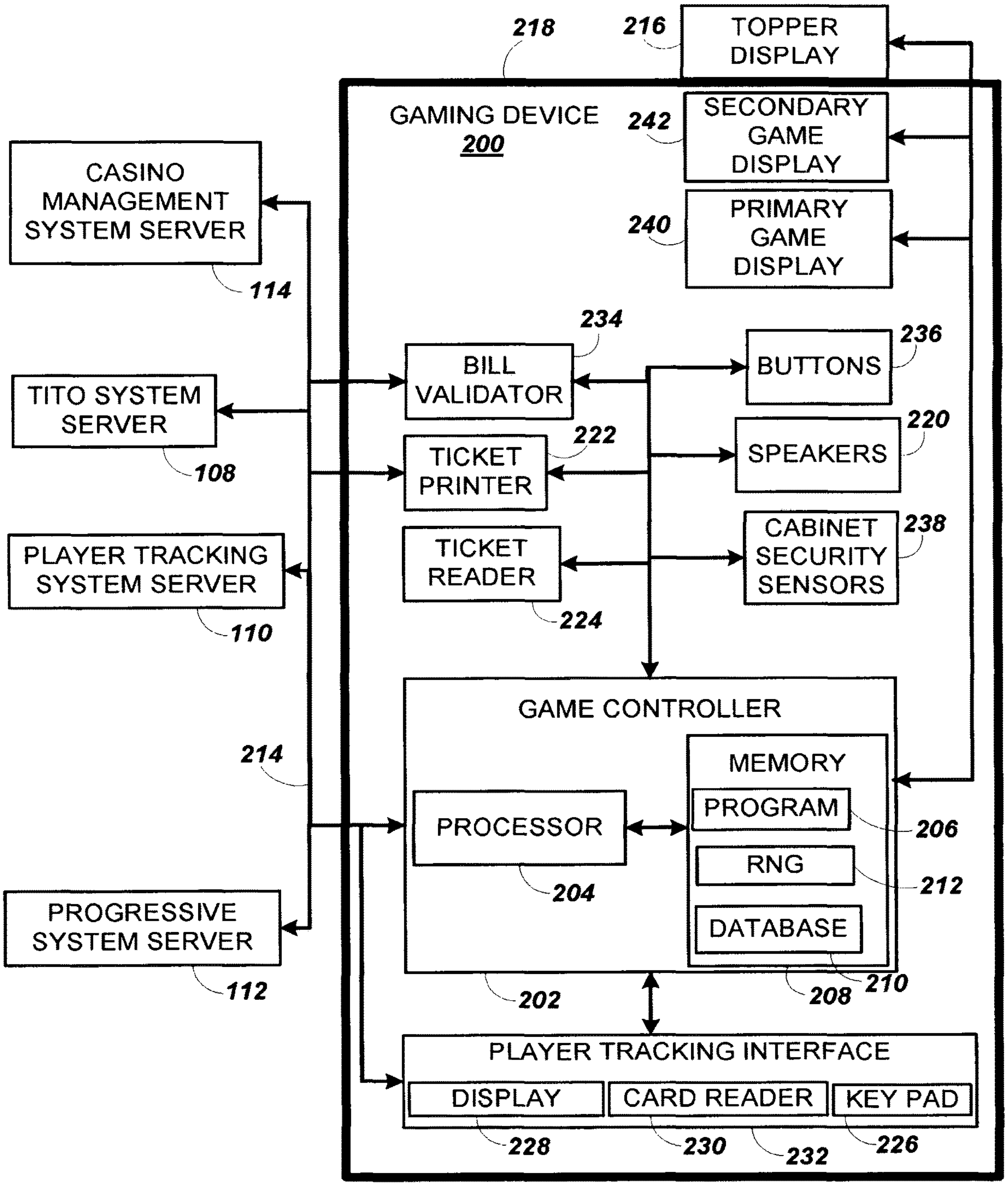
FIG. 2A is a block diagram showing various functional elements of an example EGM.

Many or all of the above-described components can be controlled by circuitry (e.g., a gaming controller) housed inside the main cabinet 116 of the gaming device 104A, the details of which are shown in FIG. 2A.

Note that not all gaming devices that are suitable for implementing embodiments of the present disclosure necessarily include top wheels, top boxes, information panels, cashless ticket systems, and/or player tracking systems. Further, some suitable gaming devices may have only a single game display that includes only a mechanical set of reels and/or a video display, while others are designed for bar counters or table tops and have displays that face upwards.

An alternative example gaming device 104B illustrated in FIG. 1 is the Arc' model gaming device manufactured by Aristocrat® Technologies, Inc. Note that, where possible, reference numerals identifying similar features of the gaming device 104A embodiment are also identified in the gaming device 104B embodiment using the same reference numbers. Gaming device 104B does not include physical reels, but instead shows game play functions on main display 128. An optional topper screen 140 may be used as a secondary game display for bonus play to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 117 which opens to provide access to the interior of the gaming device 104B. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape-style main display 128A may have a curvature radius from top to bottom, or alternatively, from side to side. In some embodiments, main display 128A is a flat panel display. Main display 128A is typically used for primary game play while secondary display 128B is typically used for a bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class II or Class III, etc.

FIG. 2A is a block diagram depicting examples of internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (a play or round of the game) may be generated on a remote gaming device such as the central determination gaming system server 106 (not shown in FIG. 2A but shown in FIG. 1). The game instance may be communicated to gaming device 200 via the network 214 and then displayed on gaming device 200. Gaming device 200 may execute game software, such as, but not limited to, video streaming software that allows the game to be displayed on gaming device 200. When a game is stored on gaming device 200, it may be loaded from the memory 208 (e.g., from a read only memory (ROM)) or from the central determination gaming system server 106 to memory 208. The memory 208 may include random access memory (RAM), ROM or another form of storage media that stores instructions for execution by the processor 204.

The gaming device 200 may include a topper display 216 or another form of a top box (e.g., a topper wheel, a topper screen, etc.) which sits above main cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Some gaming devices, such as gaming devices 104A-104X, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming device 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player can view the game outcome on the primary game display 240 and/or the secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using a player interface system, which may include the player input buttons 236, the primary game display 240 (which may include a touch screen), or some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

In this example, the gaming device 200 is also configured for communication with a gaming signage system 250 via the network 214. Various examples of gaming signage systems 250 are provided herein. According to some examples, the gaming signage system 250 may be configured for communication with other elements of a gaming system via the network 214, such as the central determination gaming system server 106, the progressive system server 112, the player tracking system server 110 the casino management system server 114 and/or the TITO system server 108.

When the player is done, he/she cashes out the credit balance (typically by pressing a cash-out button to receive a ticket from the ticket printer 222). The ticket may be redeemed for money or inserted into another machine to establish a credit balance for play.

While an example gaming device 200 has been described in regard to FIG. 2A, certain aspects of the present disclosure may be implemented by gaming devices that lack one or more of the above-described components. For example, not all gaming devices suitable for implementing aspects of the present disclosure necessarily include top boxes, information panels, cashless ticket systems, and/or player tracking systems. Further, some suitable gaming devices may include a single game display having mechanical reels or a video display. Moreover, other embodiments may be designed for bar tables and have displays that face upwards.

Many different types of wagering games, including mechanical slot games, video slot games, video poker, video black jack, video pachinko, keno, bingo, and lottery, may be provided by the gaming device 200. In particular, the gaming device 200 may be operable to provide many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, class 2 or class 3, etc.

The gaming device 200 may allow a player to select a game of chance, skill, or combination thereof, to play from a plurality of instances available on the gaming device 200. For example, the gaming device 200 may provide a menu with a list of the instances of games that are available for play on the gaming device 200 and a player may be able to select, from the list, a game that they wish to play.

Figure 2B:
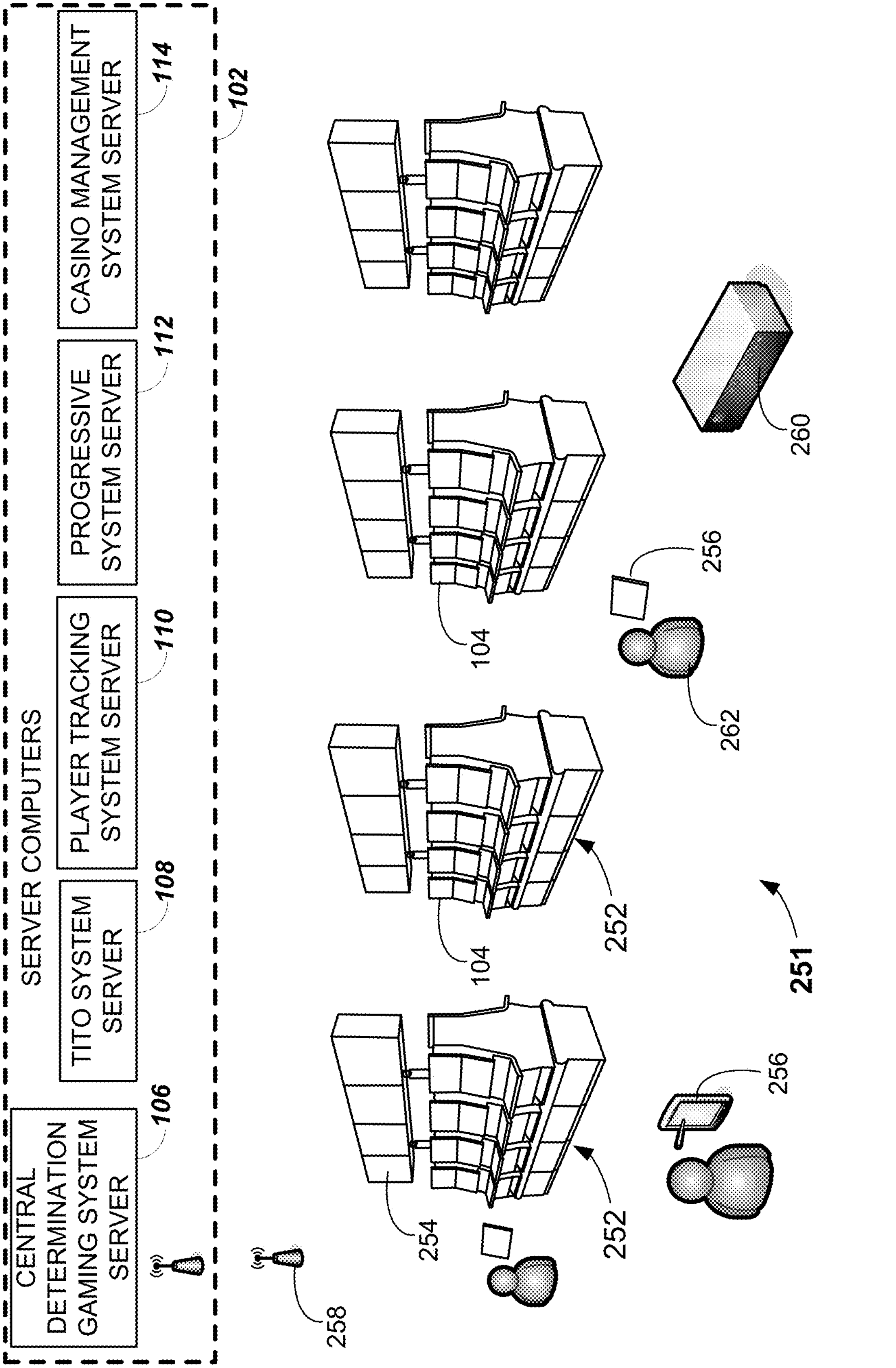
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254. According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
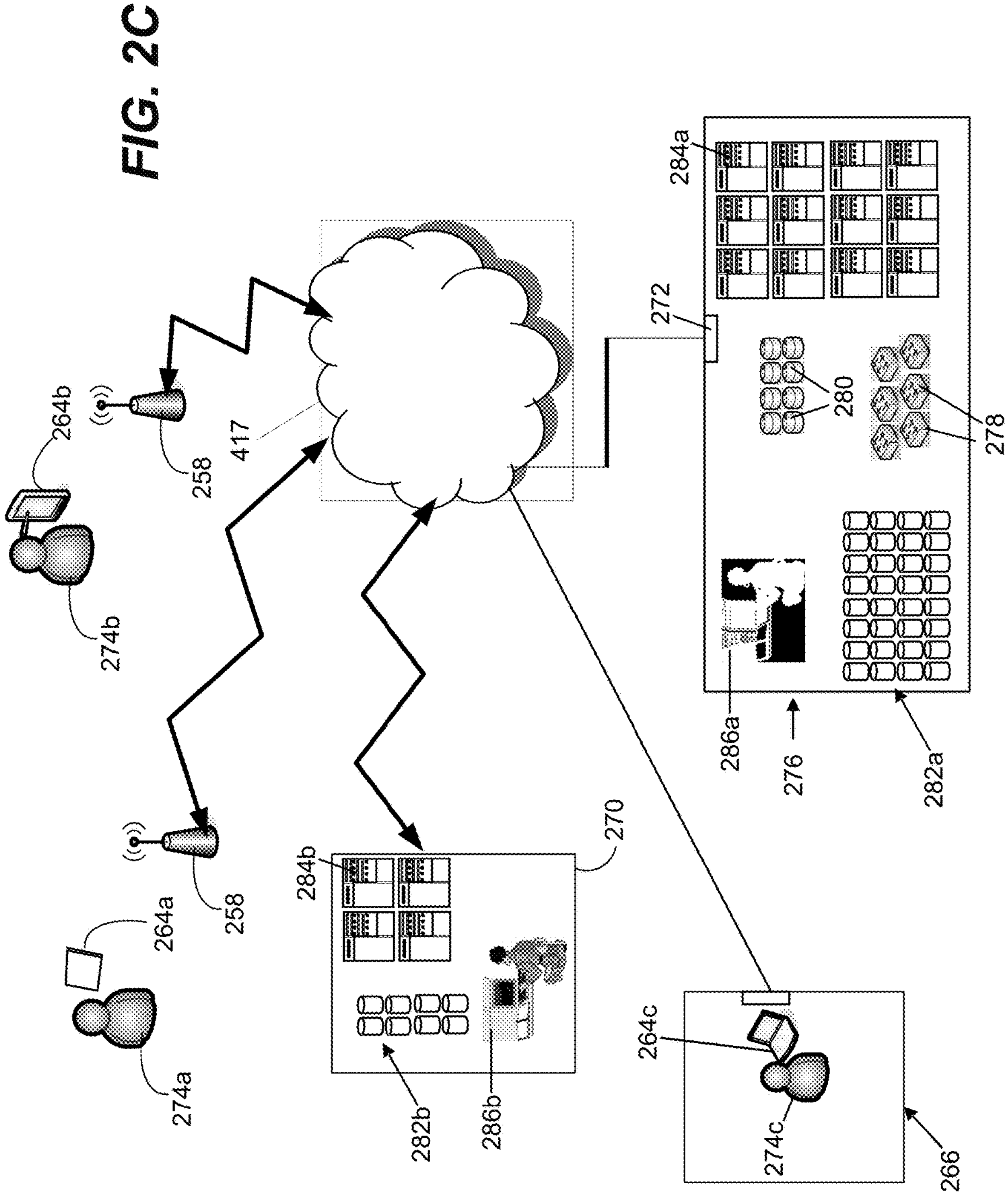
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
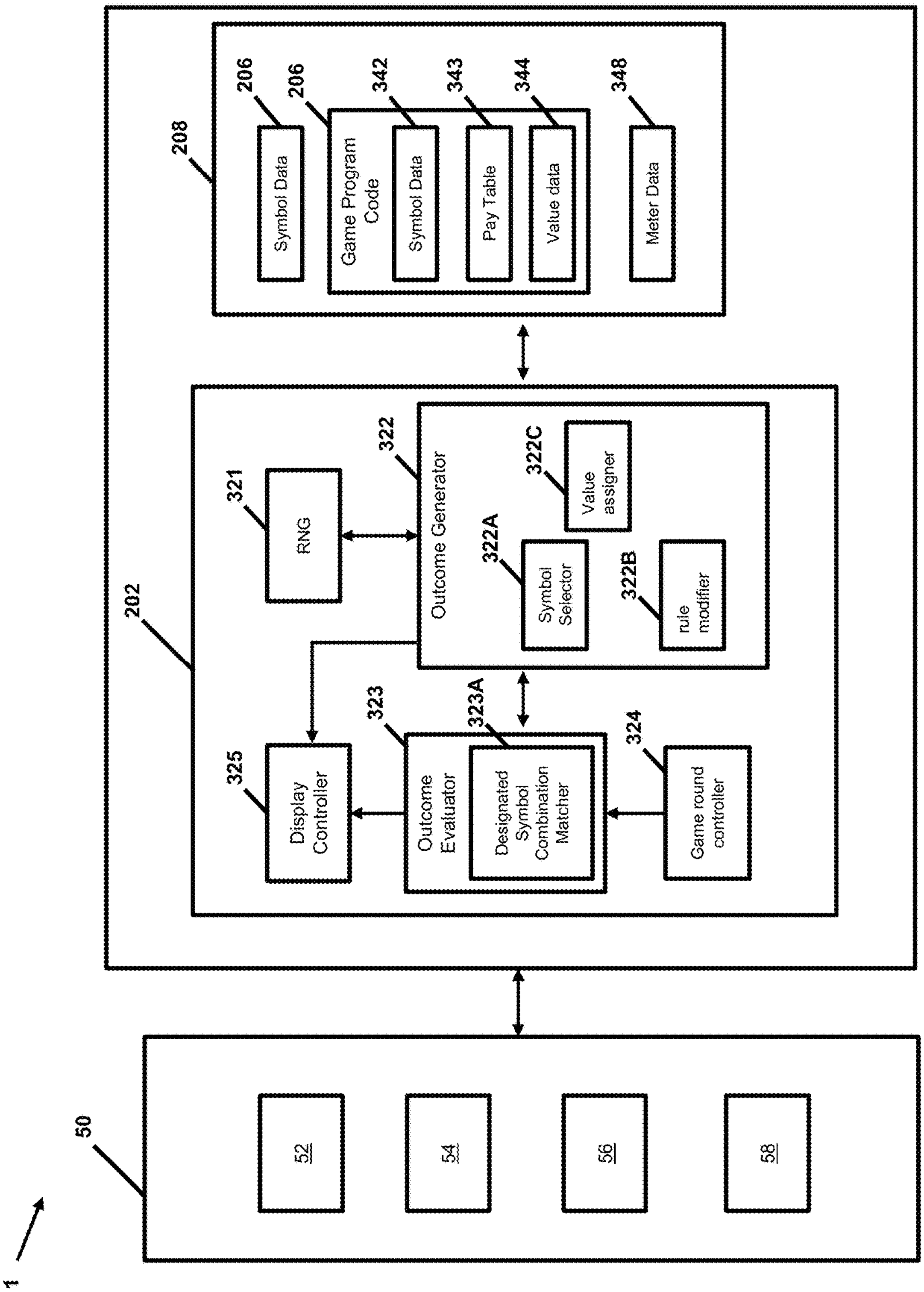
FIG. 3 is a further block diagram showing various functional elements of an embodiment of the game controller of FIG. 2A.

In FIG. 3, the processor 204 of game controller 202 of gaming device 200 is shown implementing a number of modules based on game program code 206 stored in memory 208. Persons skilled in the art will appreciate that several of the modules could be implemented in some other way, for example, by a dedicated circuit. The game controller 202 is an example of what may be referred to herein as a "control system." In some implementations, the control system also may include the memory 208. Other examples of control systems are disclosed herein.

According to this example, these modules include an outcome generator 322 which operates in response to the player's operation of player input buttons 236 to place a wager and initiate a play of the game and generates a game outcome which will then be evaluated by outcome evaluator 323. In some examples, the first part of forming the game outcome may be for a symbol selector 322A to select symbols from a set of symbols specified by symbol data 342 using a random number generator 321. The selected symbols may be advised to the display controller 325, which causes them to be displayed as a symbol display on primary game display 240 at a set of display positions.

In certain embodiments, the symbol data 342 includes one or more virtual reels that correspond to one or more reels displayed by the primary game display 240. The virtual reels may include an arrangement of symbols selected from symbol data 342 in, for example, a predetermined or random manner. The symbol selector 322A may select a stop position for the one or more virtual reels based on one or more outcomes of the random number generator 321. The stop position of the one or more reels then determines the symbols that are selected on the primary game display 240. In some alternative implementations, the functionality of one or more of the modules shown in FIG. 3 may be implemented in another device, e.g., in a server. For example, the functionality of the RNG 321, the outcome generator 322, the outcome evaluator 323 and/or the game round controller 324 may be implemented in a device that is configured for communication with the gaming device 200.

In the embodiment described below, the display positions of the symbol display are arranged in a rectangular matrix comprising a plurality of columns and a plurality of rows. However, other arrangements known in the gaming industry could be employed in embodiments of the disclosure. For example, in some arrangements, there are more symbols in some columns than in others, such as 3-4-3-4-3 arrangement of seventeen display positions corresponding to respective ones of five reels. In such arrangements, the columns of four symbols can be arranged so that they are off-set or staggered relative to the columns having two symbols so that the middle two symbols in the columns of four symbols share boundaries with two symbols of each neighboring reel.

Figure 4:
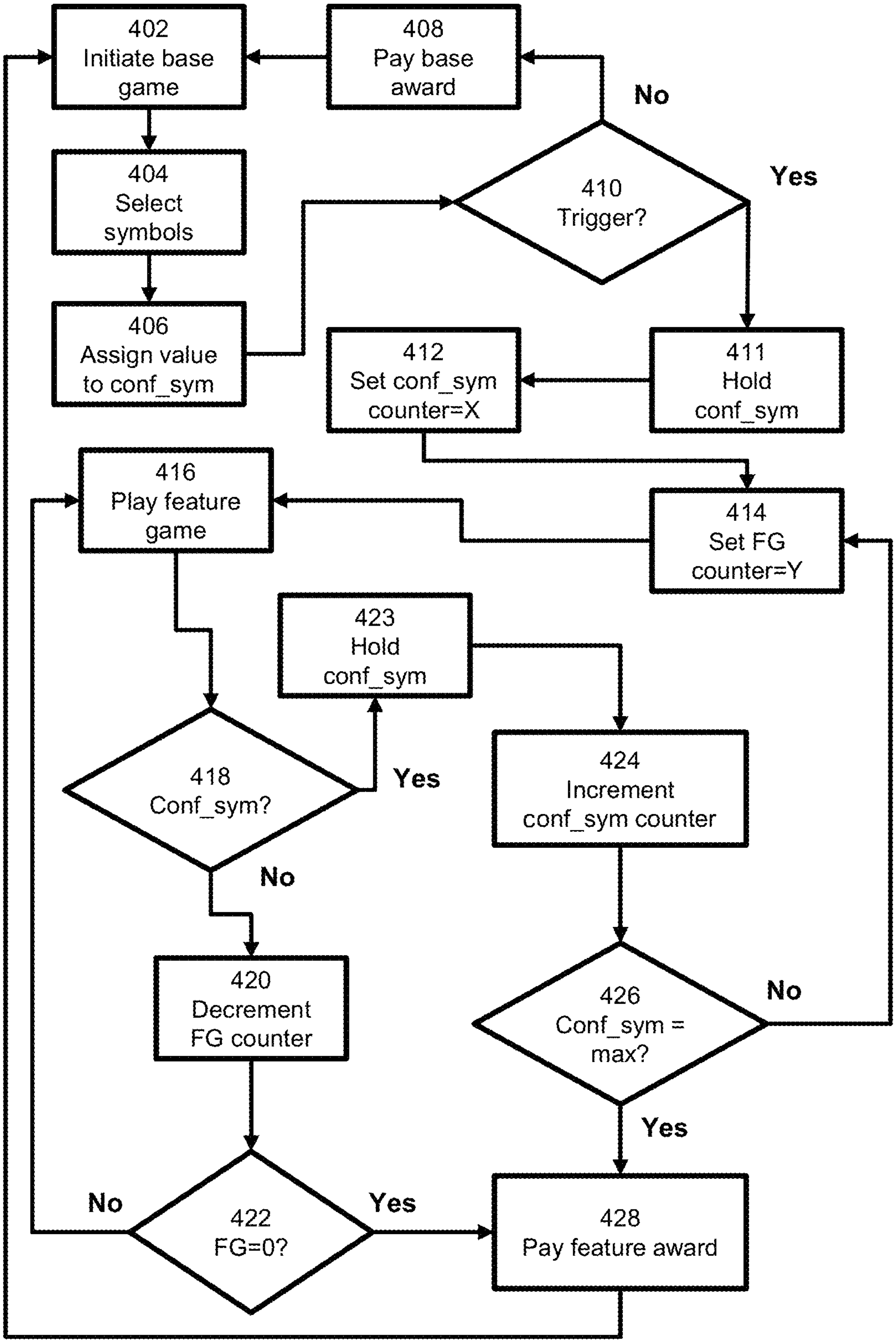
FIG. 4 is a flow diagram for an example embodiment of a process for operating the EGM of FIG. 2A in accordance with various aspects of the present disclosure.

FIG. 4 shows a flow diagram of one embodiment in which a feature game may be triggered from play of the base game at step 402. In this embodiment, the base game comprises using symbol selector 322A of FIG. 3 to select a plurality of symbols from a set of symbols to display at the respective display positions arranged on primary game display 240 at step 404. The set of symbols, which are stored as symbol data 342 in memory 208 according to this example, comprises a plurality of configurable symbols and non-configurable symbols.

Figure 6A:
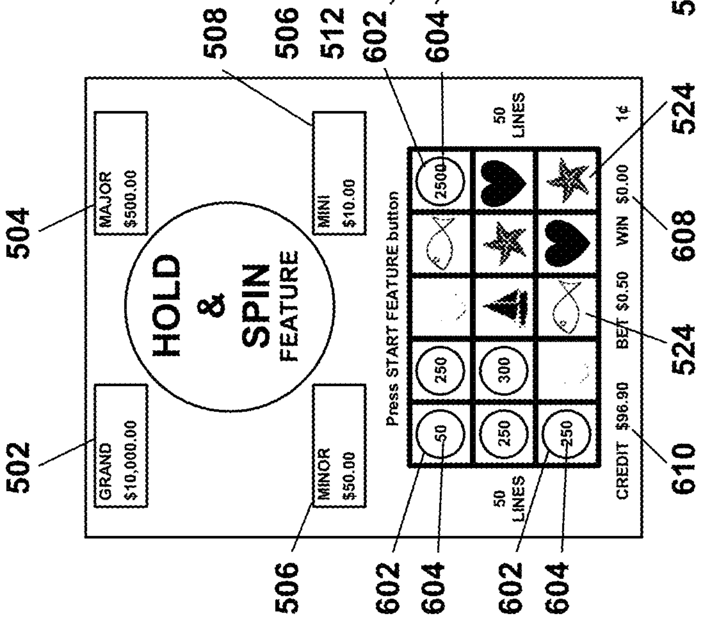
FIGS. 6A to 6C are screenshots of an embodiment of the feature game of FIG. 4.
Figure 6B:
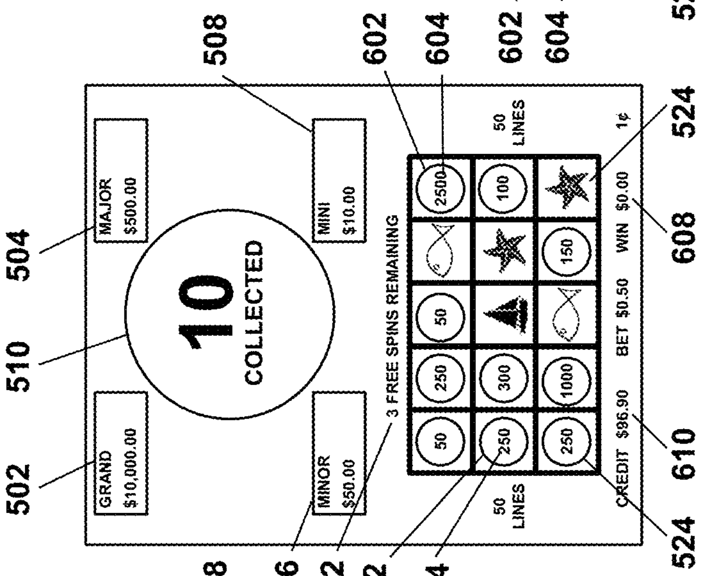
Figure 6C:
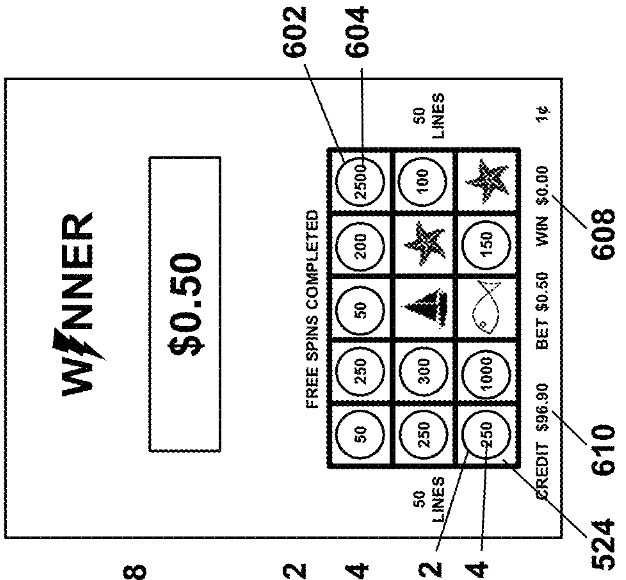
Figure 7B:
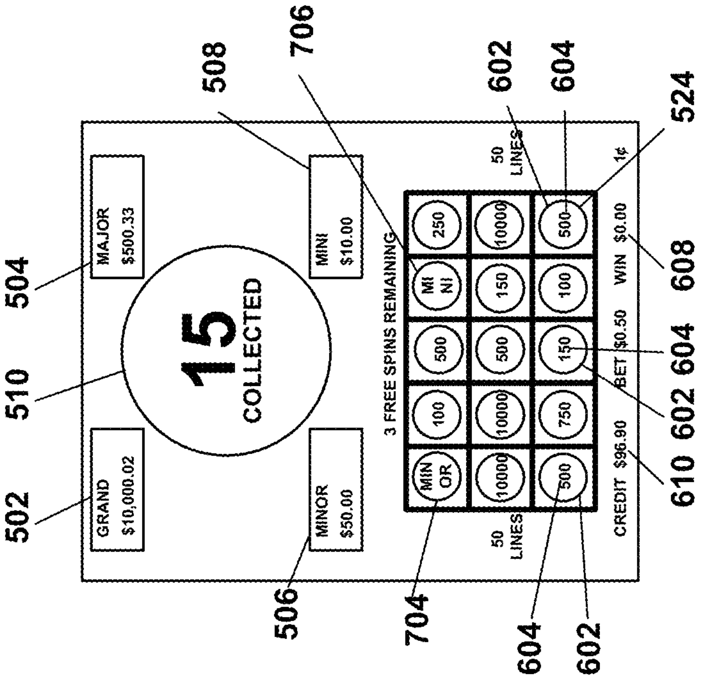
FIGS. 7A and 7B are screenshots of an embodiment of the feature game of FIG. 4, showing one of the progressive jackpots being awarded.
Figure 7A:
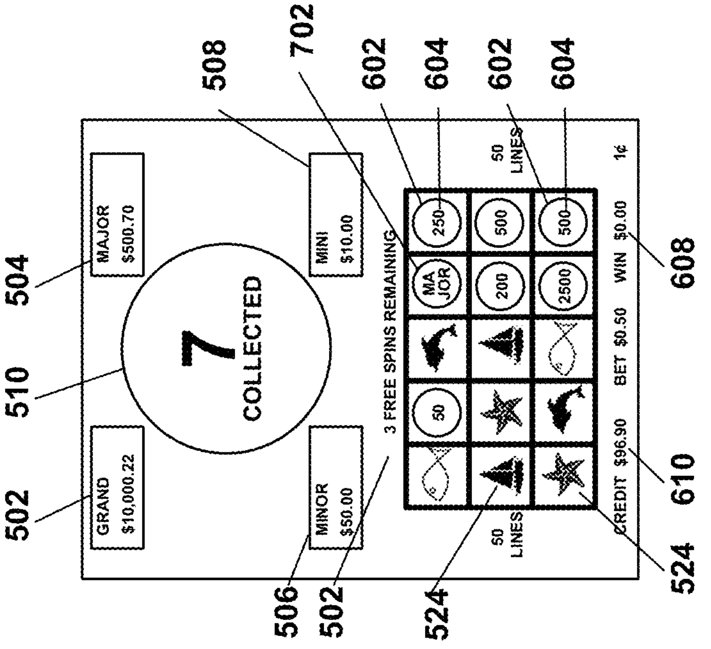

In an embodiment, the configurable symbols each comprise at least a common component and at least a variable component. The variable component is indicative of a value of a prize that is associated with each of the configurable symbols. An example of a configurable symbol is shown in FIGS. 6A-6C in the form of a pearl symbol. The common component is the pearl itself 602, while the variable component is the indicia 604 overlaying pearl 602. In this case, indicia are numerals directly indicative of the value of the prize. In other embodiments, as shown in FIGS. 7A-7B, the indicia indirectly indicates the value of the prize, such as "major" indicia 702, "minor" indicia 704 or "mini" indicia 706. It will be appreciated that the indicia can also be in other forms which may also be indicative of a prize. For example, a car icon indicates that the player has the opportunity to, or has, won a car. In some embodiments, the indicia may indicate only a portion of a prize. Continuing with the car example, the car icon may be split into four portions, each portion being assigned to a different configurable symbol. In such embodiments, all four portions of the car icon are required to be selected for display in order for the car prize to be won.

In some embodiments, at least one value of the respective prizes is generated by randomly selecting one of a plurality of defined multipliers that is applied to an amount wagered on the base game from which the feature is game triggered. According to some such embodiments, this may be accomplished at step 406 using value assigner 322C, which selects the predefined multipliers from value data 344 using a value obtained from the random number generator (RNG) 321, applies the multiplier to the initial wager to obtain a prize value and assigns the prize value to each of the configurable symbols selected by symbol selector 322A. The plurality of defined multipliers in some such embodiments may be selected at random according to a weighted probability based at least in part on the amount wagered on the base game. That is, the value assigner 322C may obtain a value from RNG 321 and may use this value to determine from the weighted table which value to assign to a configurable symbol. In an embodiment, the assignment of values to the configurable symbols is performed by the value assigner 322C after the symbols have been selected and the game controller knows they will be displayed but before they are displayed on the display. In another embodiment, the assignment occurs after the symbols have been displayed on display 240. In another embodiment, values are assigned to all configurable symbols irrespective of whether they will be displayed.

In this or other embodiments, at least one value of the respective prizes may comprise a defined value and/or a jackpot. As used herein, the term "jackpot," as opposed to "prize," refers to a progressive prize which accumulates over multiple plays of the base game and/or the feature game. As will be appreciated, the jackpot may be funded from a variety of sources including from only the gaming machine 200 itself, or from a plurality of gaming devices 200—a so-called "link". Furthermore, the jackpot may be triggered by any means known in the art, such as by using a mystery trigger or by using the Hyperlink™ system developed by the applicant.

In another embodiment, the variable prizes may be randomly selected (e.g., under the control of value assigner 322C) from a set of available prizes. Specific prizes may be weighted so as to control the probability of certain prizes occurring. In some embodiments, there may be a plurality of sets of prizes and the value assigner 322C may be configured to choose the set of prizes from which values will be randomly selected on the basis of a player's wager in the base game.

Returning to FIG. 4, at step 410, play of the base game is monitored (e.g., by the outcome evaluator 323) and it is determined whether a trigger event has occurred. In this embodiment, a trigger event occurs when six configurable symbols appear on primary game display 240. If a trigger event has not occurred, play of the base game continues and control reverts to step 402 once any awards are paid at step 408. However, if a trigger event does occur, the feature game (which may also be referred to herein as a "feature" or a "feature game round") initiates by first holding the configurable symbols in their respective display positions 524 at step 411. In this example, outcome generator 322 causes the feature game to be displayed on display 240 by retrieving symbol data 342 from memory 208 and passing the data to display controller 325, which controls display 240 to display the feature game. In other embodiments, more than or less than six symbols will be required to trigger the feature game. Alternatively, or additionally, the feature game may be modified in a way that is proportional to the number of configurable symbols that are displayed to trigger the feature game. For example, the average or total prize achievable in the feature game may be increased in proportion to the number of configurable symbols appearing.

Figure 5:
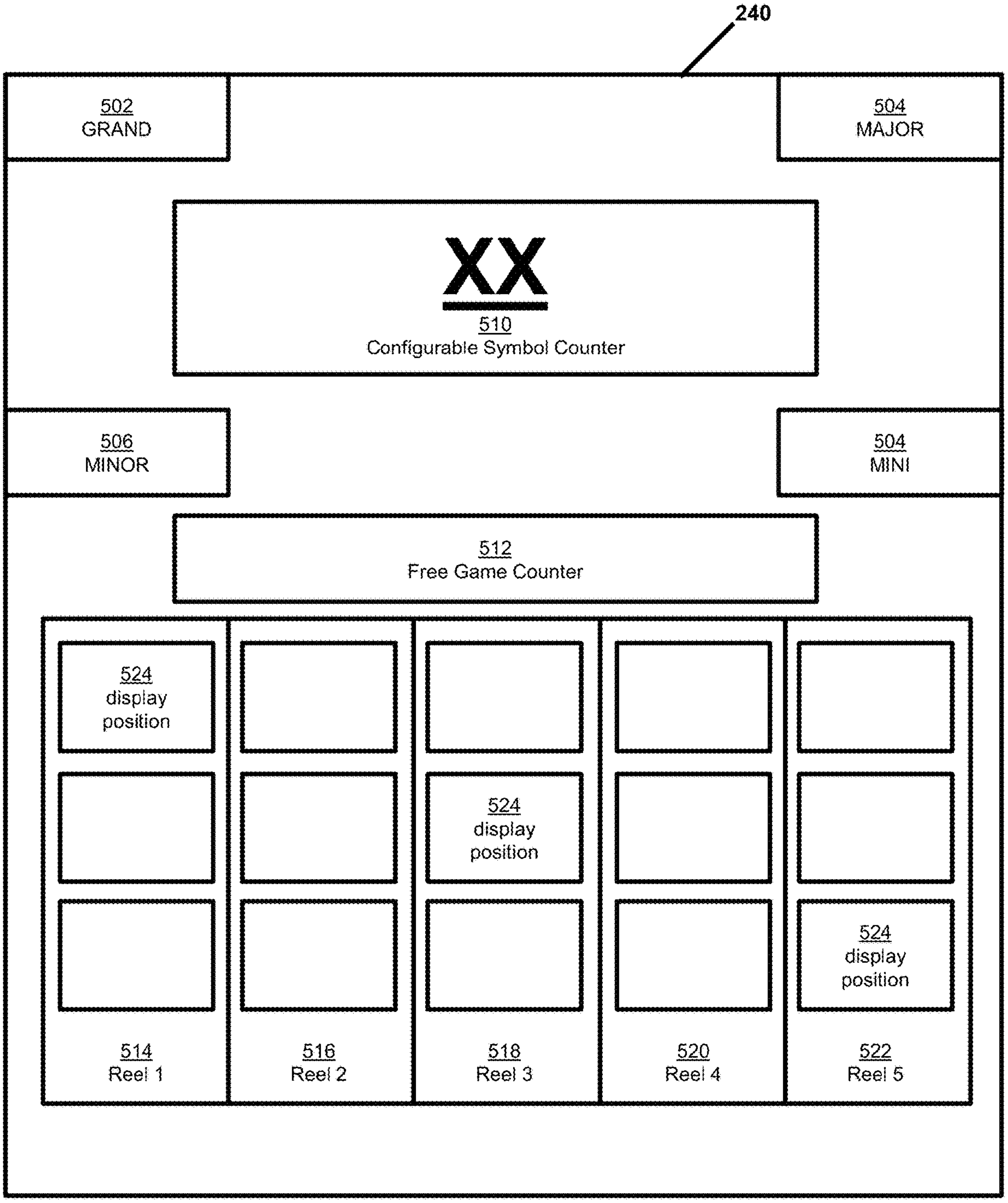
FIG. 5 is a representation of an example screen of the feature game of FIG. 4.

When the feature game starts, in various embodiments, the configurable symbol counter 510 of FIG. 5 is set to the number of configurable symbols that are held on reels 514-522 at step 412. In some embodiments, this is also the number of configurable symbols which originally triggered the feature game. That is, in some such embodiments, the configurable symbol counter 510 is initially set to 6, as six configurable symbols trigger the feature game. Alternatively, for example, if seven configurable symbols are selected for display, but only six are required for triggering the feature game, the configurable symbol counter 510 may be initially set to seven.

Once configurable symbol counter 510 is set, control moves to step 414 (FIG. 4) which sets free game counter 512 to the defined number of free games. In an embodiment, the preferred number of free games is three, so free game counter 512 is set to three. In other embodiments, the number of free games may be more than or less than three. For example, in some embodiments the number of free games may be 2, 4, 5, 6, 7 of 8. According to some implementations, the number of free games may be derived (e.g., by the game controller) from the number of configurable symbols that appear. For example, an additional free game may be offered for each configurable symbol that appears in addition to a predefined minimum number of configurable symbols (for example, six) that may be required to trigger the feature game.

Then, similar to the base game, symbols may be selected from symbol data (e.g., the symbol selector 322A may select symbols from symbol data 342) to be displayed in the other display positions 524 not already displaying a configurable symbol (e.g., via display controller 325) at step 416. Note that in certain embodiments, symbols in the feature game may be selected from a full set of available symbols (e.g., the full set of symbols defined by symbol data 342), including any configurable symbols. In other embodiments, the symbols may be selected from a reduced set of symbols taking into account any configurable symbols already held. For example, in one or more embodiments, only value symbols and blank symbols, i.e., a reel strip position not having any symbol, may be available for selection (e.g., by the symbol selector 322A). In an alternative embodiment, the symbols may be selected from an increased set of symbols. For example, symbols may be purchased or otherwise awarded for addition to the reel strip prior to initiating the feature game round. If one or more configurable symbols are selected, in this example value assigner 322C assigns randomly selected values to each configurable symbol.

According to this example, outcome evaluator 323 then monitors play of the feature game to determine whether a configurable symbol is selected and displayed at step 418. If a configurable symbol is not newly displayed, free game counter 512 is decremented by a defined amount, such as one, at step 420 in this example. In other embodiments, the free game counter 512 may be decremented by an amount, such as one, regardless of whether a configurable symbol is displayed.

If there are a number of free games remaining (for example, as determined by controller 202) at step 422, control returns to step 416 to continue the feature game round. On the other hand, once the number of free games is depleted, that is, when the free game counter 512 reaches zero, the feature game round ends and control returns to step 402 after any prizes are paid at step 428. In one embodiment, the accumulated value of all the individual prizes as indicated by the variable components of the collected configurable symbol is paid at step 428.

Returning to step 418, if it is determine (e.g., by outcome evaluator 323) that at least one configurable symbol is displayed on reels 514-522, then that symbol is held on the reel, at step 423, and the configurable symbol counter 510 is incremented at step 424. According to this example, it is then determined (e.g., by outcome evaluator 323) whether a defined number of configurable symbols has been displayed on reels 514-522 at step 426 and, if the defined number has been reached, a jackpot is paid at step 428.

The defined number of configurable symbols required to trigger a jackpot in certain embodiments is fifteen. That is, in certain embodiments in which a game is implemented using a 5×3 matrix, configurable symbols must be selected and displayed in all the matrix positions of reels 514-522. In other embodiments, the defined number may be more than or less than fifteen. For example, in a 3-4-3-4-3 matrix configuration as discussed above, the number of configurable symbols required to fill all matrix positions would be 17. In yet other embodiments, not all of the matrix positions need to necessarily be filled, and the number of configurable symbols required may be determined randomly.

In the above embodiments, the feature game ends when the Grand jackpot 502 is triggered at step 428. In other embodiments, the feature game round does not necessarily end at this point. In such embodiments, one or more of reels 514-522 are configured to expand and display additional configurable or non-configurable symbols when configurable symbol counter 510 reaches the defined number. For example, a game implemented using a 5×3 matrix may expand to a different configuration such as a 3-4-3-4-3 configuration. In such embodiments, a prize in addition to the Grand jackpot 502 is paid if configurable symbols are also selected for display in those additional positions.

Alternatively, if it is determined (e.g., by outcome evaluator 323) that the defined number of configurable symbols has not been reached at step 426, the feature game round may continue in some examples. In the embodiment of FIG. 4, each time a configurable symbol is displayed and the jackpot is not won, free game counter 512 is reset to the initial quantity by returning control to step 414, which, in this embodiment, is three as noted above. Therefore, the number of free games awarded by the outcome evaluator 323 is indefinite and is not determined by a defined limit.

In some embodiments, if no additional configurable symbols appear on reels 514-522 in any of the free games initially awarded, free games counter 512 is reset. Such embodiments ensure the player is guaranteed to win a prize over and above the prize payable for triggering the feature game.

In the above embodiments, the jackpot paid in response to configurable symbol counter 510 reaching the defined threshold is Grand prize 502. The Grand prize in this embodiment is a linked jackpot which receives contributions from a plurality of linked gaming machines and incremented based on the turnover of the linked machines. A linked jackpot may be a single site progressive (SSP), a multiple site progressive (MSP) or a wide area progressive (WAP). In some embodiments, a lower threshold of configurable symbols may be required for Major prize 504, Minor prize 506 or Mini prize 508 to be won. Alternatively or additionally, as shown in FIGS. 7A and 7B, Major, Minor and Mini prizes may be paid by assignment of those prizes to one of the configurable symbols, such as “major” indicia 702, “minor” indicia 704 or “mini” indicia 706.

Note that in some embodiments, one or all of the Grand prize 502, Major prize 504, Minor prize 506 and Mini prize 508 may be implemented as jackpots, as fixed bonus amounts that do not increment or as a mixture of both. In the embodiment of FIGS. 6A to 7B, as noted above, Grand prize 502 is implemented as a linked progressive jackpot, while Major prize 504 is implemented as a stand-alone progressive (SAP) jackpot which only takes contributions from the gaming machine itself, incrementing the jackpot as a function of turnover. Minor prize 506 and Mini prize 508 are implemented as fixed bonus amounts in proportion to the initial bet wagered. In some embodiments, Grand prize 502 may also be implemented as a SAP or the Major prize 504 may also be implemented as a linked jackpot.

This embodiment implements Grand prize 502 and Major prize 504 as jackpots and, while both may be awarded simultaneously, neither can be awarded more than once in the same feature game. However, in other embodiments, either jackpot may be won multiple times within the same feature game. In such embodiments, players are awarded a seed value (i.e., reset value) of the jackpot for subsequent triggers of that same jackpot.

As some embodiments of the feature game described above automatically adjust awards based on turnover and proportionality to the initial wager, such embodiments may be particularly suited to variable denomination games. Therefore, in some embodiments, controller 202 allows player selection of the minimum bet denomination. For example, before play of the game, controller 202 causes display controller 325 to output a message on display 240 requesting the player to select a minimum bet denomination. The player makes a selection through the game play mechanism 56 in response to which controller 202 adjusts the amount contributed to Grand prize 502 and Major prize 504 and the magnitude of Minor prize 506 and Mini prize 508. Controller 202 also adjusts the weightings of the values in value data 344 from which value assigner 322C may assign to the configurable symbols. In one embodiment, there are four denominations available for selection, 1 c, 2 c, 5 c, and 10 c. Those skilled in the art will appreciate that the denominations are not limited to four, but can include any suitable amount in any given currency. Note also that in this embodiment, while the selected denomination affects the magnitude of the Minor prize 506 and Mini prize 508, it does not affect the magnitude of the Grand prize 502 and Major prize 504.

Examples

More specific examples of embodiments of the present disclosure are now described with reference to FIGS. 6A to 7B. In general, as shown in these figures, the embodiment has a traditional 3×5 grid layout and is referred to in the examples below as the "hold and spin" feature.

Referring to FIG. 6A, the hold and spin feature is triggered when six (6) pearl symbols 602 are selected for display. When triggered, pearls 602 are held in their respective display positions, being all of column 1, column 2 at rows 1 and 2, and column 5 at row 1, and the controller 202 waits for a player instruction to initiate the game through player input buttons 236. In some embodiments, controller 202 will wait indefinitely while in other embodiments, controller 202 will wait for a predefined period of time before automatically initiating the game.

At this point, configurable symbol counter 510 is set to 6, and the player is guaranteed to win the accumulated value as indicated by the indicia 604 of the six pearls 602. That is, even before play of hold and spin starts, the player has won 3,600 credits in the embodiment of FIG. 6A.

Moving on to FIG. 6B, the player has spun an additional four (4) pearls 602. Accordingly, configurable symbol counter 510 is incremented from 6 to 10 and free games counter 512 is reset to the initial quantity, which is 3 feature games in this embodiment. As compared to FIG. 6A, the additional pearls 602 are selected for display at display positions C2R3, C3R1, C4R3 and C5R2, and are also held at those positions for the subsequent games. In various embodiments, instead of resetting the free games counter to the initial quantity, the free games counter is decremented by one for every spin that does not result in additional configurable symbols being displayed, and does not decrement by one when additional configurable symbols are displayed.

Over the remaining feature games, the player spins only one (1) additional pearl 602, displayed at C4R1, as shown in FIG. 6C. Accordingly, the free games end and the player wins the accumulated value of the values indicated on pearls 602. In this case, the total award is the 3,600 credits for the six (6) pearls 602 that originally triggered the hold and spin game, plus the additional five (5) pearls 602 selected during play of the hold and spin game—5,100 credits. In this embodiment, the accumulated award is totaled at the end of the hold and spin game and first transferred to the win meter 608 before being transferred to the credit meter 610 by the controller 202. Meter data 348 is adjusted accordingly before the next game can be initiated at step 402. In alternative embodiments, the accumulated award may bypass the win meter and be credited directly to the credit meter.

FIGS. 7A and 7B are examples showing the jackpots being won. In FIG. 7A, value assigner 322C has assigned "Major" indicia 702 to pearl 602, which has been selected for display at C4R1. This triggers Major prize 504 which, in one embodiment, is paid directly into credit meter 610 rather than first into win meter 608. That is, jackpot wins may be paid immediately when they are won rather than being accumulated at the end of the hold and spin game as per the other prizes described above. Thus in the FIG. 7A embodiment, Major jackpot 504 is paid when the associated pearl 602 is selected, while the remaining 4,000 credits will be accumulated and paid at the completion of the feature game, in addition to any new pearls 602 that are selected and displayed in the remaining free games. In alternative embodiments, the Major jackpot may be accumulated at the end of the feature game along with the other 4,000 credits, and the accumulated total may be paid first into win meter 608 or directly into credit meter 610.

FIG. 7B shows Grand jackpot 502 being triggered, as fifteen (15) pearls 602 have been selected for display in the matrix by the end of the feature game. Again, the Grand prize 502 is first accounted for and paid directly into credit meter 610, and the remaining prizes indicated by indicia 604 on pearls 602 are then accumulated and paid into win meter 608 before being transferred to credit meter 610. Therefore, in this FIG. 7B embodiment, the total winnings is made up of the initial Grand jackpot 502, plus 33,560 credits indicated by indicia 604 and Minor prize 506 and Mini prize 508 indicated by "Minor" indicia 704 and "Mini" indicia 706. Again, in alternative embodiments, the Grand jackpot may be accumulated at the end of the feature game along with the other 33,560 credits, Minor prize 506 and Mini prize 508, and the accumulated total may be paid first into win meter 608 or directly into credit meter 610. In various embodiments, since all available symbol display positions display the configurable symbols, e.g., pearls, at the end of the feature game, an additional prize such as a multiplier may be applied. The multiplier may be predetermined, such as a 2× multiplier, or randomly determined.

In another example, the configurable symbols may only be provided during part of the game, such as a feature game. In another example, after a feature game is triggered, a feature game may be initiated (e.g., by the game controller 202) using different reels to those used in the base game. Depending on the embodiment, the trigger may be the configurable symbol trigger described above or some other trigger, e.g., a symbol combination. In this example, in the feature game, individual reels are associated with each of the symbol display positions. That is, if there are fifteen symbol display positions, fifteen reels are used. Each of the reels may include a mixture of non-configurable symbols and configurable symbols. Before the free games, in some examples the configurable symbol counter is set to zero and none of the configurable symbols that trigger the free game are held over to the free game. In the first free game, the symbol selector determines stopping positions for all of the reels in some such examples. If any of the reels are stopped with a configurable symbol in place, that configurable symbol may be held in position by holding/locking the reel (i.e., not spinning the reels in a subsequent free game). That is, in subsequent free games according to this example, only the reels corresponding to symbol positions where a configurable symbol has not been displayed are re-spun. Each configurable symbol is assigned a value by value assigner by selecting a prize value from a set of prize values. The set of prize values from which values are selected depends on the player's wager in the base game. As in the example described above, a player is awarded the sum of the values of the configurable symbols at the end of the free games and may be awarded an additional prize such as a jackpot prize depending on what value the counter reaches during the free games.

In various embodiments, the prize value of each of the configurable symbols is predetermined on the basis of a selected wager amount and/or selected denomination value. In various embodiments, the prize value of each of the configurable symbols is determined (e.g., by the game controller 202) in response to a wager. In certain of these embodiments, the prize value may be determined on the basis of the selected wager amount and/or selected denomination.

In another example, the configurable symbol may have an alternative visual representation, for example, a door which opens once the configurable symbol is displayed in a display position to reveal the assigned prize value.

As indicated above, the method may be embodied in program code. The program code could be supplied in a number of ways, for example, on a non-transitory computer readable storage medium, such as a disc or a memory device, e.g. an EEPROM, (for example, that could replace part of memory 103). In some examples, the program code may be provided via data signals (for example, by transmitting the program code from a server). Further, different parts of the program code can be executed by different devices, for example, in a client-server relationship. Persons skilled in the art will appreciate that program code provides a series of instructions executable by a control system, e.g., via one or more processors.

Repeater Symbols & Mystery Symbols

FIGS. 8A to 8M are screen shots of a display, such as the primary game display 240, at different phases during play of a base game and an ensuing feature game according to an embodiment of the present disclosure. Instead of a pearl as described above, the configurable symbol in this embodiment is illustrated as a rectangle overlying a diamond. As will be appreciated, the configurable symbols can take a variety of other forms in accordance with the theme of the underlying game.

Figure 8A:
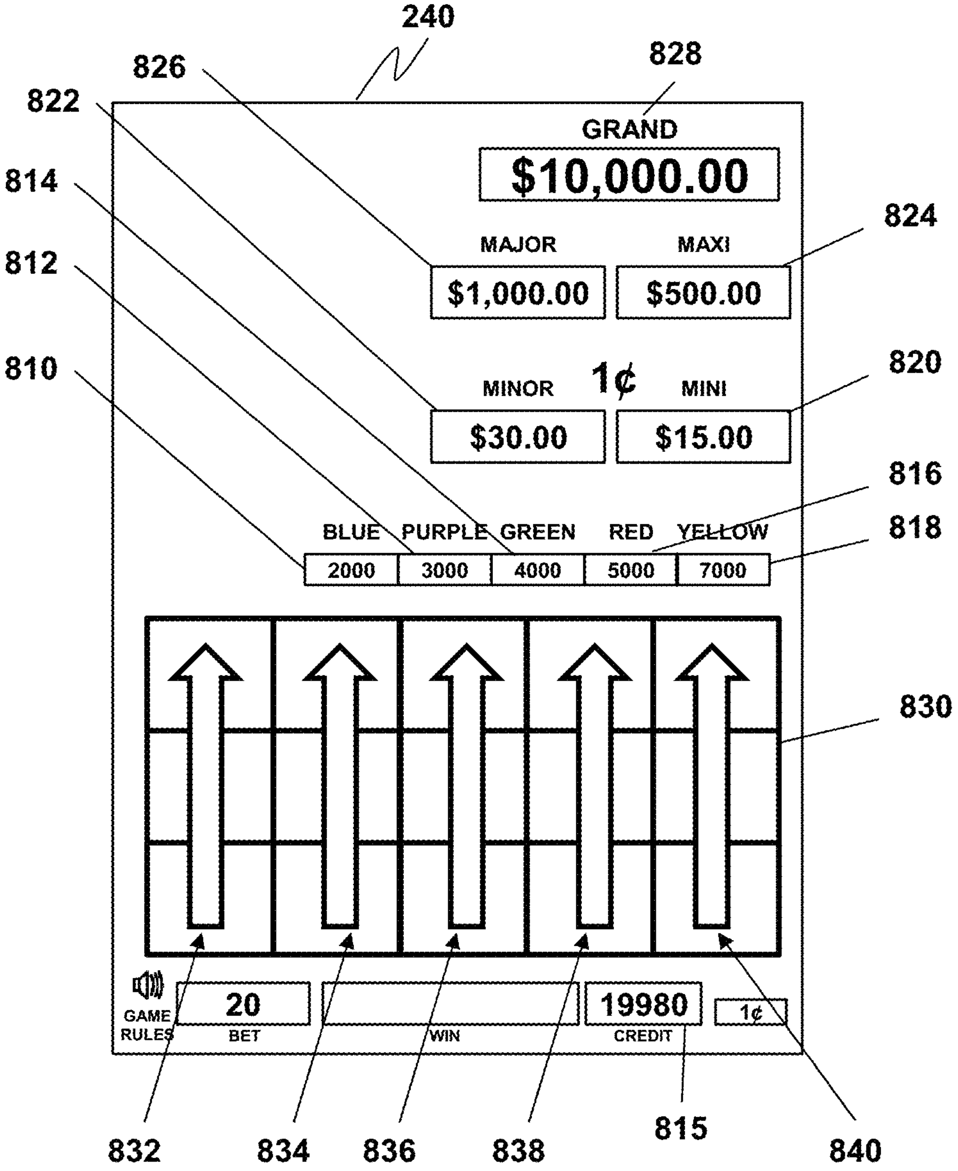
FIGS. 8A to 8M are screen shots of another embodiment of a feature game.
Figure 8B:
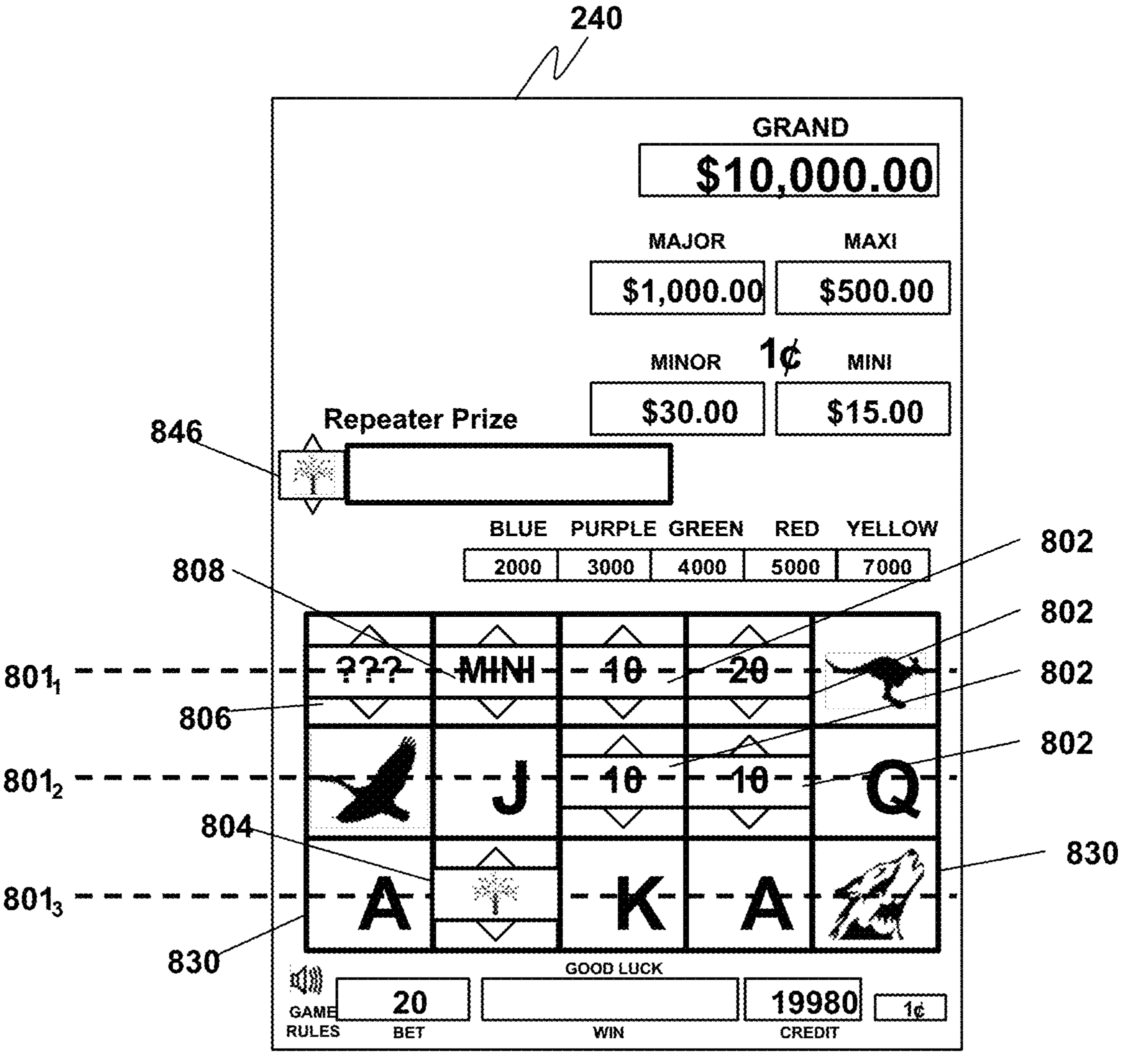

In this embodiment, there may be multiple types of configurable symbols, including value symbols 802 (see, e.g., FIG. 8B), repeater symbols 804 (see, e.g., FIG. 8H), mystery symbols 806 (see, e.g., FIG. 8B), and jackpot symbols 808 (see, e.g., FIG. 8B). Each value symbol 802 displays a numeric value, e.g., a number of credits or currency. The repeater symbol 804 and mystery symbol 806 each display a respective generic symbol but no associated value. In the illustrated embodiment of FIG. 8B, the repeater symbol 804 displays a tree and the mystery symbol 806 displays question marks. Each jackpot symbol 808 displays the name of a particular jackpot, e.g., a MINI jackpot 820, MINOR jackpot 822, MAXI jackpot 824, MAJOR jackpot 826 or GRAND jackpot 828.

In various embodiments, there may be different levels of the configurable symbols that allow a player to play for different payout levels, for example. The illustrated embodiment, for example, includes 5 different levels of configurable symbols that are designated by different colored configurable symbols, namely, blue configurable symbols 810, purple configurable symbols 812, green configurable symbols 814, red configurable symbols 816, and gold configurable symbols 818.

The color level that is played during a game may be selected based on a player input, such as a betting denomination or an ante bet. In an embodiment, the player places a base bet and in addition may make an ante bet, where the amount of the ante bet entitles the player to increased values on the value symbols and/or different levels of configurable symbols. In the illustrated embodiment, there are five different ante bets where each is associated with a different colored configurable symbol. Larger ante bets entitle the player to configurable symbols with larger credit values and larger jackpot symbols. For example, a first ante bet amount may be associated with blue configurable symbols that carry values up to 2000 credits and MINI jackpot symbols, a second ante bet amount may be associated with purple configurable symbols that carry values up to 3000 credits and MINOR jackpot symbols, a third ante amount bet may be associated with green configurable symbols that carry values up to 5000 credits and MAXI jackpot symbols, a fourth ante bet amount may be associated with red configurable symbols that carry values up to 5000 credits and MAJOR jackpot symbols, and a fifth ante bet amount may be associated with gold configurable symbols that carry values up to 7000 credits and Grand jackpot symbols. Other ranges of values may be used, as will suggest itself. Thus, the player makes an ante bet that causes the reels to carry configurable symbols in a particular range of values.

In addition, the player may select a particular denomination from a plurality of denominations. For example, the player may select a denomination of 1 cent, 2 cents, 5 cents or 10 cents. In some embodiments, the number of configurable symbols required to trigger the feature game may vary depending on the denomination selected by the player. For example, a selection of a denomination of 1 cent or 2 cents may require 6 (six) configurable symbols to appear in the base outcome in order to trigger the feature game, while a denomination selection of 5 cents or 10 cents may cause the feature game to be triggered when 5 (five) configurable symbols appear in the base game outcome.

Alternatively, the selection of the denomination may provide some kind of incentive with respect to some element of the game. For example, a selection of a high denomination may add a new jackpot to the game, or may add more spins to the feature game.

Alternatively, when an ante bet is made, rather than providing configurable symbols of only one color level, e.g., blue, the ante bets may provide multiple levels of configurable symbols, e.g., both blue and purple. That is, an ante bet of 1 credit may cause a selection of blue configurable symbols, while an ante bet of 2 credits will cause a selection of both blue and purple configurable symbols; while an ante bet of 3 credits will cause a selection of blue, purple, and green configurable symbols. All 5 types of configurable symbols may be provided with a particular ante bet.

FIGS. 8A and 8B illustrate the primary game display 240 during play of the base game. Briefly, the display 240 presents a game outcome using a 3×5 display matrix 830, where each column represents a different reel 832-840. The reels 832-840 are displayed as spinning and then stopping to present the matrix of display symbols representing a game outcome. FIG. 8A illustrates the reels spinning and FIG. 8B illustrates the reels in their stopped position to provide a base game outcome.

While the display matrix 830 is described in the context of a spinning reel game, it will be appreciated that display matrix 830 may be used in other types of games. For example, particularly in the context of a video display, the display matrix 830 may be presented and populated by symbols without providing any representation of reels spinning.

During play of the base game, the gaming device 200 may utilize one or more paylines to determine whether the display matrix 830 contains any winning symbol combinations. In particular, a gaming device 200 may provide one or more paylines and may allow the player to make a wager on each payline in a play of the primary game. For example, the gaming device 200 may include 1, 3, 5, 9, 15, 25, or some other number of paylines upon which the player may wager or otherwise activate. The gaming device 200 may allow players to make wagers of substantially different amounts on each play of the primary or base game ranging, for example, from one credit up to 125 credits (e.g., five credits on each of 25 separate paylines).

The paylines may be horizontal (see, e.g., paylines $\mathbf{801}_1$, $\mathbf{801}_2$, $\mathbf{801}_3$ of FIG. 8B), vertical, circular, diagonal, angled, zigzagged, or any combination thereof. Each payline identifies a subset of symbols or display positions of the display matrix 830. For example, FIG. 8B depicts an embodiment having three horizontal paylines $\mathbf{801}_1$, $\mathbf{801}_2$, $\mathbf{801}_3$. The top payline 8001 corresponds to the top row of display positions in the display matrix. The center payline $\mathbf{800}_2$ corresponds to the center row of display positions in the display matrix. The bottom payline $\mathbf{80}_3$ corresponds to the bottom row of display positions. In some embodiments, paylines $\mathbf{801}_1$, $\mathbf{801}_2$, $\mathbf{801}_3$ are selectively activated based on, for example, a player's wager or gaming outcomes. In such embodiments, the gaming device 200 may only award prizes or trigger game events based on symbols aligned with activated paylines $\mathbf{801}_1$, $\mathbf{801}_2$, $\mathbf{801}_3$.

The value of the mystery symbol may be determined and revealed at any time following its appearance in a game outcome. For example, in some embodiments, mystery symbols may be available during both the base game and the feature game. If a mystery symbol appears as part of a triggering game outcome in a base game, its value may be determined and revealed prior to initiation of the feature game so that the determined value of the mystery symbol may be included in the values accumulated to determine the repeater prize value. Alternatively, in some embodiments, the value of one or more of the mystery symbol(s) may not be determined and revealed until the feature game is completed.

Figure 9A:
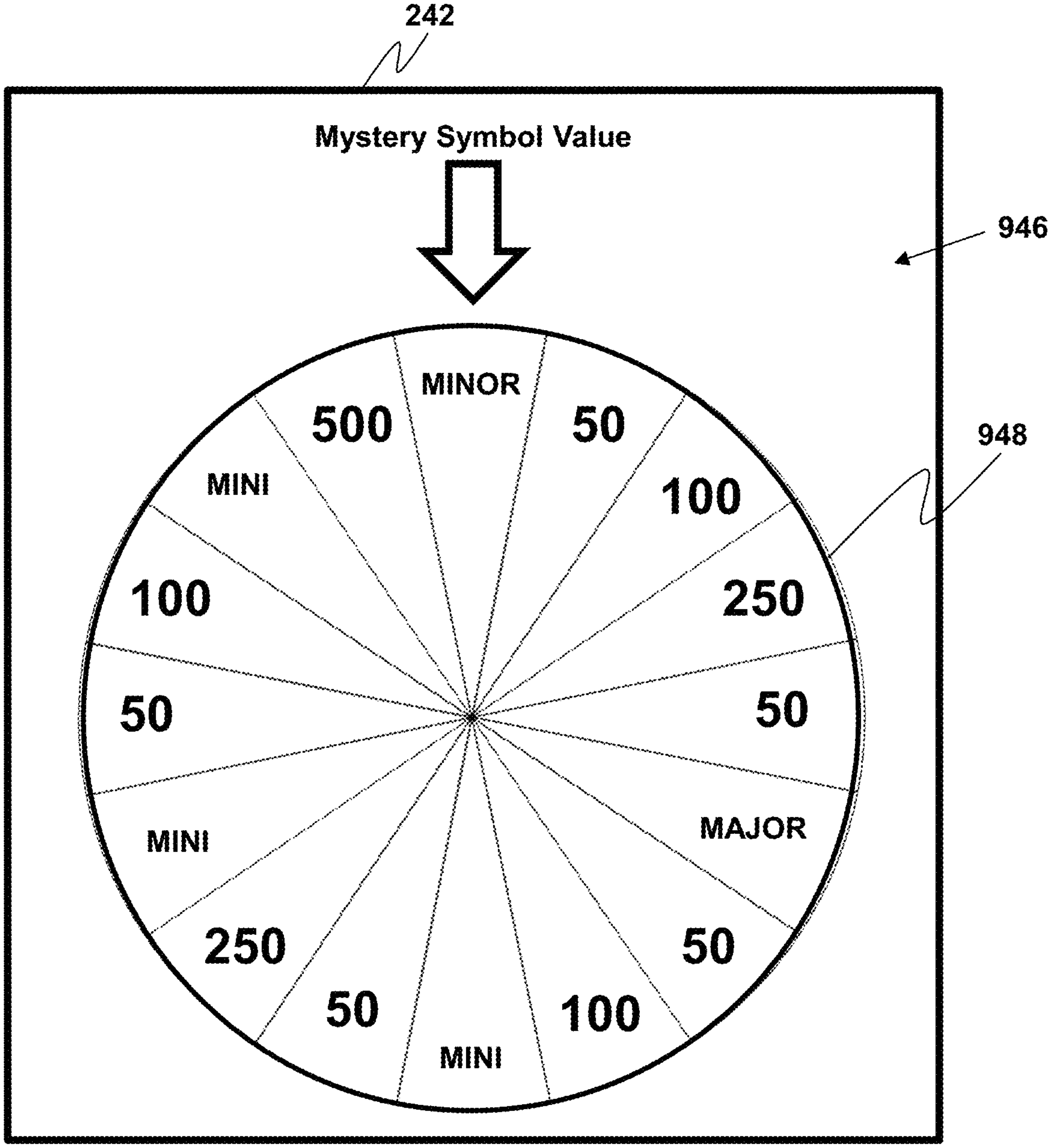
FIGS. 9A and 9B are screenshots of first and second spinning wheel games that may be employed in certain embodiments of the present disclosure.

In some embodiments, the value of the mystery symbol may be determined using a first valuation game, which may, for example, be in the form of a first spinning wheel game. The first spinning wheel game may be presented via a spinning wheel display 946 (see, e.g., FIG. 9A). The first spinning wheel display 946 includes a segmented wheel 948, where each wheel segment displays a numeric value (e.g., a number of credits or currency) or a jackpot label (e.g., MINI, MINOR, MAXI, MAJOR, and GRAND). The wheel 948 is shown as spinning and stopping (randomly) at one of the segments to indicate the value that is to be awarded for the mystery symbol. The indicated value is then used to replace the question marks on one or more of the displayed mystery symbols. The spins during the first spinning wheel game may occur automatically or the player may be prompted to spin the wheel. In some embodiments, a single random determination (e.g., wheel spin) may be used to set the value for all of the displayed mystery symbols. Alternatively, the values of each mystery symbol may be separately determined or determined in subgroups. In some embodiments, the first spinning wheel display 946 (or other valuation game) may be displayed to the player on the secondary game display 242, for example. Alternatively, the first spinning wheel display 946 (or other valuation game) may be presented on the primary game display 240, for example.

In other embodiments, the value of the mystery symbols may be set in other ways. For example, there may be a player skill feature where the skill level of the player is determined or is based on particular data regarding the particular player, and the value of the mystery symbol is set accordingly. Also, a selection mechanic may be used to determine the value of the mystery symbol where a quantity of selections are displayed to the player and the player may select one or more of the displayed selections via the input device. Further, in various embodiments, the value of the mystery symbol may be randomly determined without any player input or a valuation game. Also, different levels of mystery symbols may be used, such that some levels are of higher average value than others. For example, red mystery symbols may use a red wheel with lower average values and gold mystery symbols may use a gold wheel with higher average values.

As discussed above, a hold and spin feature game is triggered when a determined number of configurable symbols appear in the outcome of a base game. For illustration purposes, a feature game is triggered when six (6) of the configurable symbols appear in the base game outcome. Accordingly, in addition to evaluating the base game outcomes for winning symbol combinations, the gaming device 200 also evaluates the base game outcome to determine whether the base game outcome triggers the feature game, e.g., because it includes at least six (6) configurable symbols. In this regard, the base game outcome shown in FIG. 8B triggers the feature game because it includes 6 (six) configurable symbols in the form of a mystery symbol 806, a MINI jackpot symbol 808 and four value symbols 802 (10 credits, 10 credits, 10 credits and 20 credits).

As discussed above, the configurable symbols may also include repeater symbols whose value is not determined until a feature game is triggered. When a feature game is triggered, the gaming device 200 determines the value of repeater prize to be assigned to the repeater symbols based on the value(s) of one or more of the configurable symbols that triggered the feature game. In a preferred embodiment, the value of the repeater prize is determined by summing (accumulating) the values of the configurable symbols that triggered the feature game.

In various embodiments, the value of the repeater prize is determined by summing some of the values of the configurable symbols that triggered the feature game. In various other embodiments, the value of the repeater prize is determined by summing some or all of the values of the configurable symbols that are displayed at the conclusion of the feature game. In some of these embodiments, a multiplier may be randomly determined, predetermined, selected by a player using a selection mechanic, determined using a skill or pseudo-skill game.

In various embodiments, the feature game is triggered with configurable symbols except that the repeater symbol may not count to trigger the feature game. During play of the feature game, one or more repeater symbols can be displayed. The value of the repeater prize can then be determined when the repeater symbol is first displayed in the feature game by summing the prize values of all of the other configurable symbols displayed in the feature game when the repeater symbol is first displayed.

When the triggering symbols include one or more mystery symbols, as in the illustrated example, the gaming device may determine the value(s) of any mystery symbols, e.g., via the first valuation game, before determining the value of the repeater prize. In this regard, the value of the mystery symbol 806 has been updated in FIG. 8C to reflect the awarding of a MINI jackpot by the mystery symbol valuation game. Accordingly, in the example, the value of the repeater prize is 3050 credits, which is the sum (1500+1500+10+10+10+20) of the six (6) configurable symbols that triggered the feature game. (Note, in the illustrated embodiment, the MINI jackpot has a value of $15.00 and the game is a 1 cent game where each credit has a value of 1 cent. Accordingly, the MINI jackpot symbol has a corresponding value of 1500 credits.

Figure 8C:
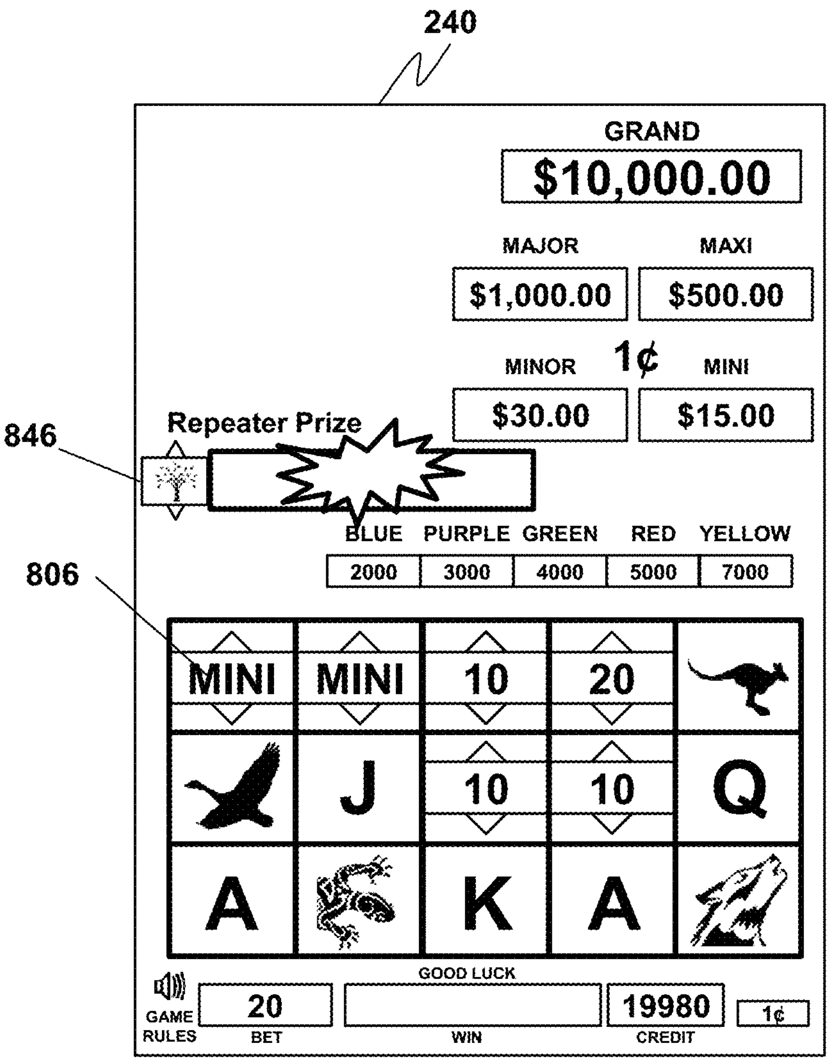
Figure 8D:
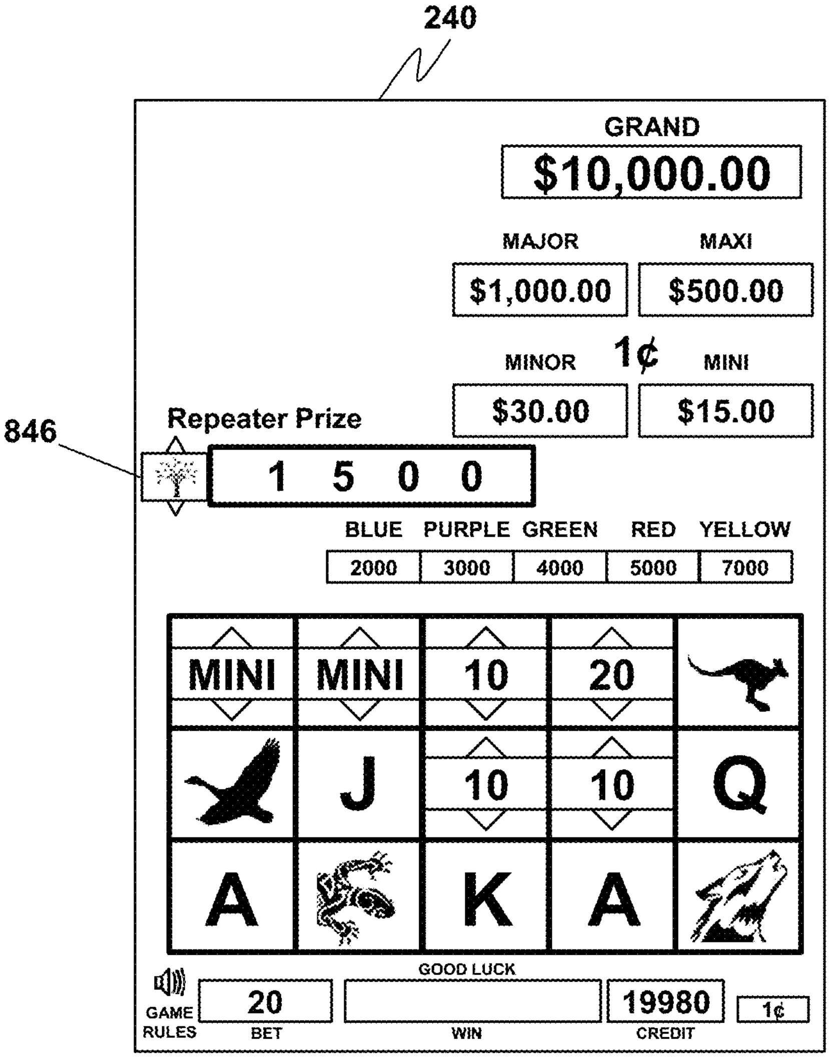
Figure 8E:
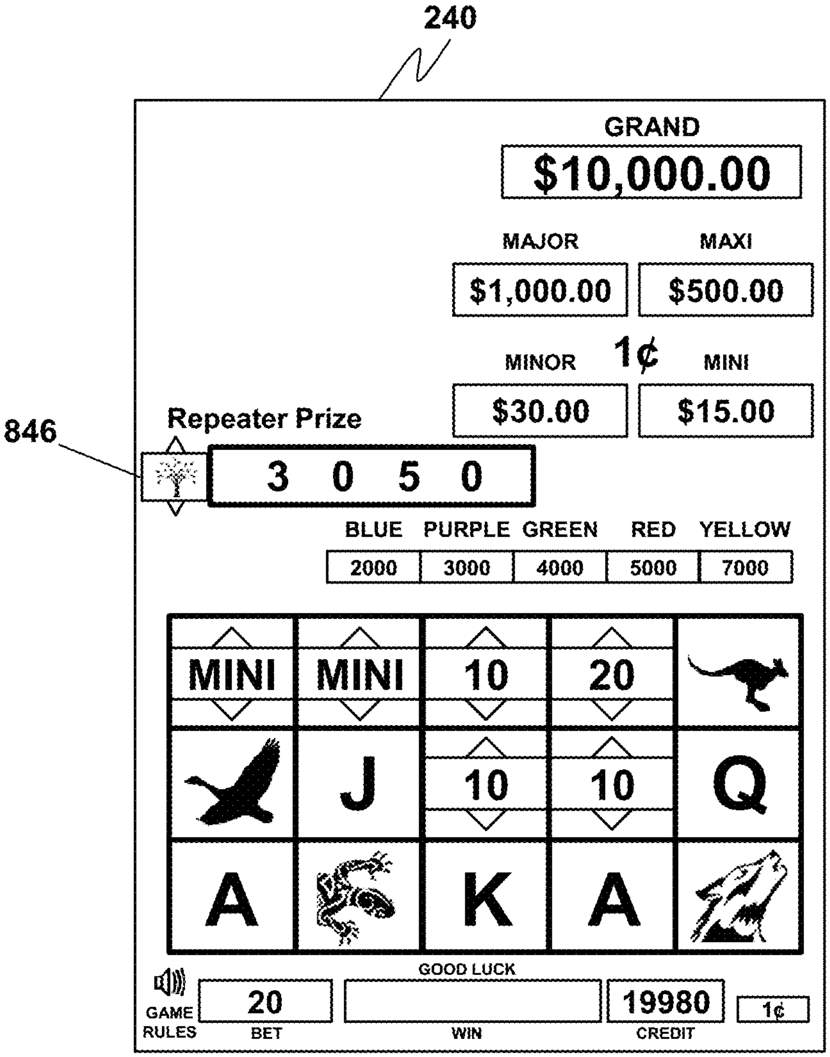

An animation may be provided to visually display the credits being accumulated (or summed) from the triggering symbols to determine the value of the repeater prize during the ensuing feature game. For example, as is shown in FIGS. 8C and 8D, the animation may display rockets (not shown) or other elements sequentially moving from each respective configurable symbol to a repeater prize meter 846. When a respective rocket reaches the meter, it may explode and the value from the originating configurable symbol may be added to the repeater prize meter. For example, in FIG. 8C, a rocket moves from a MINI jackpot prize symbol 808 to the repeater prize meter 846 where it explodes. FIG. 8D shows the repeater prize meter 846 updated to reflect that the 1500 credits (the value of the MINI jackpot) have been accumulated towards the repeater prize. The animation may continue with rockets shooting from each of the individual configurable symbols until all of the credits have been accumulated to the repeater prize meter, see, e.g., FIG. 8E where the repeater prize meter 846 displays 3050 credits.

Figure 8F:
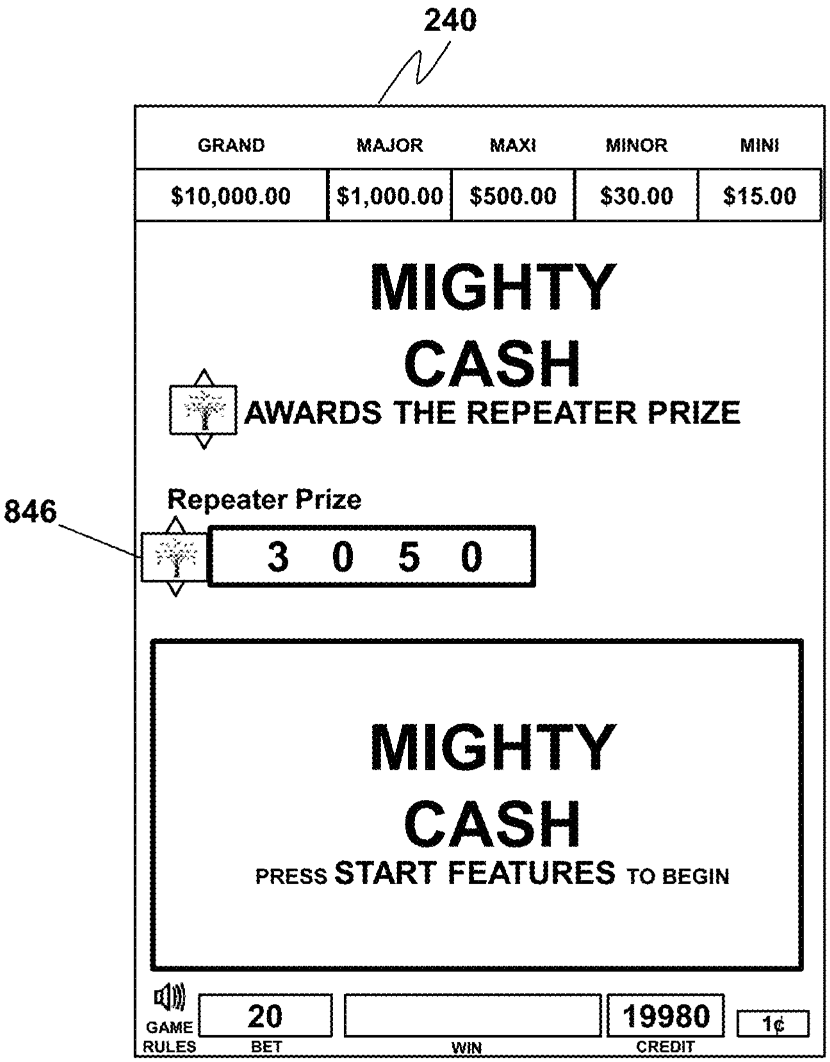

The game then transitions to the feature game. FIG. 8F is a screen shot of a transition screen that may be shown on the display 240 when transitioning from the base game to the feature game. The transition screen may prompt the player to make an input, such as to press a start button to begin the feature game.

FIGS. 8G to 8M are screen shots illustrating play of the feature game. The feature game is in the form of a hold and spin game in which any configurable symbols from the triggering game outcome are retained on the display and the player is awarded an additional number of spins (e.g., 6 in the illustrated example) during which the player tries to accumulate more of the configurable symbols. The display includes a spin counter 858 that displays an indication of the number of spins remaining in the feature game. The display may also include a configurable symbol counter 852 (see, e.g., FIG. 8H) that displays the number of configurable symbols that have been collected by the player. The configurable symbol counter may be initially set following the triggering game outcome and may be updated following each spin during the feature game.

Figure 8G:
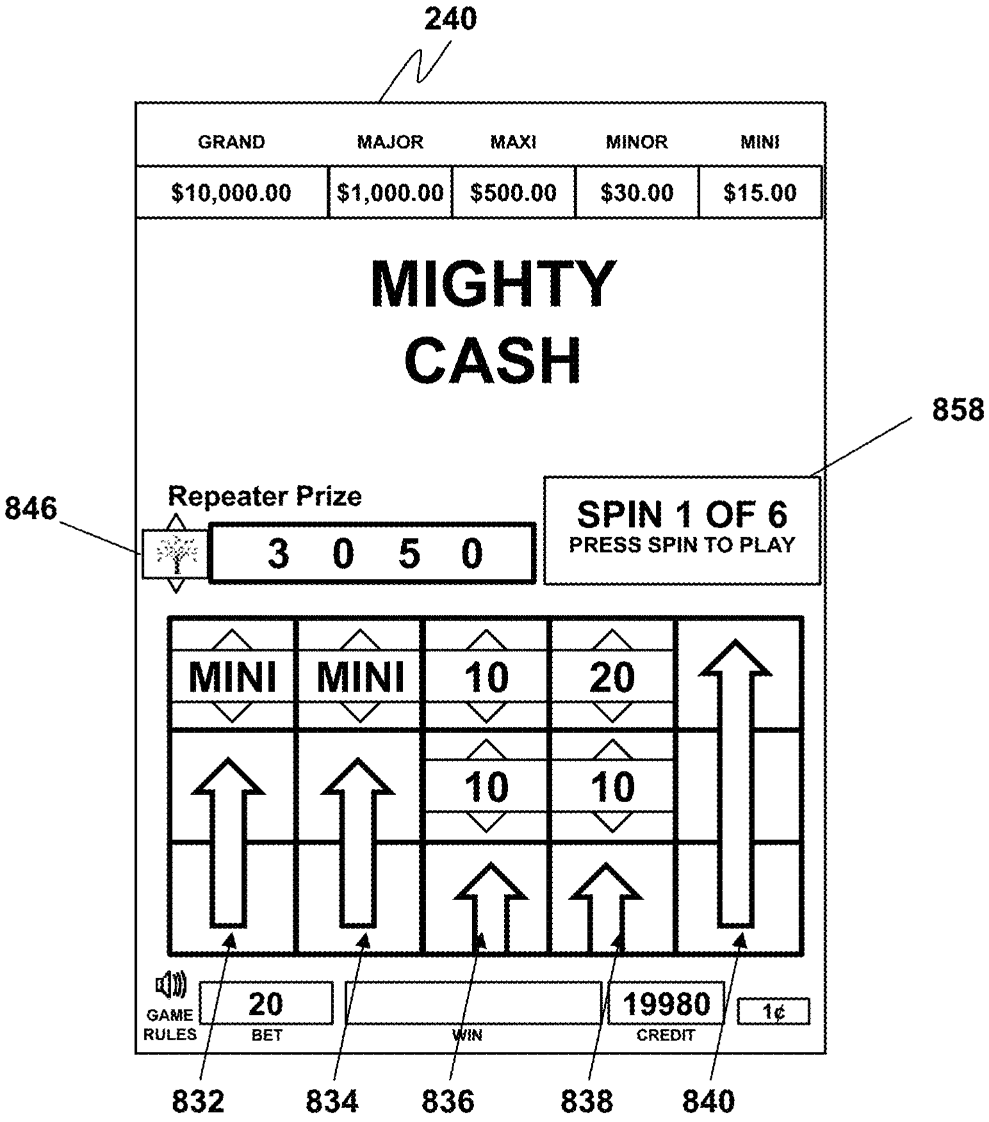
Figure 8H:
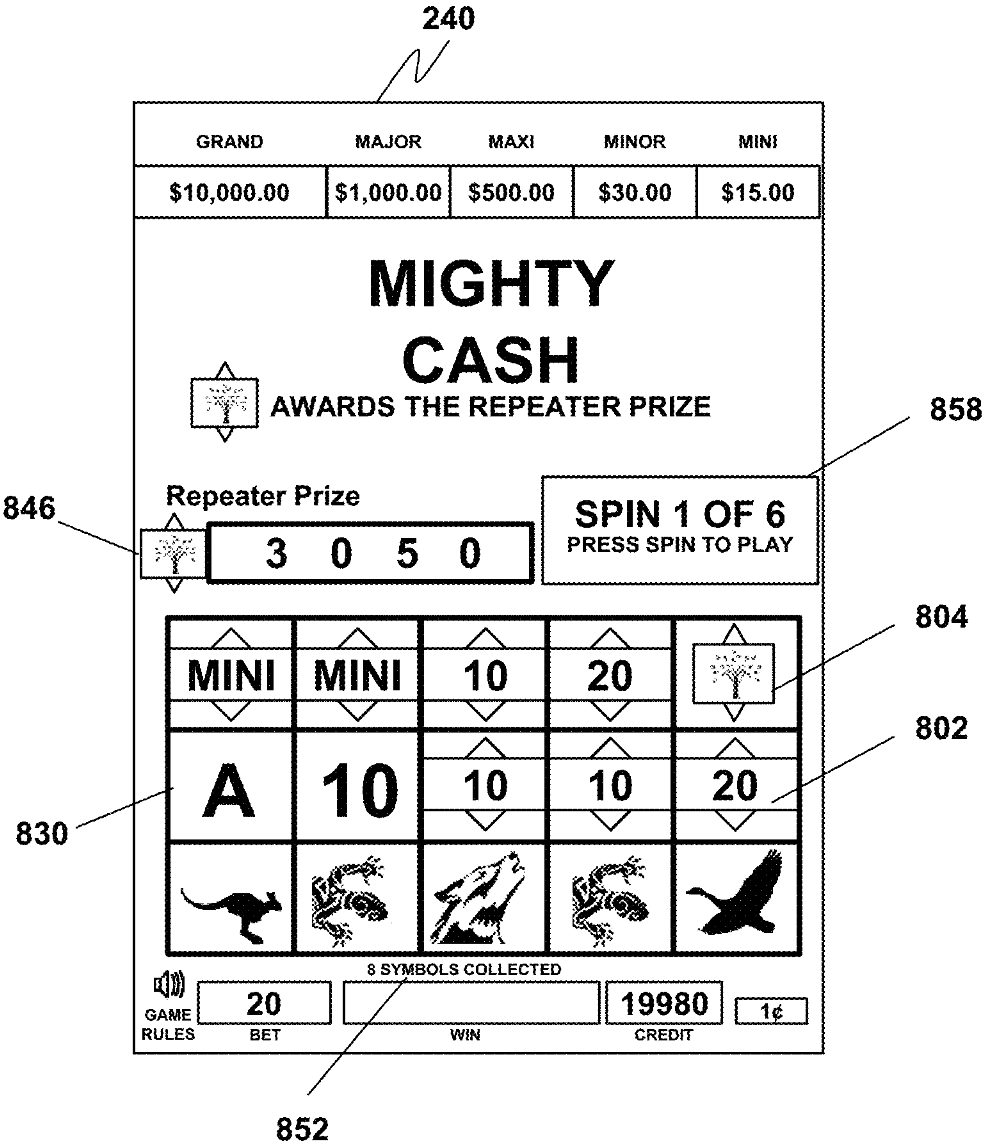
Figure 8I:
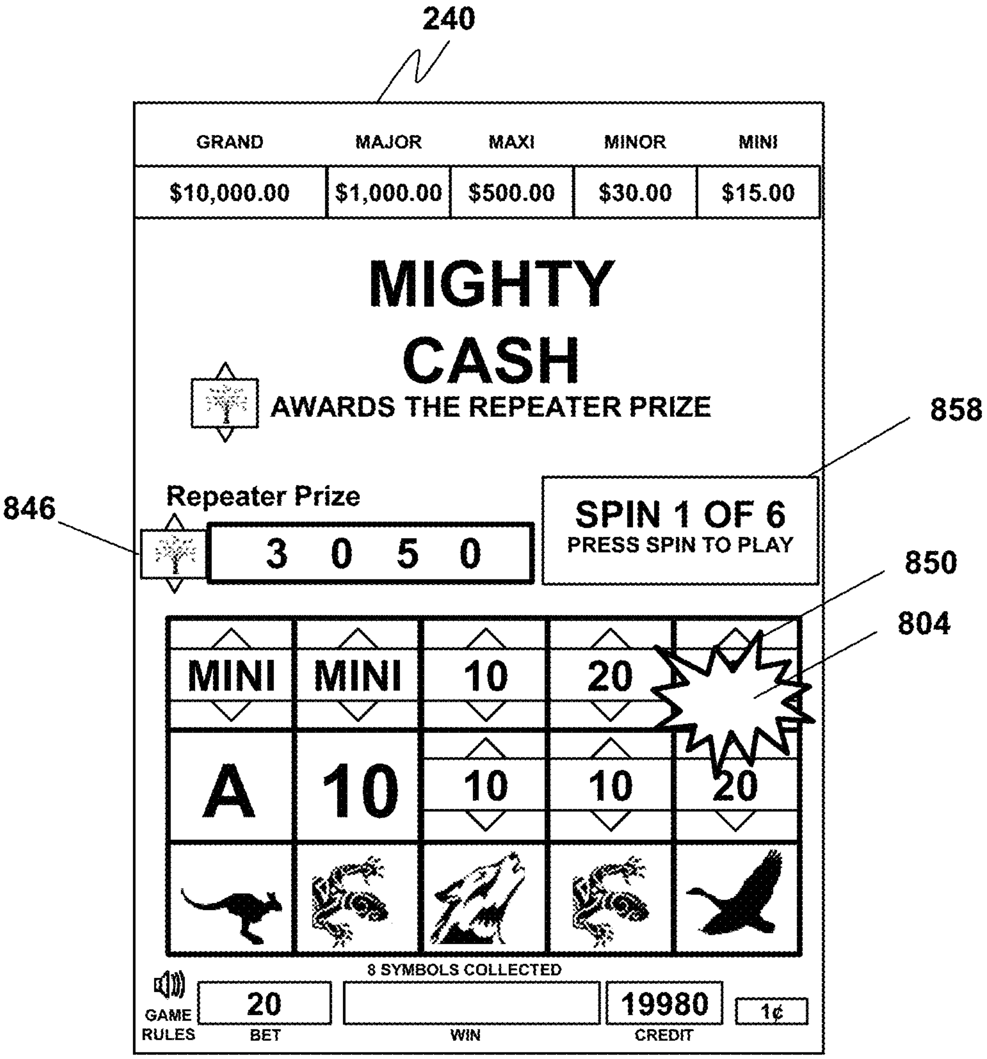
Figure 8J:
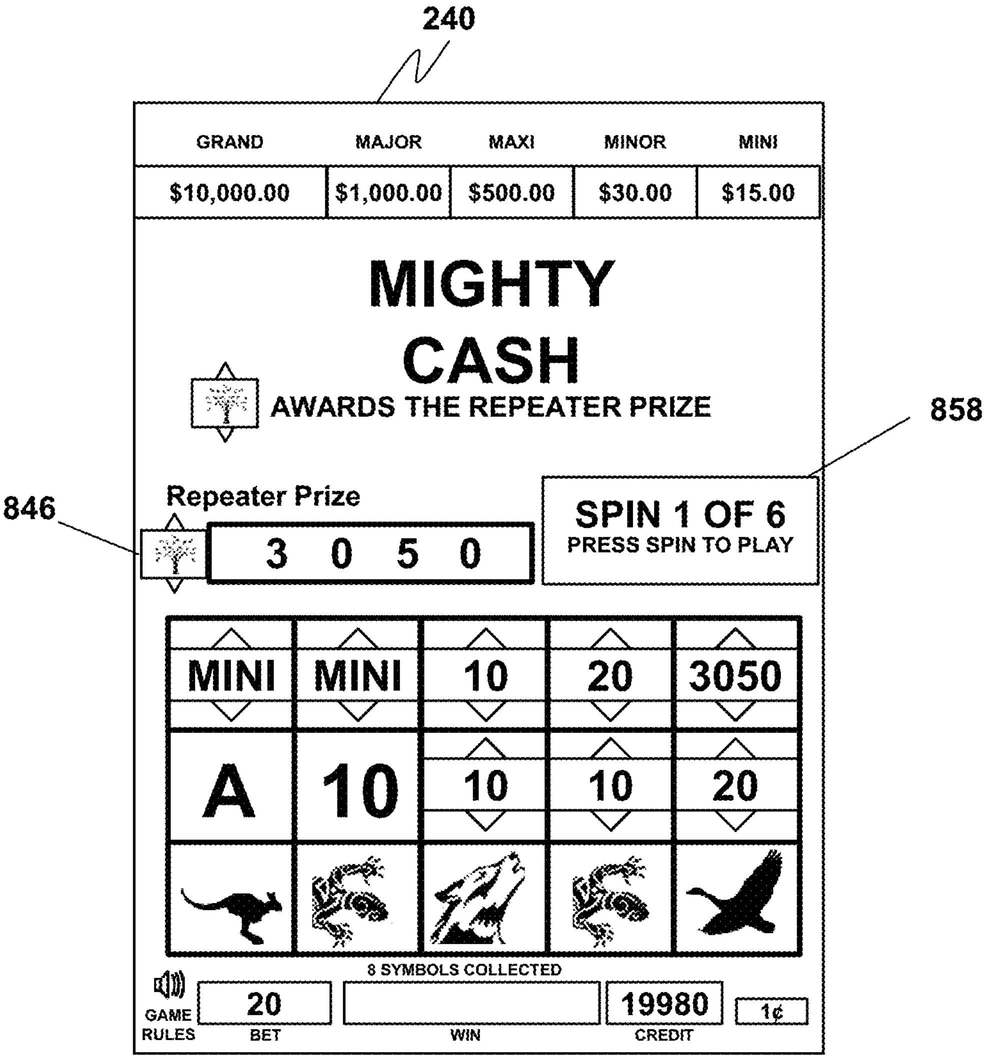

FIG. 8G shows the reels 832-840 spinning during a first spin of the feature game. As shown, the configurable symbols that appeared in the triggering game outcome are held in place on the display while the reels are shown spinning in the other symbol positions. FIG. 8H illustrates reels 832-840 in their stopped position to provide a game outcome following the first spin of the feature game. As shown in FIG. 8H, the first spin has resulted in the award of two additional configurable symbols, namely, a 20 credit value symbol 802 and a repeater symbol 804. The repeater symbol 804 may be modified to display its value (3050 credits in this example) before the next spin. For example, as is shown in FIGS. 8I and 8J, an animation 850 may display a rocket (now shown) or other element moving from the repeater prize meter 846 to the repeater symbol 804 where it explodes to reveal the repeater symbol modified to display its value. When a spin results in the award of more than one repeater symbol, the repeater symbols may be modified simultaneously or sequentially to display their values.

Figure 8K:
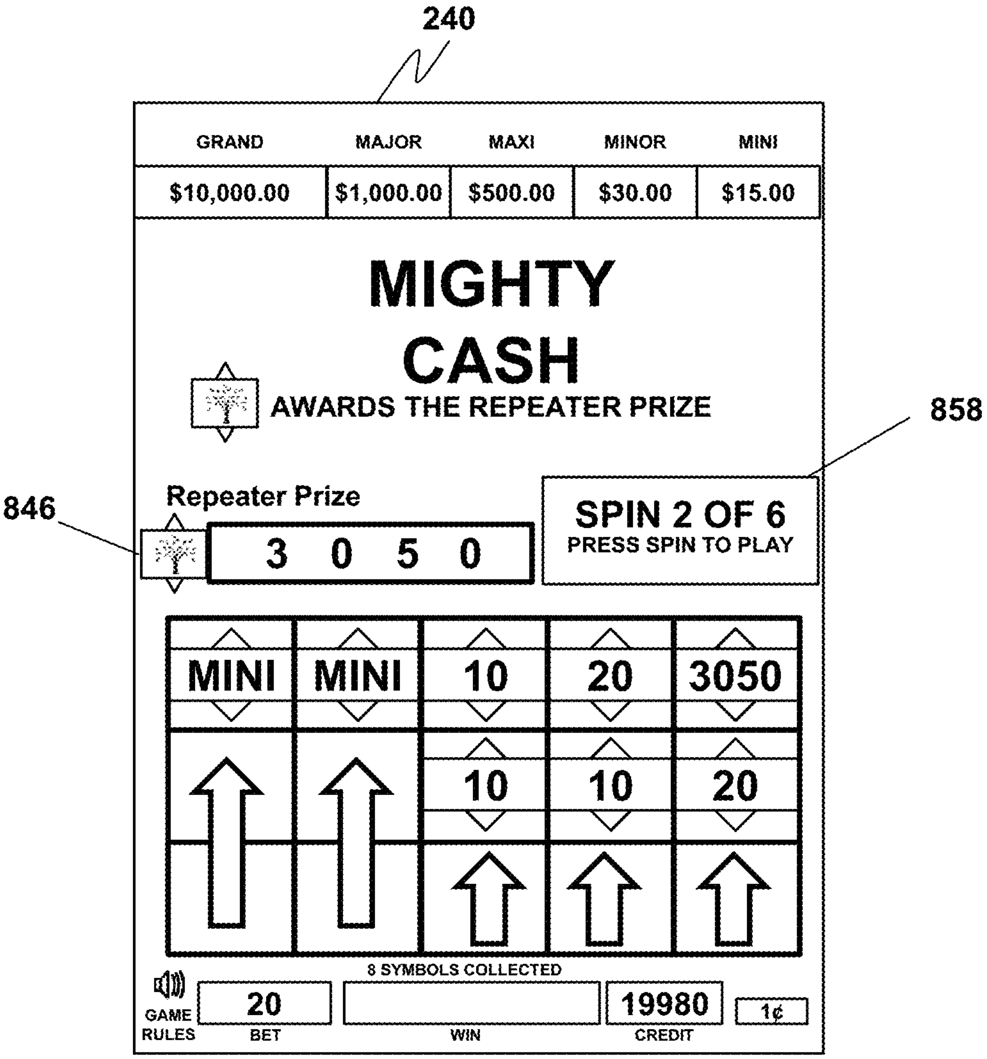
Figure 8L:
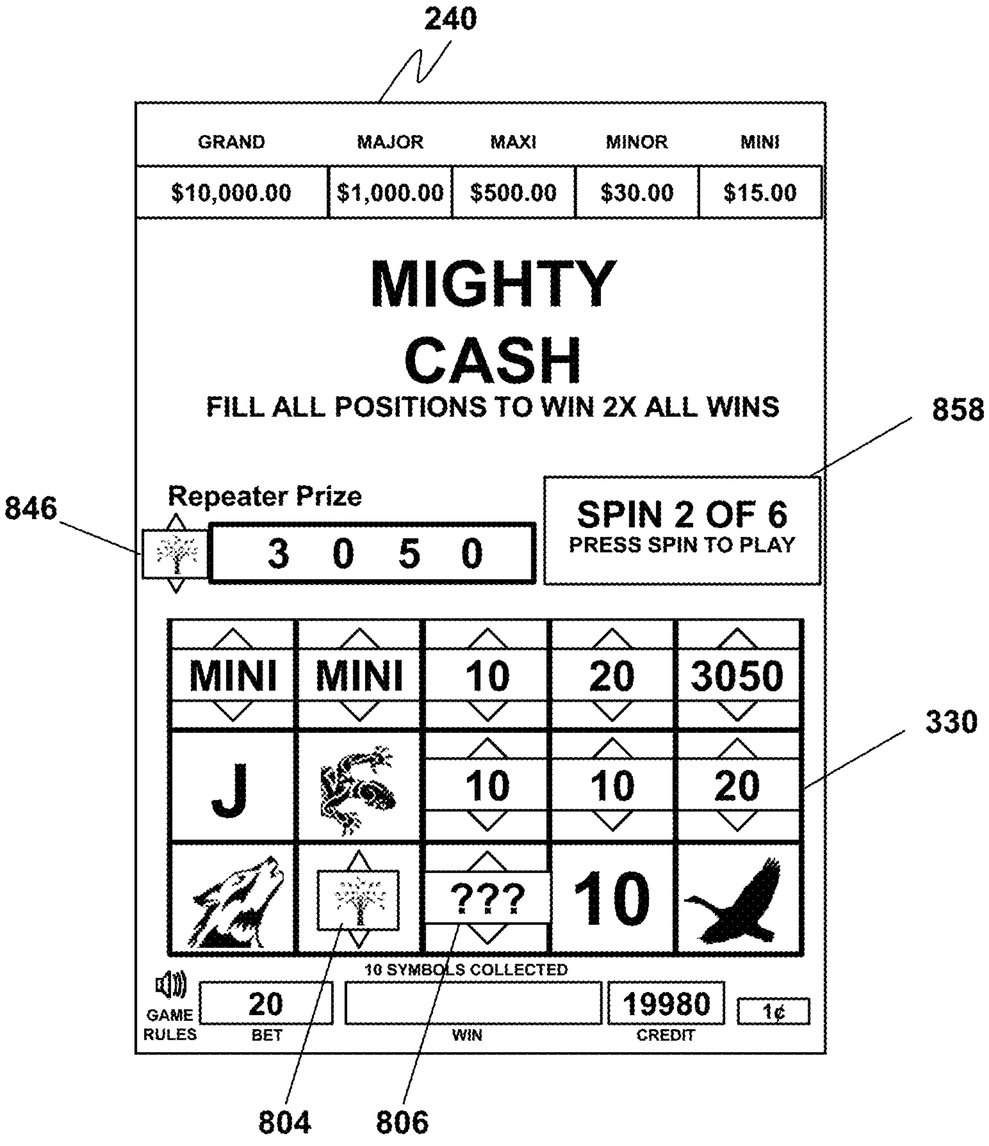

The player is then prompted to initiate a second spin of the feature game. During the second spin, the configurable symbols that were previously awarded (collected) are held in place on the display matrix and the reels are shown spinning in the other symbol positions of the display matrix. FIG. 8K shows the display during the second spin of the feature game, and FIG. 8L shows the reels in their stopped position to provide a game outcome following the second spin of the feature game. As shown in FIG. 8L, the second spin has resulted in the award of two additional configurable symbols, namely, another repeater symbol 804 and a mystery symbol 806. As discussed above, the value of the mystery symbol may be determined using a valuation game, such as a spinning wheel game. (See, e.g., FIG. 9).

Figure 8M:
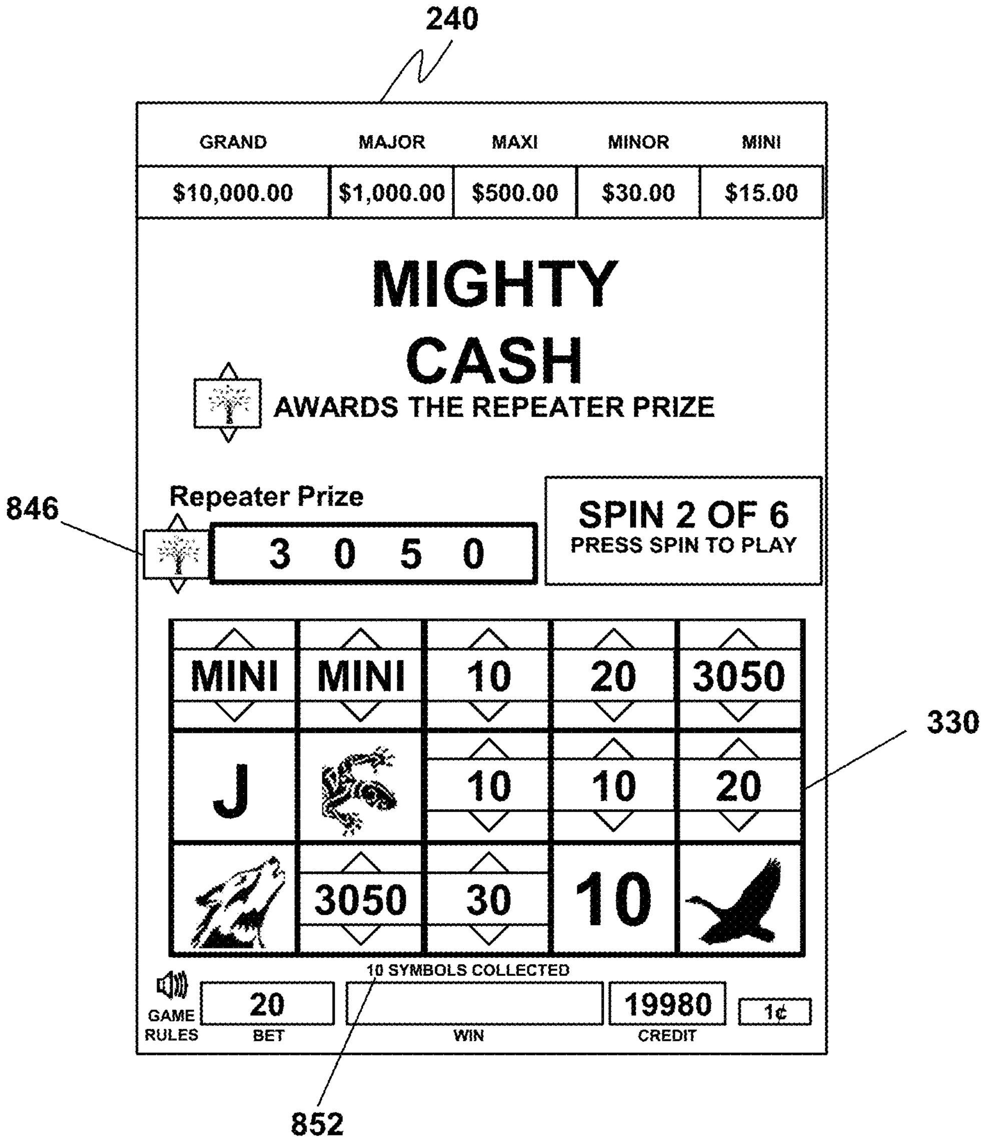

FIG. 8M shows the display after the repeater and mystery symbols that were awarded during the second spin have been modified to show their determined values, e.g., 3050 credits for the repeater symbol and 30 credits for the mystery symbol.

The feature game continues in the manner described until all of the spins have been completed. Once the feature game is completed, the controller determines and pays out a feature game award. For example, if the matrix 830 is not fully populated with configurable symbols, the player may be awarded a prize amount corresponding to the accumulated value of the displayed configurable symbols.

Figure 9B:
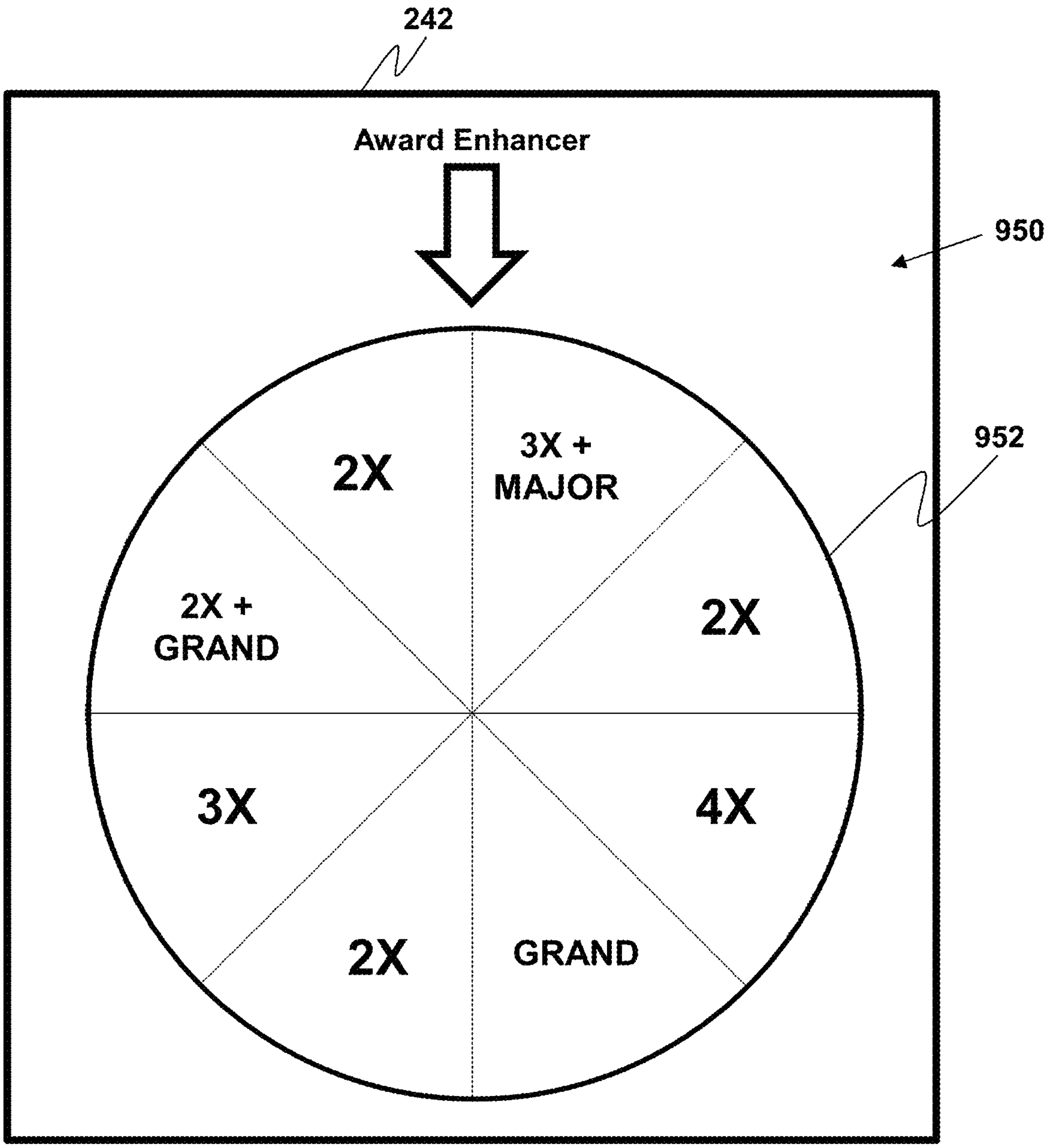

In various embodiments, if the display matrix 330 is completely filled with configurable symbols, the player may be awarded an enhanced award. In some embodiments, the enhanced award may be a fixed prize such as a 2× multiplier of the accumulated value or the award of a jackpot, such as the Grand jackpot. In some embodiments, the enhanced award may be determined via a second valuation game. The second valuation game may be similar to the first valuation game, but may provide different and/or enhanced values from those used in the first valuation game. For example, as shown in FIG. 9B, the second valuation game may be conducted using a second spinning wheel display 950 with a segmented wheel 952 that may include multipliers (i.e., 2× or 3×) or multipliers with jackpots (i.e., 2×+Grand or 3×+Major). The multiplier value indicated by the spin of the second spinning wheel display affects the sum total value of all "hold" value symbols collected in the hold and spin game (i.e., "2×" will double the sum total value); the jackpot enhances the hold and spin award symbol by the amount of the jackpot (i.e., $50, $500 or $5000 will be added to the sum total value).

In certain embodiments, once the play of all the spins of the feature game is completed, the gaming device 200 may determine whether to provide an additional quantity of spins of the feature game. In one or more embodiments, the gaming device 200 can randomly select the additional quantity of spins to be provided. In certain other embodiments, the gaming device 200 can present a quantity of picks and receive player input. The selected pick is then revealed by the gaming device 200 and the additional quantity of spins corresponding to the player pick is provided. In certain embodiments, the gaming device 200 can first determine whether to provide the additional quantity of spins and then do a second determination to determine the quantity to be provided. It will be apparent to those skilled in the art that there are various ways, such as a wheel game, etc., that may be used to determine and present the additional quantity of plays.

Figure 10A:
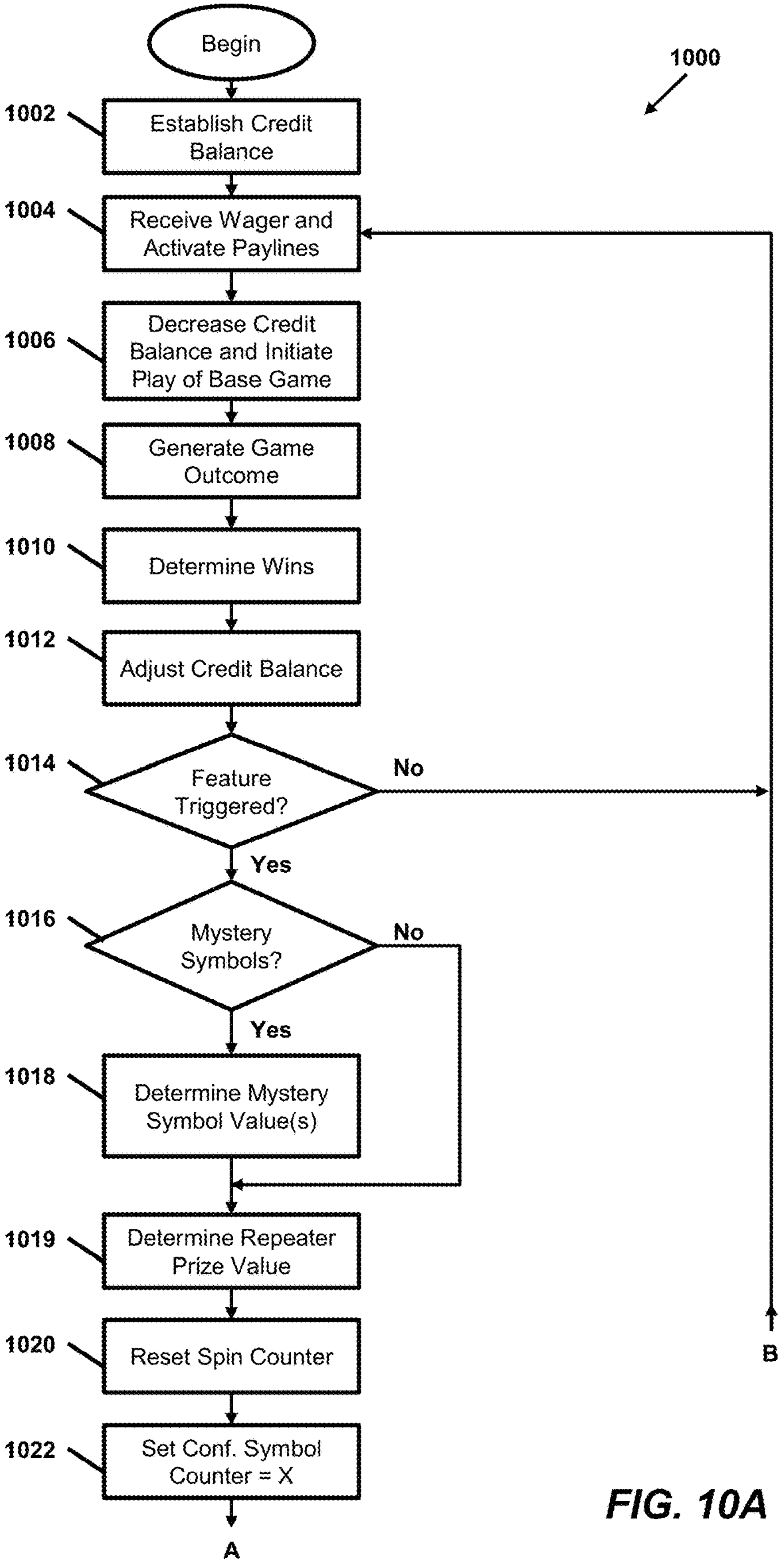
FIGS. 10A and 10B are flow diagrams for an example embodiment of a process for operating the EGM of FIG. 2A in accordance with various aspects of the present disclosure.
Figure 10B:
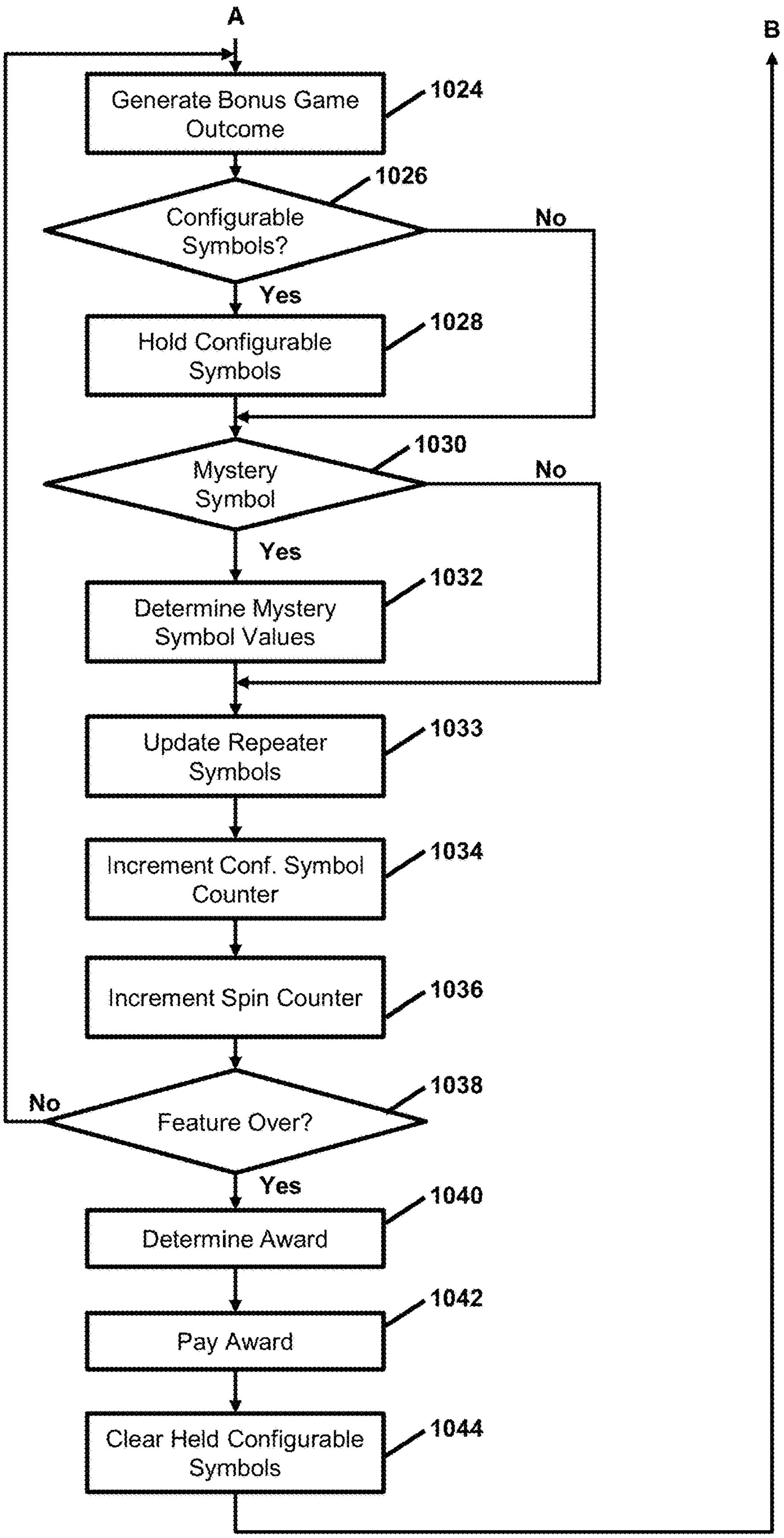

Examples of play of the base and feature game with repeater and mystery symbols will now be described with additional reference to the flowchart 1000 shown in FIGS. 10A and 10B. At 1002, the gaming device 200 may establish an associated credit value on a credit meter. To this end, a player may insert a physical item having monetary value into a credit input mechanism, such as the ticket reader 224 or bill validator 234, of the gaming device 200. In response to the received physical item, the gaming device 200 may increase a credit value of the credit meter 815 (see FIG. 8A) based on the monetary value of the physical item.

At 1004, the gaming device 200 may receive a wager and may activate one or more paylines, such as paylines $\mathbf{801}_1$, $\mathbf{801}_2$, $\mathbf{801}_3$. For example, in some embodiments, the gaming device 200 allows the player to selectively activate a number of paylines via the player input buttons 236. In other embodiments, the paylines may be automatically activated by the gaming device 200 without player input. A player may also use the player input buttons 236 to specify a value of an amount to be wagered on each active payline with the wager being funded by the credit value of the credit meter.

The gaming device 200 may display a message such as "Press SPIN to play" in a message box, e.g., on the primary game display 240. When the player presses a SPIN button, e.g., in the player input buttons 236, the gaming device 200, at 1006, may decrease the player's credit balance by the specified wager and initiate play of a spinning reel game by spinning reels 832-840. (See, e.g. FIG. 8A).

Next, at 1008, the gaming device 200 may stop the reels 832-840 based on one or more random values generated by RNG 212 to obtain a base game outcome comprising a matrix 830 of symbols. (See, e.g., FIG. 8B). In other embodiments, the gaming device 200 may stop the reels 832-840 based on information received from central determination gaming system server 106.

The gaming device 200, at 1010, may then determine whether the symbols displayed in the display matrix 830 include one or more winning symbol combination. For example, at 1010, the gaming device 200 may determine if there are any winning combinations of symbols along one of the activated paylines. Winning symbol combinations along the activated paylines may result in the award of prize(s) by increasing the credit value of the credit meter based on the prize(s) for such winning combination(s).

At 1012, the gaming device 200 may adjust the credit balance on the credit meter 535 in accordance with any winning symbol combinations that were identified in 1006. The gaming device 200 may also control the display 240 to provide a message reflective of the game outcome. For example, when the game outcome includes one or more winning symbol combinations, the display 240 may display a message such as "Congratulations—You Won X Credits!" (where X is the number of credits won by the player). Conversely, when the game outcome does not include any winning symbol combinations, a message such as "Sorry—You Didn't Win—Spin Again" may be displayed to the player.

At 1014, the gaming device 200 determines whether a feature triggering event occurred. The game triggering event may occur, for example, on the occurrence of a predetermined combination of symbols, or at random, or by some other process. As discussed above, in the embodiment of FIGS. 8A-8I, a feature game is triggered by the appearance of 6 or more configurable symbols in a base game outcome. For example, the base game outcome shown in FIG. 8B triggers the feature game because it includes at least six (6) configurable, i.e., symbols, in the form of a mystery symbol, a MINI jackpot symbol, and four value symbols (10 credits, 10 credits, 10 credits, and 20 credits). When a trigger event occurs, the gaming device 200 displays a message such as "Congratulations, You Triggered The HOLD AND SPIN FEATURE Game" on the primary game display 240. In various embodiments, the minimum number of configurable symbols needed to trigger the feature game may be predetermined, randomly determined, based on a wager amount, or based on a denomination, etc.

If the feature game is not triggered, the process returns to 1004 to allow the player to continue playing the base game. Alternatively, when a feature trigger occurs, the gaming device 200 may transition to a feature game as described below.

Prior to transitioning to the feature game, the gaming device 200 may, at 1016 and 1018, determine the value(s) of any mystery symbols that were displayed in the base game outcome that triggered the feature game. As discussed above, the gaming device 200 may determine the values to be assigned to the mystery symbols using a valuation game that may be displayed, for example, on the spinning wheel display 946 (see, e.g., FIG. 9A). Upon determining values for any displayed mystery symbols, the gaming device 200 may cause the display 240 to replace the mystery symbols with their respective determined values. (See, e.g., FIGS. 8B and 8C, which illustrate the mystery symbol 806 being updated to MINI jackpot symbol). Although not illustrated, an animation may be shown when updating the display matrix 830 to show values assigned to mystery symbols.

At 1019, the gaming device 200 determines the repeater prize value and sets the repeater prize meter 846 in accordance with the determined value. In the illustrated embodiment, the repeater prize value is determined as the sum of the configurable symbols (including the determined value of any mystery symbols) that triggered the feature game. Accordingly, in the above example, the repeater prize meter 846 is set to 3050 credits, which is the sum (1500+1500+10+10+10+20) of the six (6) configurable symbols that triggered the feature game. (See, e.g., FIG. 8E).

Before beginning the hold and spin feature game, the gaming device 200 also resets the spin counter 858 to its starting value at 1020. In the illustrated embodiment, the feature game provides 6 (six) rounds/spins, so the spin counter 858 is reset to indicate that this is spin 1 of 6.

In transitioning from the base game to the feature game, the gaming device 200 may cause the display 240 to provide a transition screen. (See, e.g., FIG. 8F). When the player presses a Start Feature button, e.g., on the player input buttons 236, the game transitions the display 240 to present the hold and spin feature game. (See, e.g., FIG. 8G).

The gaming device 200 may display a message such as "Press SPIN to Play" on the display 240. When the player presses the SPIN button, the gaming device 200, at 1024, controls the display matrix 830 to show reels 310A-310E as spinning (see, e.g., FIG. 8G) and stopping (based on one or more random values generated by RNG 212) to obtain a game outcome. (See, e.g., FIG. 8H). As noted above, the symbol set in the feature game utilizes configurable and non-configurable symbols.

The gaming device 200, at 1026, may then determine whether the feature game outcome from the first spin includes any new configurable symbols. In the illustrated example, the first spin has resulted in the award of two additional configurable symbols, namely, a 20 credit value symbol 802 and a mystery symbol 806. (See FIG. 8H).

Next, at 1028, any configurable symbols shown in the game outcome are held on the display matrix 830.

At 1030, the gaming device 200 determines if the game outcome includes any mystery symbols. If no mystery symbols are present, control moves to 1034. Conversely, if the displayed game outcome incudes one or more mystery symbols, control moves to 1032 where the gaming device 200 determines the value(s) to be assigned to the mystery symbols. The value of the mystery symbol may, for example, be determined using a valuation game, such as the first spinning wheel game. (See, e.g., FIG. 9A).

At 1033, the gaming device 200 determines if the spin resulted in the award of any new repeater symbols. Any new repeater symbols 804 may be modified to display its value (3050 credits in this example) before the next spin. (See, e.g., FIGS. 8I and 8J). As noted above, when a spin results in the award of more than one repeater symbol, the repeater symbols may be modified simultaneously or sequentially to display their values At 1034, the gaming device increments the configurable symbol counter 852 to reflect the number of configurable symbols that have been collected thus far by the player. Next, at 1036, the gaming device 200 optionally increments the feature game spin counter 858.

Next, at 1036, the gaming device 200 optionally increments the feature game spin counter 858. At 1038, the gaming device 200 determines if the feature game is over. Specifically, the feature game ends in this example if no spins remain or if the matrix 330 has been filled with configurable symbols.

If the feature game is not over, control returns to 1024 where the gaming device 200 waits for the player to press the spin button to generate another feature game outcome. The feature game continues in the manner described until all of the spins have been completed or the display matrix is filled with configurable symbols.

Once the feature game is completed, control moves to 1040 where the gaming device 200 determines the award to be paid to the player in connection with the feature game. If the matrix is not completely filled with configurable symbols, the award may be determined by summing the credits of the configurable symbols that were awarded and held during the feature game. An enhanced award may be provided for completely filling the display matrix 830 with configurable symbols. In some embodiments, the enhanced award may be a fixed prize such as a 2× multiplier of the accumulated value. In some embodiments, the enhanced award may be determined via a second valuation game, such as the second spinning wheel game. (See, e.g., FIG. 9B).

Upon determining the award, control moves to 1042 where the gaming device 200 pays out any awards to the player, e.g., by adding the awarded credits to the credit balance on the credit meter 535. Next, at 1044, the gaming device 200 clears the held configurable symbols and control returns to 1002 where the player may continue to play the base game.

Progressive Play Meters

In some embodiments, one or more progressive play meters may be displayed. As explained in more detail below, a progressive play meter is representative of a number of plays, sometimes referred to herein as spins, of a feature game that a player may be awarded if the feature game is triggered. In some embodiments of the feature game, a number of opportunities are available to try and fill configurable symbols into the positions of the display matrix that do not contain a held configurable symbol. In some instances, the matrix displayed during the feature game may be considered a bonus matrix that may have the same or different layout as the display matrix presented in the base game. Each opportunity, i.e., each spin or play, in the feature game results in the presentation of a symbol in each of the positions without a held configurable symbol. These symbols may be selected from a set of symbols that includes at least configurable symbols and non-configurable symbols, and may optionally include one or more jackpot symbols, one or more mystery symbols, and/or other symbols described herein. If a configurable symbol is presented during a play of the feature game, then that configurable symbol is held in that displayed position, including during subsequent plays of the feature game. In subsequent plays after a play that resulted in the display and hold of one or more configurable symbols, a symbol or symbols are selected for presentation in the remaining positions that do not have held configurable symbols.

In some embodiments, one or more progressive play meters may be displayed during the base game. At the beginning of the base game, the one or more progressive play meters may initially be set to a default number, and during the base game, the one or more progressive play meters may be adjusted based at least in part on, for instance, numerous events such as the generation of various symbols including a spin award symbol or a configurable symbol. These various events may cause the adjustment of a single progressive play meter or multiple progressive play meters; these adjustments may include, for example, an increase or decrease of the progressive play meter, including an incremental change or a multiple-based change (e.g., the progressive play meter is multiplied by a value).

In some embodiments, a plurality of feature levels may be displayed during the base game, with each feature level corresponding to its own progressive play meter. These progressive play meters may be adjusted based on, in some embodiments, the occurrence of events related to one of the feature levels, such as the generation of a spin award symbol associated with one of the feature levels, as well as wager amounts and the generation of other symbols. In some instances, sets of feature levels may be displayed, with each set being associated with a different wager amount and, in some of these embodiments, the progressive play meters may be adjusted based on a selection of a wager amount.

Figure 15:
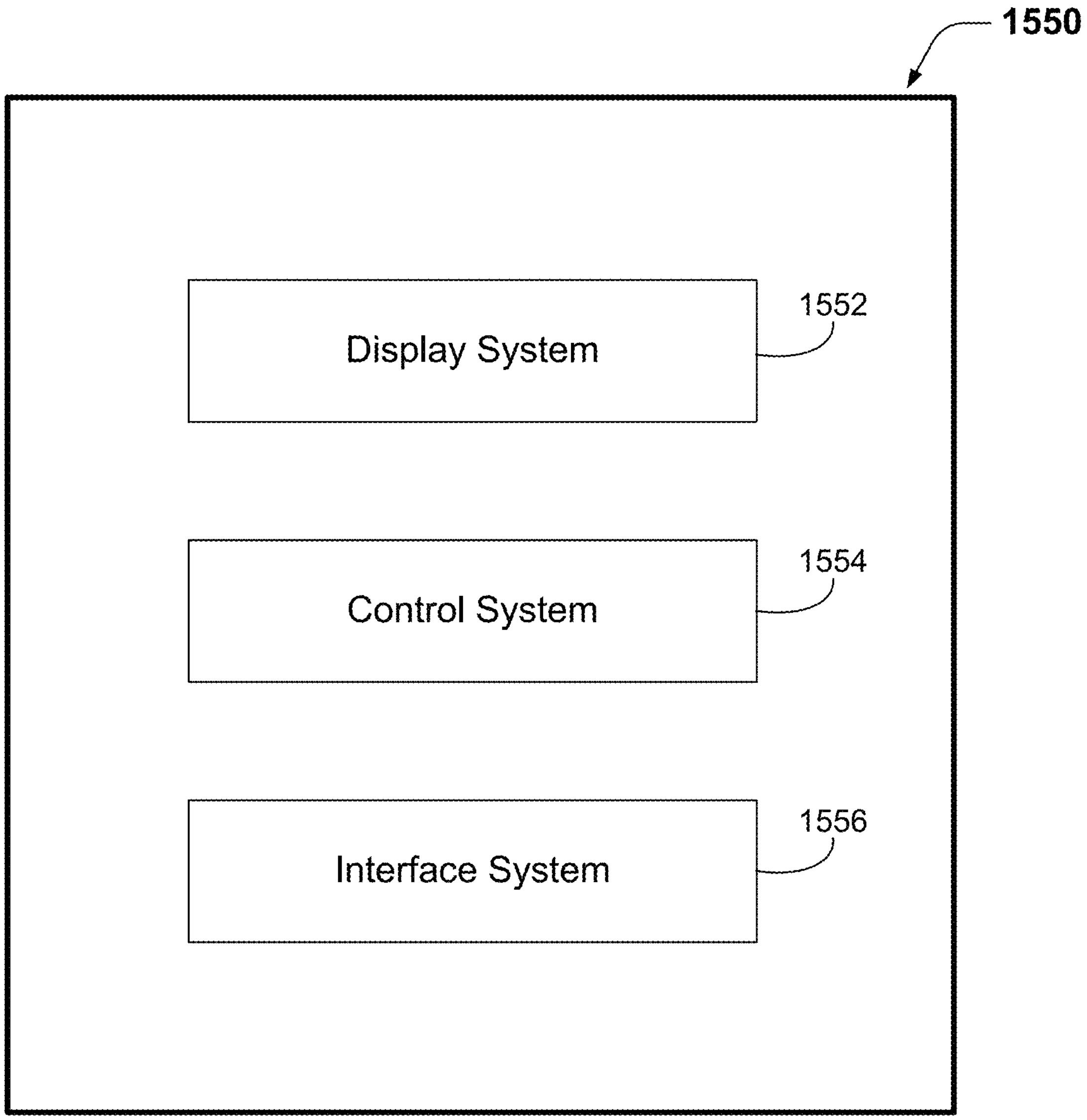
FIG. 15 is a block diagram that shows blocks of an apparatus according to one example.

FIG. 15 is a block diagram that shows blocks of an apparatus according to one example. According to some examples, the apparatus 1550 may be, or may include, a gaming device. In some examples, the apparatus 1550 may be an EGM such as those described above with reference to FIGS. 1 and 2A. However, in alternative examples, the apparatus 1550 may be a mobile device such as described above with reference to FIG. 2B or an EUD as described above with reference to FIG. 2C.

In this example, the apparatus 1550 includes a display system 1552 and a control system 1554 that is configured to communicate with the display system 1552. In this example, the control system 1554 is configured to communicate with the display system 1552 via wired communication, e.g., via electrical signals. In alternative implementations, the control system 1554 may be configured to communicate with the display system 1552 via wireless communication. Accordingly, at least a portion of the control system 1554 may be coupled to the display system 1552. As used herein, the term "coupled to" has a meaning that could include being physically coupled for wired communication or being configured for wireless communication.

The control system 1554 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. Although the interface system 1556 is shown as being separate from the control system 1554, in some implementations the interface system 1556 may be part of the control system 1554. In some implementations, the interface system 1556 may include the entire control system 1554. The control system 1554 also may include (and/or be configured for communication with) one or more memory devices, such as one or more random access memory (RAM) devices, read-only memory (ROM) devices and/or other types of non-transitory media. In some implementations, at least a portion of the control system 1554 may be implemented as a register. Accordingly, the apparatus 1550 may have a memory system that includes one or more memory devices, though the memory system is not shown in FIG. 15

The control system 1554 may be capable of performing, at least in part, the methods disclosed herein. In some examples, the control system 1554 may be capable of performing at least some of the methods described herein according to instructions (e.g., software) stored on non-transitory media. For example, the control system 1554 may be configured for controlling the display system 1552 and/or for receiving and processing data from at least a portion of the display system 1552, e.g., as described below.

The display system 1552 may include, one or more liquid crystal displays (LCDs), plasma displays, light-emitting diode (LED) displays, microLED displays or organic light-emitting diode (OLED) displays. According to some implementations, the display system 1552 may include at least one flexible display, such as a flexible OLED. Although shown as separate components in FIG. 15, the display system 1552 may, in some examples, include at least a portion of the control system 1554. For example, the display system 1552 may include one or more processors, microprocessors, programmable logic devices, discrete gates or transistor logic, etc.

In the example shown in FIG. 15, the apparatus 1550 includes an interface system 1556. In some examples, the interface system may include a wireless interface system. In some implementations, the interface system 1556 may include a network interface, an interface between the control system 1554 and the display system 1552, an interface between the control system 1554 and a memory system and/or an interface between the control system 1554 and an external device interface (e.g., a port or an applications processor). In some examples, the interface system 1556 may include one or more user interfaces, such as a touch screen, one or more buttons, a gesture recognition system, a voice recognition system, etc.

According to some implementations, the apparatus 1550 may be a single device, whereas in other implementations the apparatus 1550 may be a system that includes more than one device. Accordingly, the terms "apparatus" and "system" may sometimes be used interchangeably herein. In other examples, the apparatus 1550 may be a component of another device. For example, in some implementations at least a portion of the display system 1552 and/or the control system 1554 may be included in more than one apparatus. For example, in some implementations at least part of the control system 1554 may reside in a server, such as a central determination server, a server that tracks feature award credits, etc. Some implementations of the apparatus 1550 may not include a display system. In some such implementations, the control system 1554 may be configured for controlling the display system of another device.

Figure 16:
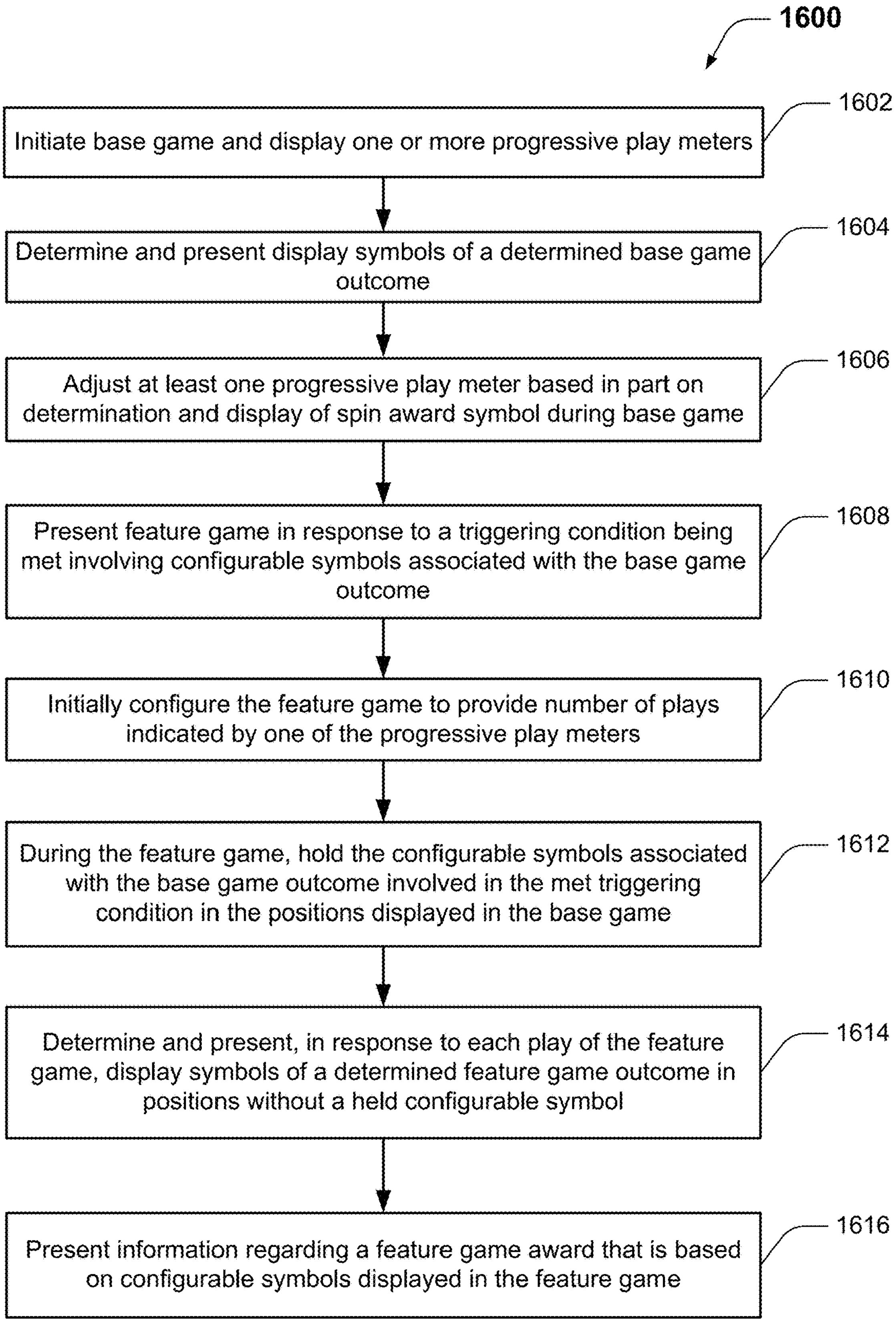
FIG. 16 is a flow diagram for an example embodiment of a process having a progressive play meter in accordance with various aspects of the present disclosure.

FIG. 16 is a flow diagram for an example embodiment of a process having a progressive play meter for operating the EGM of FIG. 2A in accordance with various aspects of the present disclosure. In some examples, method 1600 may be performed, at least in part, by an apparatus such as that described above with reference to FIG. 15. In some examples, the method 1600 may be performed by a control system (e.g., the control system 1554 of FIG. 15) according to software stored upon one or more non-transitory storage media. As with other methods described herein, the number and sequence of blocks shown in FIG. 16 are merely examples. Similar disclosed methods may include more or fewer blocks. Moreover, at least some of the blocks may occur in a different sequence than the sequence that is shown in a flow diagram. The depicted example embodiment includes information is similar to that of FIG. 4, with noted differences.

In FIG. 16, block 1602 initiates a base game which is presented on the one or more displays of the EGM; this also includes the presentation of one or more progressive play meters in the base game. This block 1602 may be similar to block 402 of FIG. 4 described above and may include and incorporate any of the information described above.

According to some examples, block 1602 may involve receiving, via a user interface of a gaming device, at least one indication to initiate one or more instances of a base game. In this example, the base game is, or includes, a slot game. For example, the user input may be received by the control system 1554 of FIG. 15, via a user interface of the interface system 1556. Block 1602 may, for example, involve receiving an indication that a user has pressed a "play" button of an EGM, receiving an indication that the user has touched an area of a touch screen that corresponds to a displayed image of a "play" button, etc. In some such implementations, block 1602 may involve verifying that there is sufficient credit for at least one play of the base game.

In block 1604, a determination is made of a base game outcome as described herein above, including in blocks 404 and 406 of FIG. 4. Block 1604 also includes the presentation of the determined symbols in the display, including displaying one symbol in each of the positions of a display matrix as described above. The base game outcome includes corresponding display symbols that may be selected from a first symbol set that includes, for instance, configurable symbols, non-configurable symbols, and spin award symbols. For example, the configurable symbols may include one or more mystery symbols, a MINI, MINOR, MAXI, MAJOR, and/or GRAND jackpot symbol, one or more value symbols, and/or one or more repeater symbols. The spin award symbols may a standalone symbol and/or may be in the form of a configurable symbol that includes a further designation, e.g., a color, a ribbon, or medal, to indicate that they function as a spin award symbol for a progressive meter associated with that designation; the spin award symbol may also be a value, jackpot, mystery, and/or repeater symbols that also includes a further designation.

In block 1606 of FIG. 16, the progressive play meter may be adjusted based, at least in part, on the determined base game outcome having a spin award symbol; this spin award symbol is also presented in the display. As stated herein, the spin award symbol may take many forms including a configurable symbol having a designation. In some embodiments, this adjustment may be an increase of the progressive play meter associated with that designation while in some other embodiments, it may be the decrease of that progressive play meter. In some embodiments, the spin award symbols may be in the form of configurable symbols that can also function to trigger the hold and spin feature game. For example, the spin award symbols may be value, jackpot, mystery and/or repeater symbols that include a further designation, e.g., color or other indicia, to indicate that they also function as spin award symbols. In some embodiments, the adjustment of the progressive play meter may be an adjustment of one play. In some embodiments, different spin award symbols may result in the adjustment of the progressive play meter by more than one play, such as two, three, or four. In some instances, the spin award symbols may result in the application of a multiplier to the progressive play meter, such as a multiplier of 2, 3, or 4.

In block 1608, a feature game may be initiated and presented on the one or more displays when one or more triggering conditions are met. These one or more triggering conditions, also referred to herein as a trigger event, may involve configurable symbols that are associated with the base game outcome. This may include the aspects described above, including, for instance, with respect to blocks 410 of FIG. 4 and blocks 1014, 1024, and 1026 of FIG. 10A. One of the triggering conditions may include the appearance of a designated number of triggering symbols, e.g., a particular number of configurable symbols being determined and displayed in the base game outcome. In another example, one of the triggering conditions may include the appearance of configurable symbols that include a jackpot symbol (e.g., MINI, MAJOR), mystery symbol, repeater symbol, and/or any other symbol described herein. If a triggering condition is met, then the configurable symbols may be held in their respective display positions as described herein.

In some embodiments, as indicated by block 1610, once one or more triggering conditions in the base game are met to launch and the feature game, the feature game may be configured to provide the number of plays indicated by one of the progressive play meters. In some embodiments, the one or more triggering conditions may be associated with one or more of the progressive play meters. Although discussed in more detail below, a particular triggering condition may include requiring the display of a configurable symbol with an indicator that is associated with, or corresponds to, a progressive play meter. This triggering condition may therefore result in the feature game being configured with the number of plays indicated by the progressive play meter that corresponds with the indicator on the configurable symbol and/or the wager amount. For example, a base game may offer five different wagering levels, each of which may be associated with a different set of progressive play meters. Each set of progressive play meters may include three different feature levels of progressive play meters, each of which is associated with a different one of three different indications that may potentially be selected for display on a configurable symbol during the base game (there are thus a total of 15 different progressive play meters in this example). In such an implementation, one triggering condition may be that a predetermined minimum number of configurable symbols, e.g., six, be displayed in the base game outcome and that one of the configurable symbols displayed in the base game be displayed with an indication that is associated with one of the levels of progressive play meters. If such a trigger condition is met, the feature game may then be initialized using the number of plays indicated by the progressive play meter that corresponds with both the wager amount that was selected in the base game for the base game outcome that satisfied the trigger condition and the level of the progressive play meter associated with the displayed indication (e.g., a designation).

In some other or additional embodiments, one of the triggering conditions may be met when at least a predetermined number of configurable symbols without a specific association with one of the progressive play meters is displayed in the base game. In such an instance, this triggering condition may configure the feature game to have the number of plays indicated by a progressive play meter that corresponds with a fixed default value, a random selection, a user input, a bonus game outcome, the current highest progressive play meter when the one or more triggering conditions is met, or the current lowest progressive play meter when the one or more triggering conditions is met. Thus, for example, in the scenario outlined in the previous paragraph, the feature game may be initialized with a number of plays randomly selected from one of the fifteen progressive play meters if a triggering condition is obtained that does not have any configurable symbols with an indication.

Following block 1610, in blocks 1612, 1614, and 1616 the feature game may be played as described herein above, including in blocks 411 through 428 of FIG. 4 and blocks 1028 through 1044 of FIG. 10B. This may include, in some embodiments, holding the configurable symbols associated with the base game outcome that met one or more triggering conditions in the positions in which they were displayed in the base game as well as holding in position any additional configurable symbols that are determined and displayed during the feature game. In some embodiments, this may be considered the feature game displaying a bonus matrix that displays the configurable symbols associated with the base game outcome involved in the one or more met triggering conditions in the display positions of the bonus matrix corresponding to their display positions in the base game outcome, as well as holding any additional configurable symbols in positions of the bonus matrix. During the feature game, the feature game outcome that is determined for each play of the feature game may include causing new symbols to be displayed (e.g., displayed in the bonus matrix) in place of each non-configurable symbol that is displayed at the start of that play; the new symbols may, for example, be selected from second set of display symbols that may differ or be the same as the first set of display symbols for the base game outcome. In some embodiments, for example, the second set of symbols may include configurable and non-configurable symbols, but may not include any spin award symbols.

Figure 17:
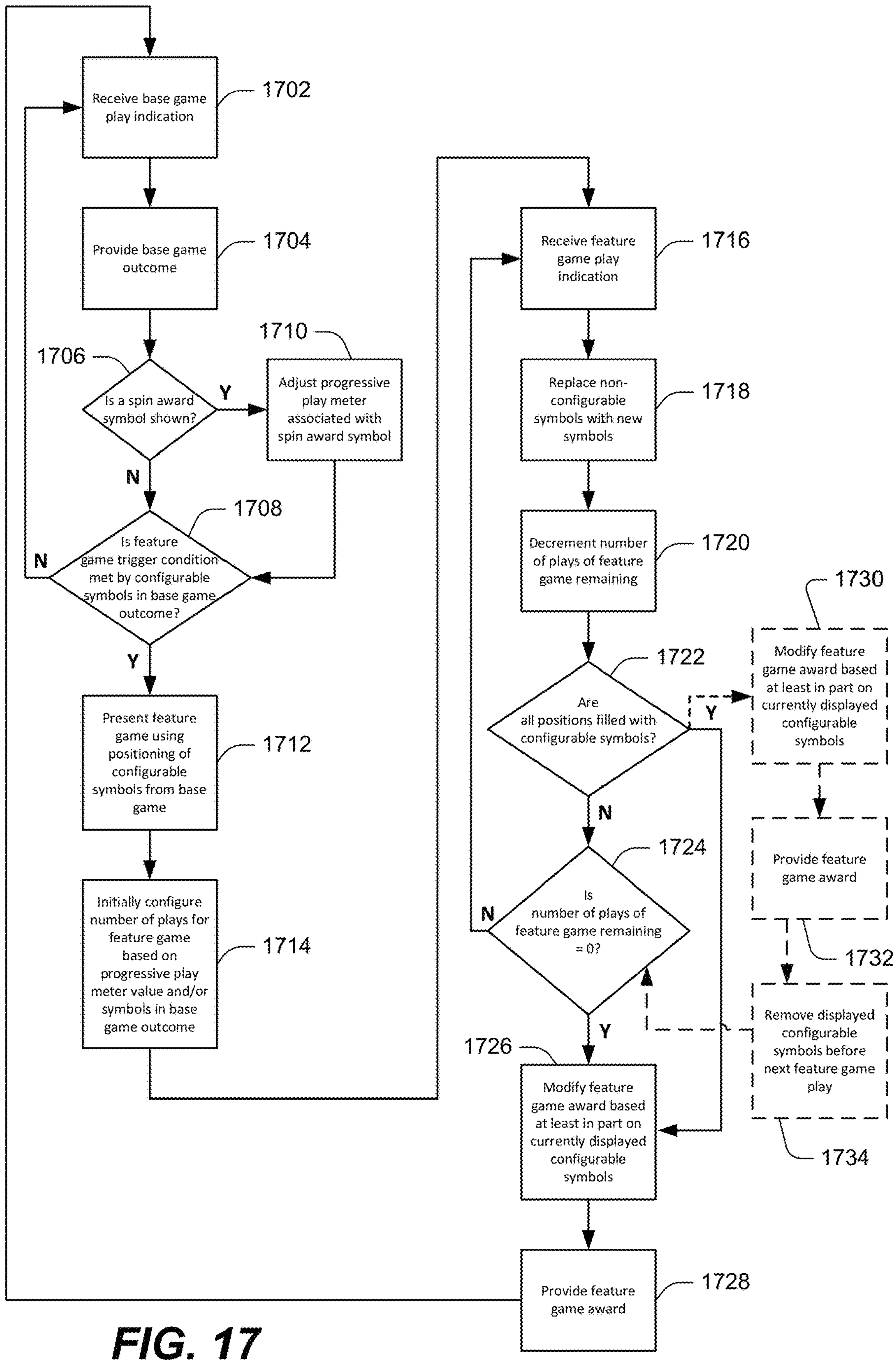
FIG. 17 is another flow diagram for another example embodiment of a process having a progressive play meter in accordance with various aspects of the present disclosure.

Another example embodiment is described in FIG. 17 which depicts another flow diagram for an example embodiment of a process having a progressive play meter in accordance with various aspects of the present disclosure. In block 1702, a play indication for the base game is received which may be input from a player, such as a bet or a wager, and/or the selection or pressing of a "play" button or portion on a screen. After block 1702, block 1704 may be performed to provide a base game outcome as described herein; this may include determining and displaying symbols for presentation on the display, such as described above for block 1602 and 1604 in FIG. 16. In block 1706 a determination may be made, as described herein, as to whether the determined and displayed base game outcome includes one or more spin award symbols. If the base game outcome includes one or more spin award symbols, then the progressive play meter corresponding to the displayed spin award symbol may be adjusted as indicated in block 1710 and described above, including with respect to block 1606, before proceeding to block 1708. If the base game outcome does not include one or more spin award symbols, then the technique may proceed to block 1708, in which a determination may be made as to whether a trigger condition for the feature game is met by the display of any configurable symbols that may be displayed in the base game outcome (e.g., a triggering condition may be met if at least six configurable symbols are displayed and this determination may be whether at least six such symbols are presented).

If, in response to block 1708, a triggering condition is not met by the base game outcome, then another base game may be played as indicated by block 1702 (assuming the player continues to play). If, in response to block 1708, a triggering condition is met, then the feature game may be presented in block 1712 as described herein, e.g., using the positioning/pattern of the configurable symbols from the base game at the time the triggering condition was met. As noted above, this may include displaying these configurable symbols in the feature game in the display positions of the bonus matrix that correspond to the positions these configurable symbols were displayed in the base game at the time the triggering condition was met. As indicated by block 1714, in some embodiments, the feature game may be initially configured to have a number of plays that is based on a progressive play meter and/or symbols presented in the base game outcome. Although described in detail throughout, some examples may include using the number of plays of a progressive play meter that corresponds to a spin award symbol that was displayed in the base game outcome that met the triggering condition or using the number of plays of a progressive play meter that corresponds to a user selection.

Once in the feature game, a feature game play indication may be received in block 1716. As described herein, this indication may be based on receiving a player input, such as pressing a play button or portion of a display; this indication may also be received from a processor's control, such as a processor causing the feature game to start without any player input. In block 1718 the feature game outcome may be determined and the symbols in the positions of the display matrix (e.g., the bonus matrix displayed during the feature game) without any held configurable symbols may be replaced with new symbols determined by the feature game outcome, such as symbols from a second set of symbols that may include configurable symbols and non-configurable symbols. During the feature game presentation, any displayed configurable symbols may generally be held in their displayed positions in the bonus matrix as described above. After a single feature game outcome is determined and displayed in block 1718, in block 1720 the number of available plays of the feature game may be decremented. Following this decrement, it may be determined in block 1722 whether all of the positions in the feature game display matrix display configurable symbols, as described earlier herein.

In response to block 1722, if all of the display matrix positions do not display a configurable symbol, then another determination is made in block 1724 as to whether the number of remaining feature plays is zero. If the number of plays of the feature game is not zero, then blocks 1716 through 1722 may be performed again. If the number of plays of the feature game is not zero, then block 1726 may be performed which modifies the feature game award based at least in part on the currently displayed configurable symbols. As described herein, this may include awarding the total value of the displayed configurable symbols. In response to block 1722, if all of the display matrix positions do display a configurable symbol, then block 1726 may be performed. In these instances, as described herein, this may include awarding the total value indicated by the displayed configurable symbols as well as, optionally, the application of a multiplier associated with the feature game to that sum. After block 1726, block 1728 may be performed, in which the feature game award amount may be presented using the display. After block 1728, the operations may return to block 1702.

Following the award and completion of a feature game, one or more of the progressive play meters may be reset to a respective default or seed number of spins. In some embodiments, the same default number of spins may be provided for each progressive play meter and for each of the feature levels. In other embodiments, a different number of default spins may be provided for each feature level. For example, in an embodiment with three levels, the progressive play meter for the first, e.g., yellow, feature level may initially be set to 8 spins, the progressive play meter for the second, e.g., green, feature level may initially be set to 12 spins, and the progressive play meter for the third, e.g., blue, feature level may initially be set to 15 spins. In some embodiments, only the progressive play meter for the awarded feature level is reset. In other embodiments, one or more additional progressive play meters may also be reset to their default value. For example, in embodiments where progressive play meters are maintained for different denominations and/or wager amounts, the progressive play meters that were in play when the feature was triggered may be reset to their default values.

In some embodiments, shown in FIG. 17 as optional operations 1730 and 1732, if after one of the feature game plays all of the display positions in the display matrix show a configurable symbol and the number of feature game plays is not zero, then the player may be provided with an opportunity to continue playing using the remaining feature game plays. For example, in some such embodiments, if block 1722 is determined as yes, then operations 1730 and 1732 may first be performed to modify the feature game award based on the displayed configurable symbols and provide an award to the player that is based on the values of the displayed configurable symbols and then removing the displayed configurable symbols prior to the next feature game play as indicated by operation 1734, and b) continuing with the play of the feature game with the remaining number of spins as indicated by returning to operation 1724 after operations 1734 (thus, for example, a player may be awarded feature game awards in multiple stages, e.g., at a first time when they fill all of the positions in the display matrix with configurable symbols and at a second time when they run out of feature game plays). Following this optional operation, block 1724 may be performed and if the number of remaining plays is not equal to zero, then at least blocks 1716 to 1722 may be performed again. This allows a player to play all of the feature game plays even if all of the display positions become filled with configurable symbols.

In various embodiments, when, during the play of a feature game, all symbol display positions are filled with configurable symbols, an award in addition to the sum of the values of the configurable symbols may be provided. This additional award could be one or more of the fixed prizes, such as the MINI, Minor, Maxi, Major, or Grand prizes or any other prize amount.

Information may be presented in the one or more displays regarding one or more feature game awards. This may include, for instance, displaying a total amount of the credits or value displayed in each configurable symbol displayed once all of the number of plays of the feature game have been played. This may also include information of multipliers and jackpots or other added values have been awarded to a player.

In some embodiments, during the feature game, information indicative of the number of plays of the feature game that are remaining may be presented. In some embodiments, this may take the form of a decreasing counter (e.g., "2 of 4 Plays Remain") which decreases after each play of the feature game, and in some other embodiments may take the form of an increasing counter (e.g., "2 of 4 Plays Have Been Played"); regardless of how presented, such information conveys the number of plays of the feature game remaining. The spin counter 858 of FIGS. 8J and 8K, for instance, is an increasing counter example. After each play of the feature game, the displayed information may be adjusted. For example, in FIGS. 8J and 8K, the spin counter 858 increased after one play of the feature game was played. Once the number of plays of the feature game reaches zero, the displayed counter may not reach zero (e.g., "4 of 4 Plays Have Been Played), and the feature game may end and may cause the presentation of information regarding one of the feature game awards. This may include, for example, the total value of the numbers displayed in each of the displayed configurable symbols, or a multiplier applied to the total value of these numbers.

Figure 11A:
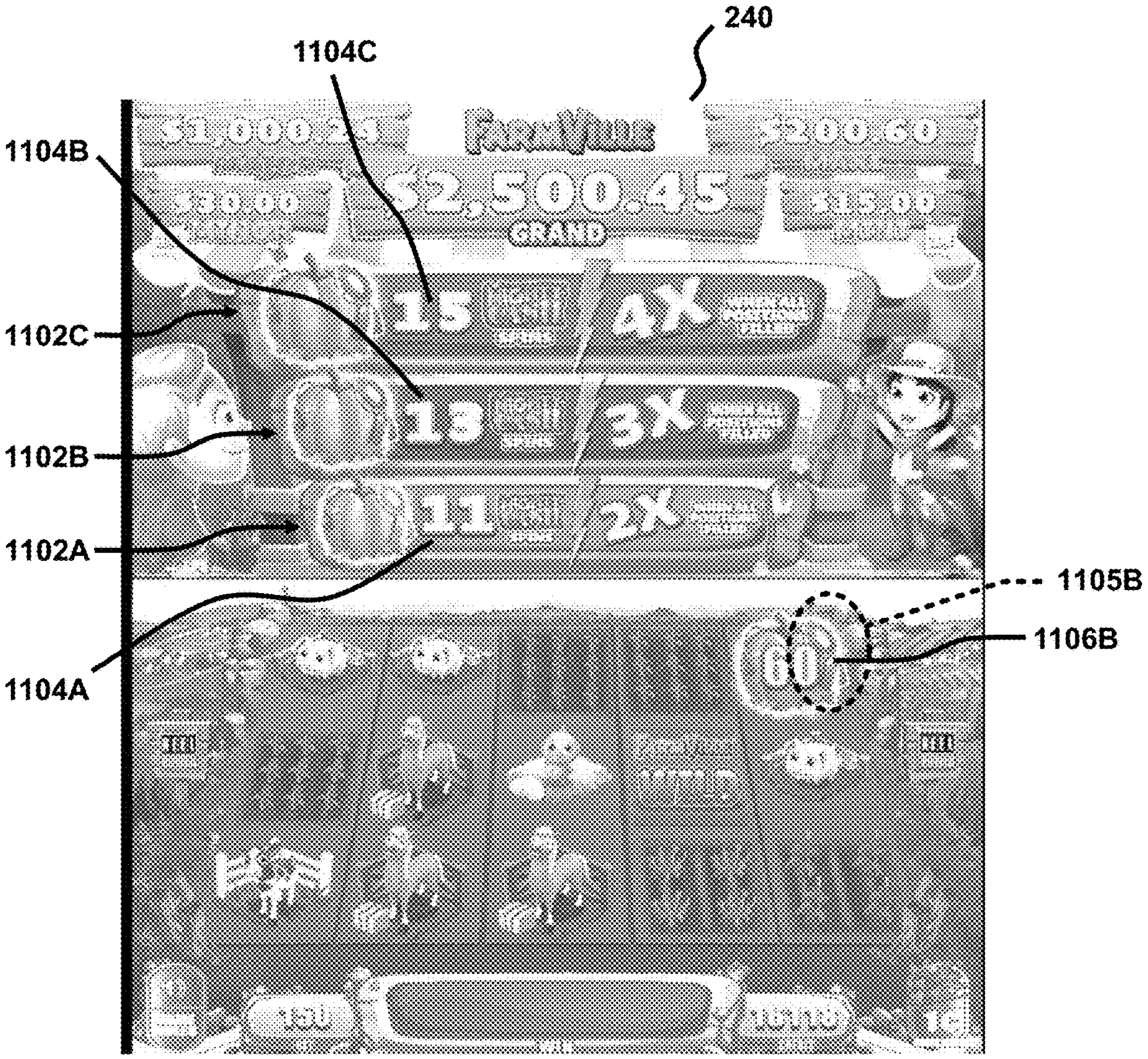
FIGS. 11A to 11C are screen shots illustrating certain aspects of an embodiment of a feature game with progressive play meters.
Figure 11B:
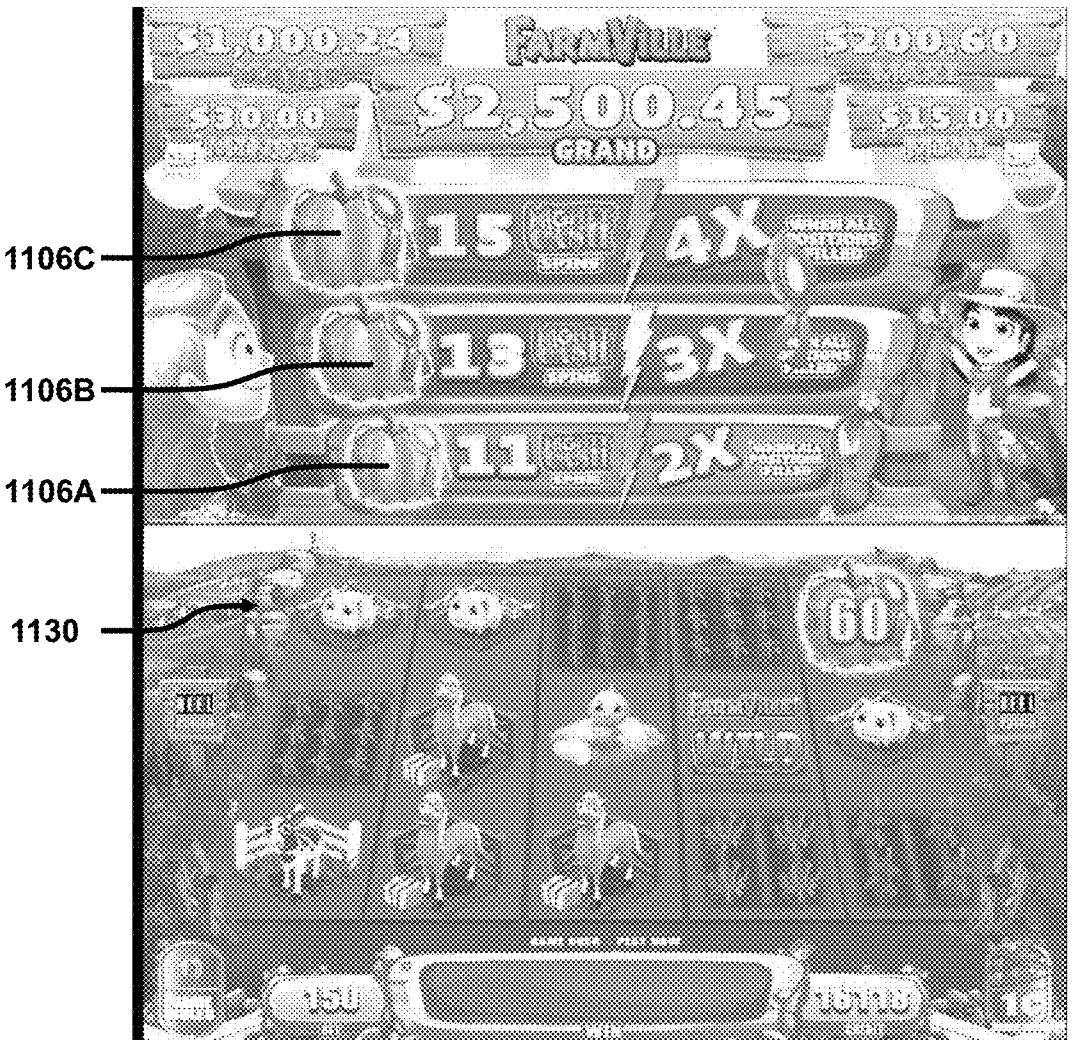
Figure 11C:
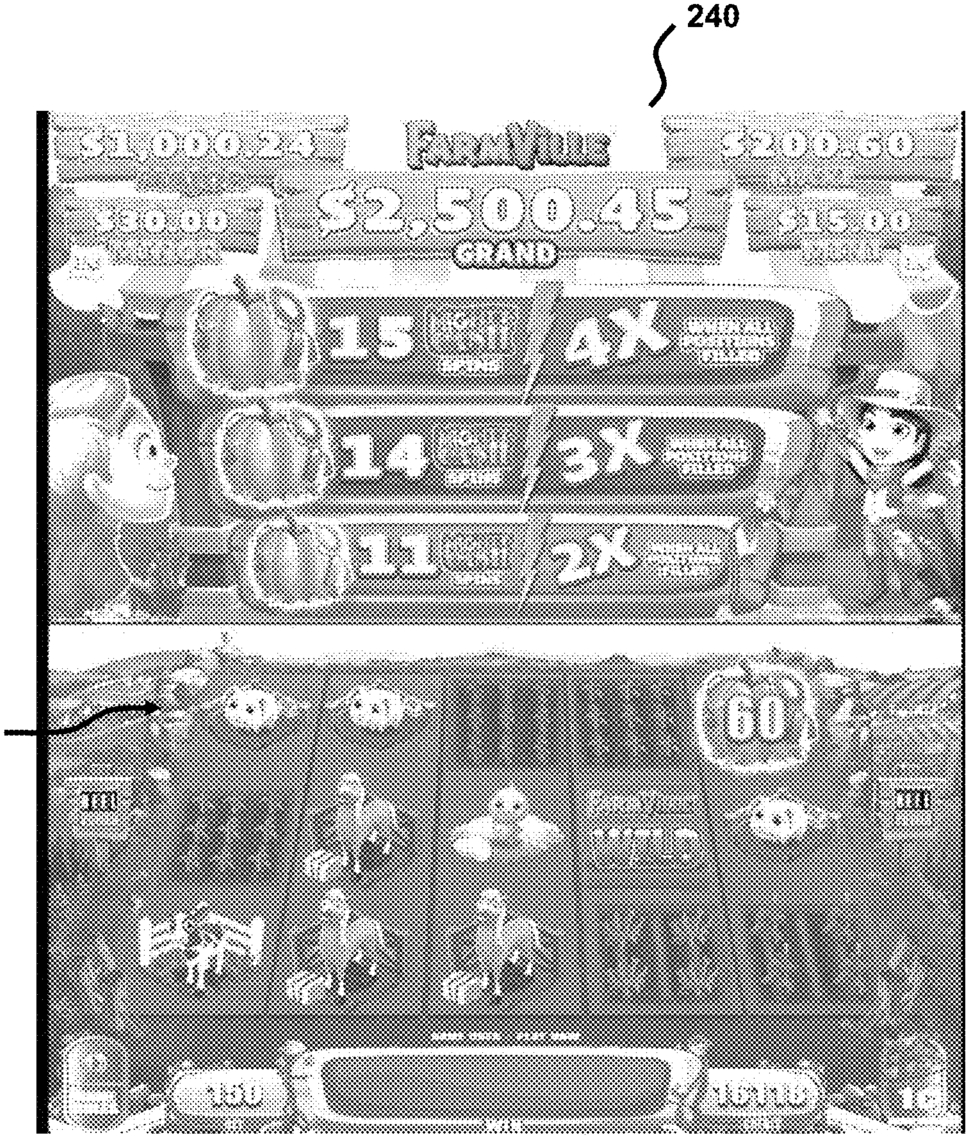

As stated above, a plurality of feature levels and a plurality of corresponding progressive play meters may be displayed during the base game. FIGS. 11A to 11C are screen shots of a display, such as the primary game display 240, at different phases during play of a base game and which are related to a feature game that may be triggered during play of the base game according to some embodiments of the present disclosure. The base game embodiments shown in FIGS. 11A to 11C are similar to the embodiments of FIGS. 8A-8M, except that these embodiments include a plurality of progressive play meters and a plurality of feature levels. The base game in FIGS. 11A to 11C is illustrated as having a farm theme, where the game symbols display farm-related elements such as horses, pigs, cows, crops, fields, etc. In keeping with this theme, the configurable symbols are represented in this example embodiment by pumpkins. As discussed above, the configurable symbols may include value symbols, jackpot symbols, mystery symbols, and/or repeater symbols.

In FIG. 11A, three progressive play meters 1104A, 1104B, and 1104C and three feature levels 1102A, 1102B, and 1102C are shown. Each of these feature levels corresponds to one of the progressive play meters and here, feature level 1102A corresponds with progressive play meter 1104A, feature level 1102B corresponds with progressive play meter 1104B, and feature level 1102C corresponds with progressive play meter 1104C. Each progressive play meter may initially be set to a default number of plays which may be the same number as one or more of the other progressive play meters, or may be different than some of the other progressive play meters. In FIG. 11A, the progressive play meter 1104A for a first feature level 1102A may initially be set to 11 plays, the progressive play meter 1104B for a second feature level 1102B may initially be set to 13 plays, and the progressive play meter 1104C for a third feature level 1102C may initially be set to 15 spins. In some embodiments, the display of a single spin award symbol may cause adjustment of more than one progressive play meter. For example, a configurable symbol that is a jackpot symbol may result in adjusting all of the displayed progressive play meters by a particular amount or by particular corresponding amounts, e.g., incrementing all of the displayed progressive play meters by 1, or by increasing each level of displayed progressive play meter by an increasing number based on the level of each progressive play meter (for example, the lowest-level progressive play meter may be incremented by 1, the middle-level progressive play meter may be incremented by 2, and the highest-level progressive play meter may be incremented by 3—or vice versa).

In some embodiments, each of the feature levels may have at least one corresponding spin award symbol. For example, each feature level may have a corresponding designation, such as a different number or color, and the corresponding spin award symbols may also include the same designation. In FIG. 11A, each feature level is designated by a different color, e.g., the first or yellow feature level 1102A, the second or green feature level 1102B, and the third or blue feature level 1102E. As mentioned herein, the progressive play meters may be incremented (and/or decremented) based on events occurring during play of the base game. For example, in some embodiments, the base game may include spin award symbols that increment one or more of the progressive play meters when they appear in a base game outcome. In some embodiments, the spin award symbols may be in the form of configurable symbols that can also function to trigger the hold and spin feature game. For example, in certain embodiments, the spin award symbols may be value, jackpot, mystery and/or repeater symbols that include a further designation, e.g., color or other indicia, to indicate that they also function as spin award symbols. In the illustrated embodiment of FIG. 11A, the spin award symbols are designated by pumpkins (configurable symbols) with award ribbon indications ("ribboned pumpkins"). In various embodiments, progressive play meters may be incremented (and/or decremented) based on random events, various wager thresholds such as a total amount wagered, etc.)

In some embodiments, the appearance of a particular level (e.g., color) spin award symbol in a base game outcome causes the respective progressive play meter to be adjusted. For example, in the illustrated embodiment of FIG. 11A, the color of the ribbon designates the feature level to which a given spin award symbol applies. In particular, a yellow ribboned pumpkin increments the progressive play meter for the first (yellow) level, a green ribboned pumpkin 1106B increments the progressive play meter for the second (green) level, while a blue ribboned pumpkin 1106C increments the progressive play meter for the third (blue) feature level. By way of example, FIG. 11A shows a base game outcome in the display matrix 1130 that includes a green ribboned pumpkin 1106B, which causes the second level progressive play meter 1104B to be incremented from 13 spins (see FIG. 11A) to 14 spins (see FIG. 11C). The ribbon designation in FIG. 11A is encompassed by dotted ellipse 1105B. In some instances, an animation may be shown when incrementing the progressive play meters. For example, the ribbon may be illustrated as moving from the pumpkin in the game outcome to the respective progressive play meter in association with incrementing that progressive play meter. (See, e.g. FIG. 11B).

In some embodiments, different increment amounts may be provided for each of the feature levels. For example, in some embodiments with three feature levels, the first level may increment by 1 play for each first level spin award symbol, the second level may increment by 2 play for each second level spin symbol, while the third level may increment by 3 plays for each third level spin symbol. Additionally, in some embodiments, a single spin award symbol may cause more than one progressive play meter to be incremented. For example, in some embodiments the configurable symbol pumpkins may carry more than one designation, e.g., ribbon, where each ribbon causes a respective progressive meter to increment by a designated number of spins. In some embodiments, the number of spins incremented may be randomly determined each time a spin award symbol is displayed.

Some embodiments may also include symbols that cause one or more of the progressive play meters to decrement. For example, in some embodiments, some spin award symbols may be assigned negative values that cause the associated progressive play meter to decrement. For example, in the implementation of FIG. 11A, a rotten pumpkin symbol may cause one of the progressive play meters to be decremented or reset to an initial value.

Figure 14:
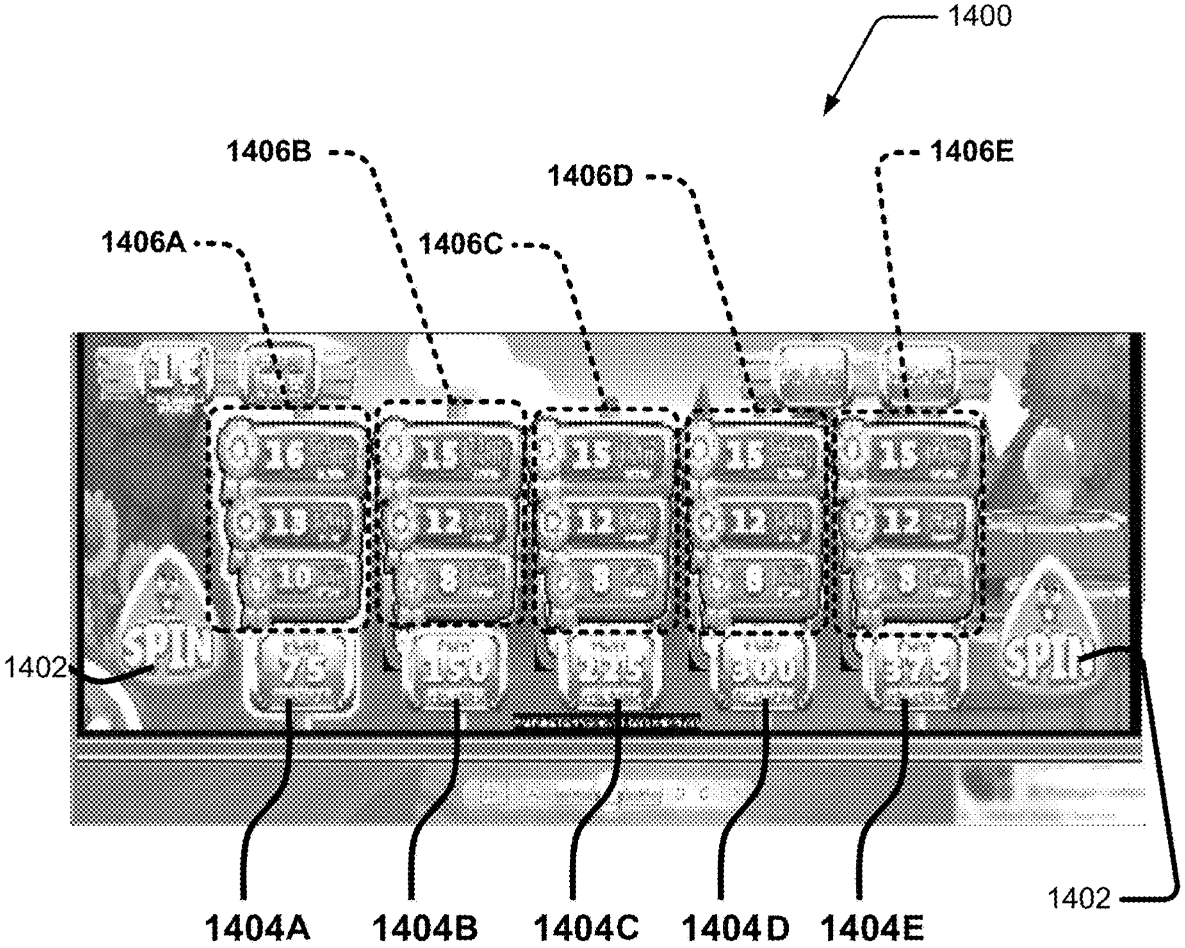
FIG. 14 shows a button deck of an embodiment of a feature game with progressive play meters.

In some embodiments, the plurality of feature levels may include a plurality of sets of feature levels, with each set including one or more feature levels. FIG. 14 shows a video button deck 1400 of an embodiment of a base game with progressive play meters. The button deck 1400 may be displayed on the primary display 240 or on other displays of the gaming device. The button deck includes spin buttons 1402 and wager buttons 1404A through 1404E for a plurality of determined wager amounts, e.g., 75 credits, 150 credits, 225 credits, 300 credits, and 375 credits. In operation, the button deck 1400 allows a player to select a wager amount for the base game by pressing one of the wager buttons and to initiate a play of the base game by pressing one of the spin buttons. Also displayed on the button deck is a plurality, e.g., five, of sets of feature levels, with each set of levels 1406 encompassed by dotted indicators 1406A-1406E; each set of feature levels has three levels. Each wager amount is associated with one set of levels, such as wager button 1404A being associated with the set of feature levels 1406A. Each of these sets of feature levels has three feature levels, and each of these feature levels includes a corresponding progressive play meter. For example the three progressive play meters corresponding to the three feature levels of set of feature levels 1406A indicate, respectively 16, 13, and 10 plays.

In some embodiments, the progressive play meters that are adjusted when a spin award symbol is obtained during base game play may correspond to the wager amount used in that play of the base game. In some such embodiments, the wager amount for a particular set of levels may be selected by a user in association with a base game play (or spin). If a spin award symbol is determined and displayed for that base game play, then one or more of the progressive play meters corresponding to the set of levels for that selected wager amount may be adjusted. Referring to FIG. 14, if the wager amount of wager button 1404A is selected by a player, and a spin award symbol is determined and displayed for that base game play of that wager amount, then one or more of the progressive play meters corresponding to the set of levels 1406A may be adjusted.

As shown, each wager amount may include a respective set of progressive credit meters. In the illustrated example, where three feature levels are provided, respective first, second, and third progressive play meters may be separately provided for each wager amount. In some embodiments, the number of feature levels (and according progressive play meters) may be the same for each denomination and/or wager amount. In other embodiments, a different number of feature levels may provide some or all of the bet denominations and/or wager amounts. For example, in some embodiments, the number of feature levels may increase with higher wager amounts. For example, a first wager amount may have one feature level, a second wager amount may provide two feature levels, and a third wager amount may provide three feature levels, etc.

In some embodiments, the gaming device may provide for a plurality of different bet denominations, such as 1 cent, 2 cents, 5 cents and 10 cents. In such embodiments, respective sets of progressive play meters may be provided for each bet denomination. For example, in an embodiment with three feature levels, respective first, second and third progressive meters may be separately provided for each bet denomination. In this regard, FIG. 14 shows the button deck configured to display the progressive meters for 1 cent bet denominations. If a different bet denomination is selected, the button deck may be populated with the progressive play meters for the selected denomination.

Figure 13A:
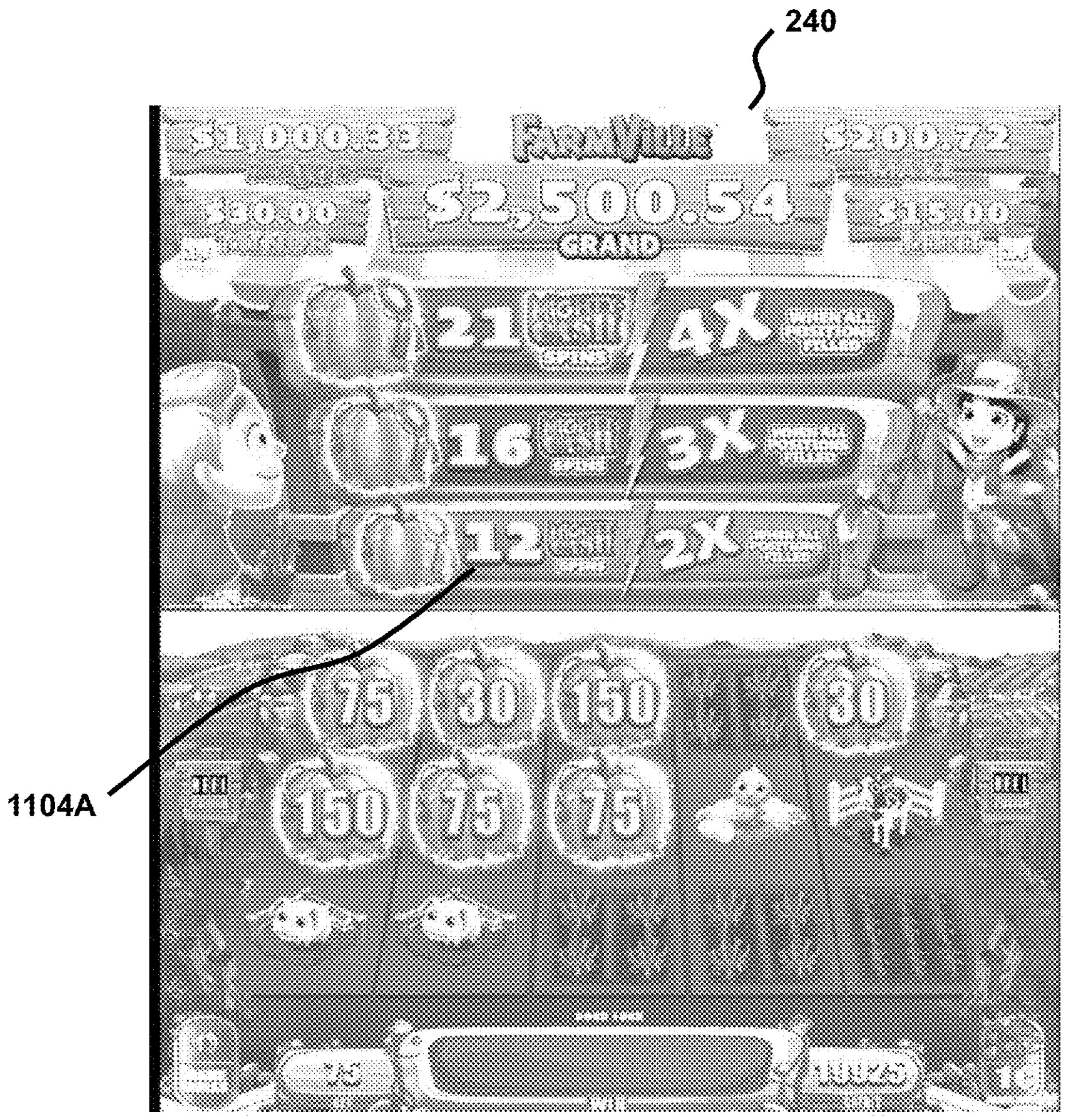
FIGS. 13A to 13O are screen shots illustrating certain aspects of an embodiment of a feature game with progressive play meters.
Figure 13B:
Figure 13C:
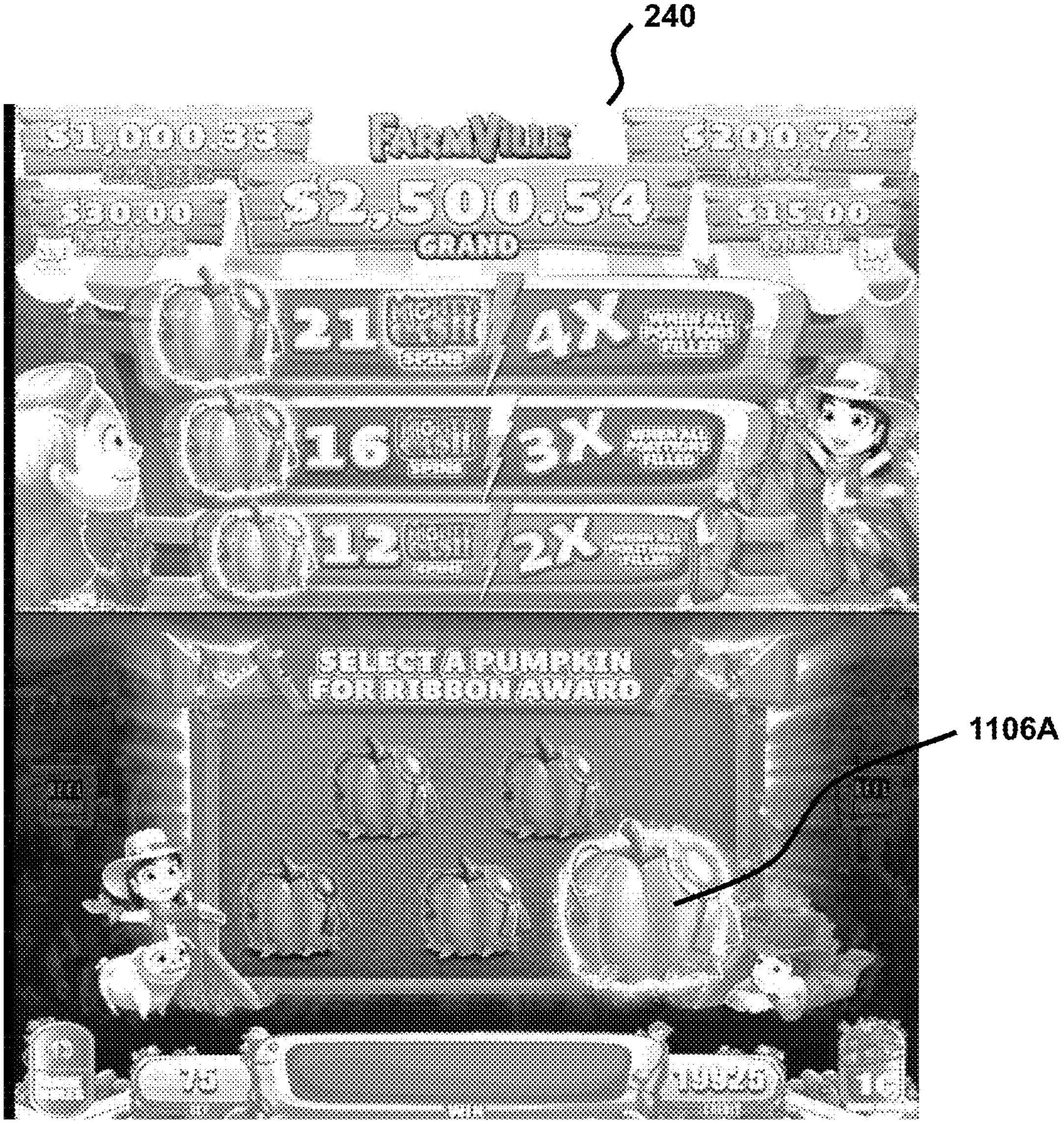
Figure 13D:
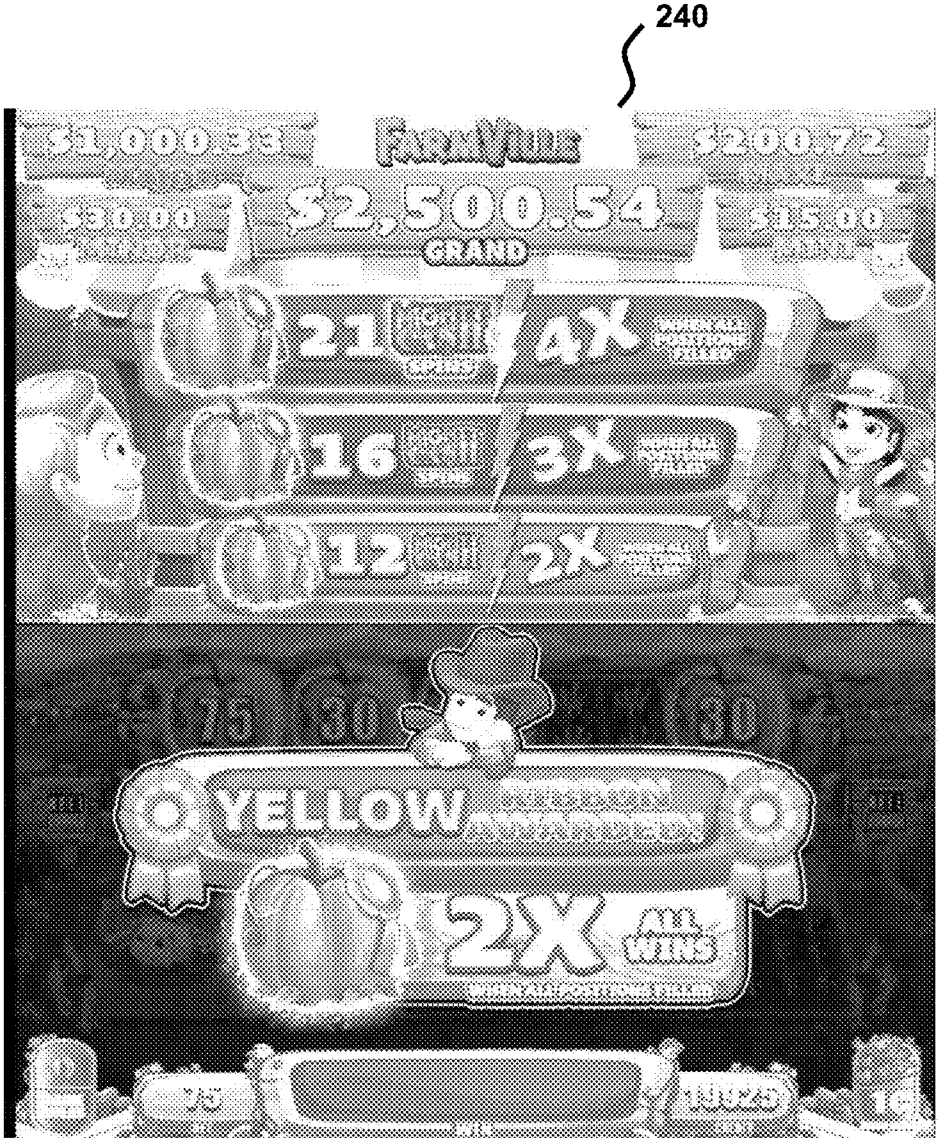
Figure 13E:
Figure 13F:
Figure 13G:
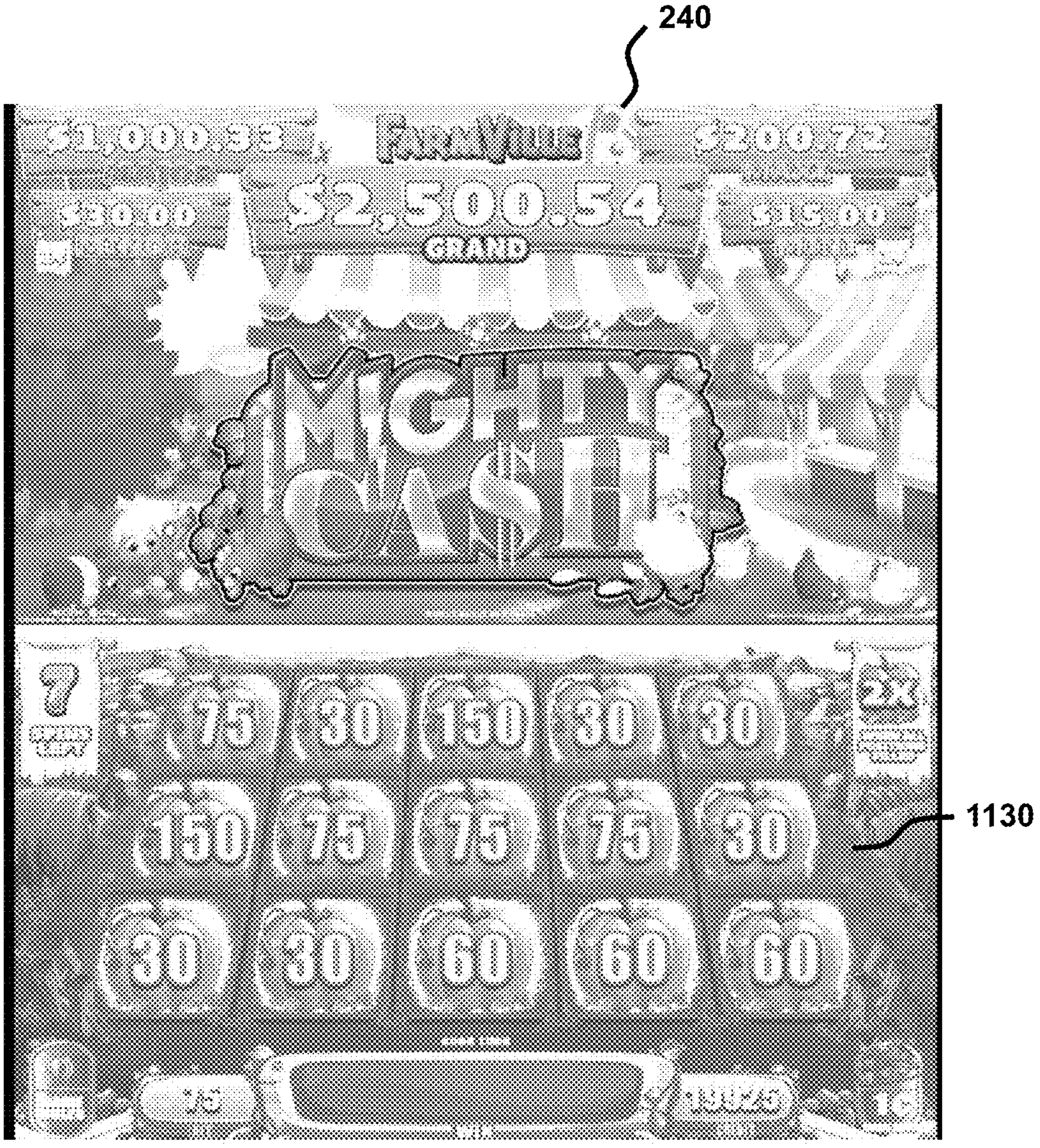

In some implementations, one or more of the feature levels may also include an associated multiplier which may be applied or awarded to a feature game award if all of the positions of the display matrix are filled with configurable symbols during the feature game (see, e.g., FIG. 13G). For example, referring back to FIG. 11A, the embodiment illustrated here has a multiplier associated with each of the three feature levels. As shown, a 2× multiplier may be associated with the first (yellow) feature level 1102A, a 3× multiplier may be associated with the second (green) feature level 1102B, and a 4× multiplier may be associated with the third (blue) feature level 1102C. In some such embodiments, when a feature game is triggered that is configured to provide the number of plays indicated by the progressive play meter that corresponds to one feature level, the feature game award may be based on the multiplier of that feature level if all of the positions of the display matrix are filled with configurable symbols during the feature game. For instance, in FIG. 11A, if the feature game is triggered by the appearance of the spin award symbol that is associated with the second feature level, as described for FIG. 11A, the applicable multiplier of 3× that is associated with that second feature level may part of the basis for the feature game award if all of the positions of the display matrix are filled with configurable symbols during the feature game. For example, see FIG. 13G, in which all of the symbol positions have been filled with configurable symbols totaling 960 credits; as can be seen in the upper right corner of the "field" of pumpkins, a 2× multiplier associated with the progressive play meter that was used to initiate the feature game in this example is active, which would result in the feature game payout being 960×2=1920 credits.

When a hold and spin feature game is triggered, e.g., by appearance of the designated number of triggering symbols in a base game outcome, the feature level(s), and the corresponding progressive play meter for that feature level, for the hold and spin feature game may be determined in a variety of ways. In instances where the triggering base game outcome includes a spin award symbol, the level of the spin award symbol may be used to select the feature level for the hold and spin feature game from the feature levels associated with the wager amount associated with the triggering base game outcome. In some such embodiments, the feature game may be configured to provide the number of plays indicated by the progressive play meter that corresponds to the feature level that corresponds to the spin award symbol. This may also include adjusting the progressive play meter corresponding to the spin award symbol displayed in the triggering base game outcome.

Figure 12A:
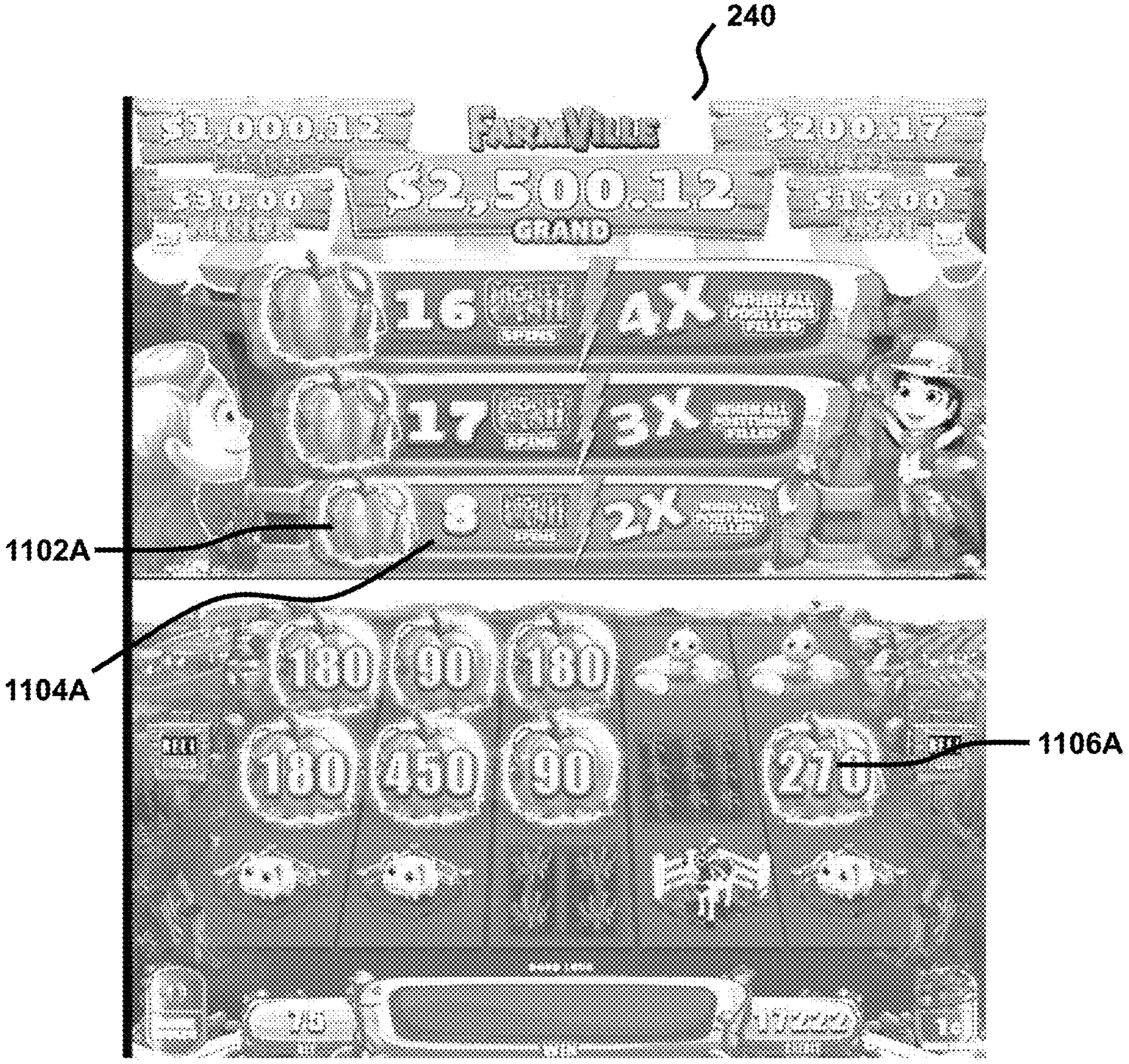
FIGS. 12A to 12E represent screen shots illustrating certain aspects of embodiments that include reel-specific value meters.

For example, FIG. 12A shows an instance where the triggering base game outcome includes a spin award symbol. In particular, the base game outcome shown in FIG. 12A includes seven pumpkins, including a pumpkin with a yellow ribbon, i.e., the 270 credit pumpkin (identified by reference 1106A). This base game outcome triggers the hold and spin feature because it includes the required number of configurable symbols (pumpkins), e.g., at least 6 in this example. In addition, in this example, the feature level will be played at the first (yellow) level because the triggering base game outcome includes a pumpkin with a yellow ribbon.

In the illustrated embodiment, the progressive play meter 1104A for the first (yellow) feature level 1102A reads 8 spins at the time the feature is triggered. (See FIG. 12A). In this embodiment, the first progressive play meter is not updated to reflect the additional spin award symbols that appeared in the triggering base game outcome. In other embodiments, spin award symbols received in a triggering base game outcome may be credited to the appropriate progressive play meter.

Figure 12B:

The game then transitions to the hold and spin feature game, in accordance with one or more embodiments as described in the present disclosure. FIG. 12B is a screen shot of a transition screen that may be shown on the display 240 when transitioning from the base game to the feature game. The transition screen may prompt the player to make an input, such as to press a start button to begin the feature game.

Figure 12C:
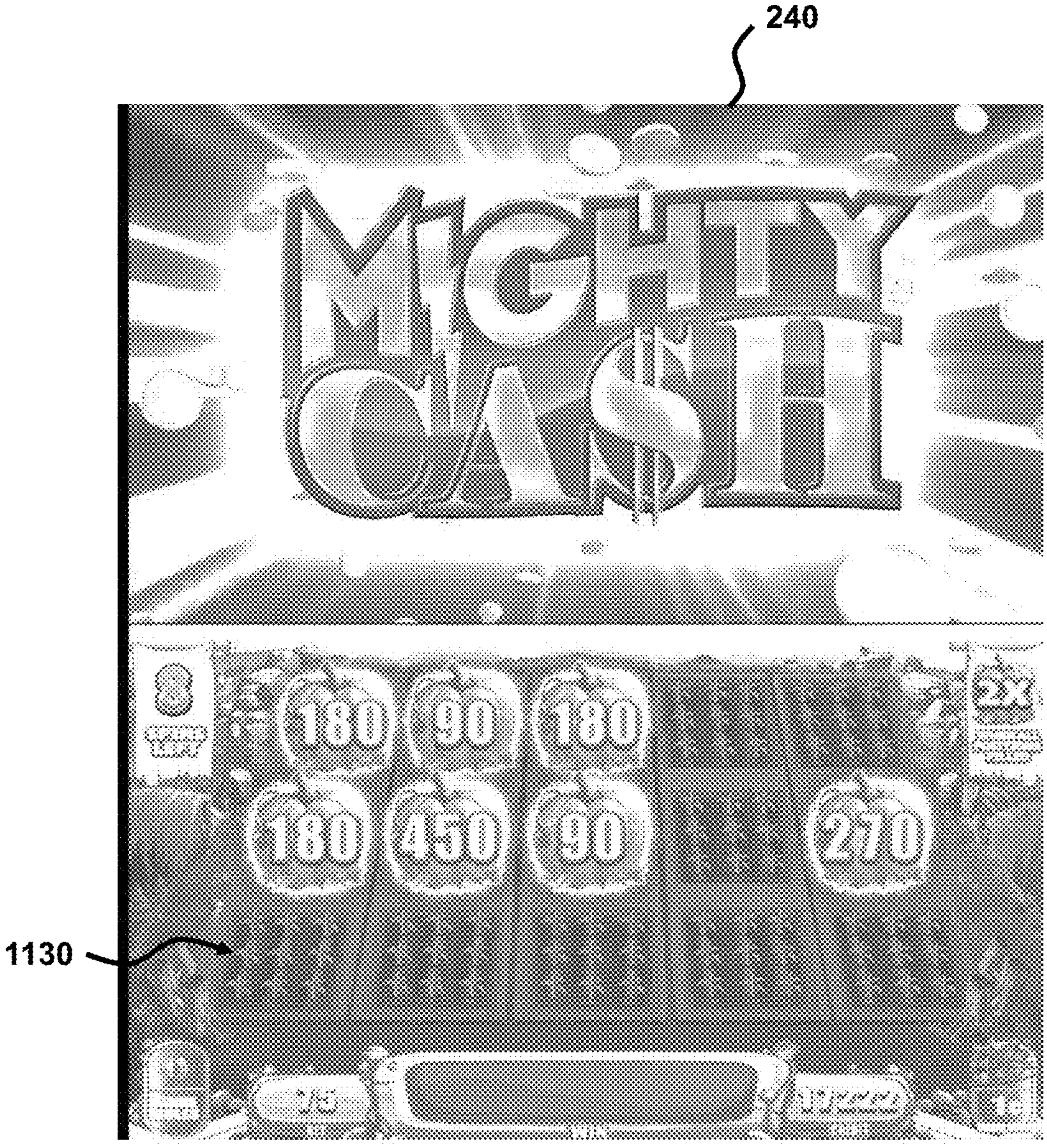
Figure 12D:
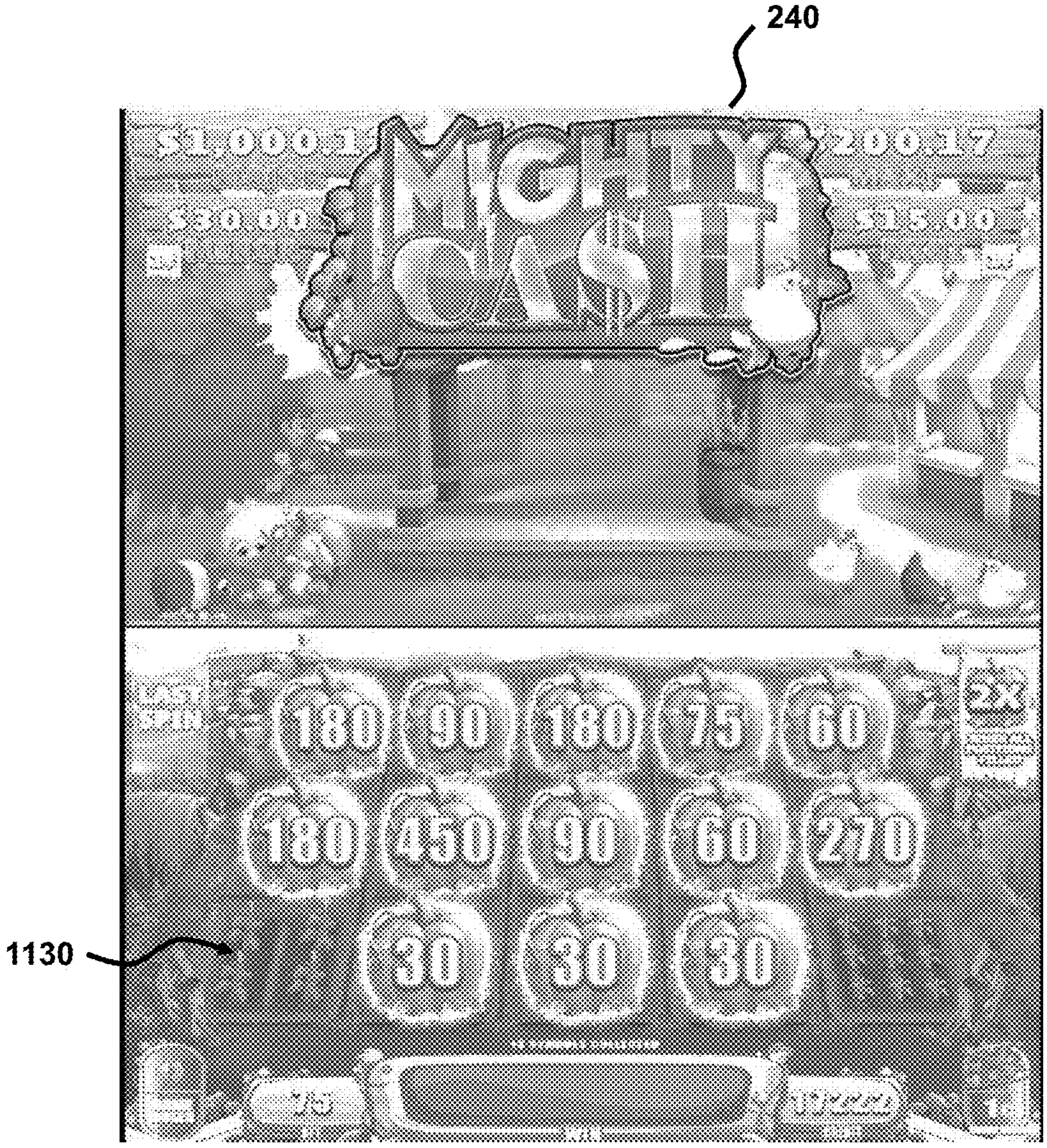
Figure 12E:
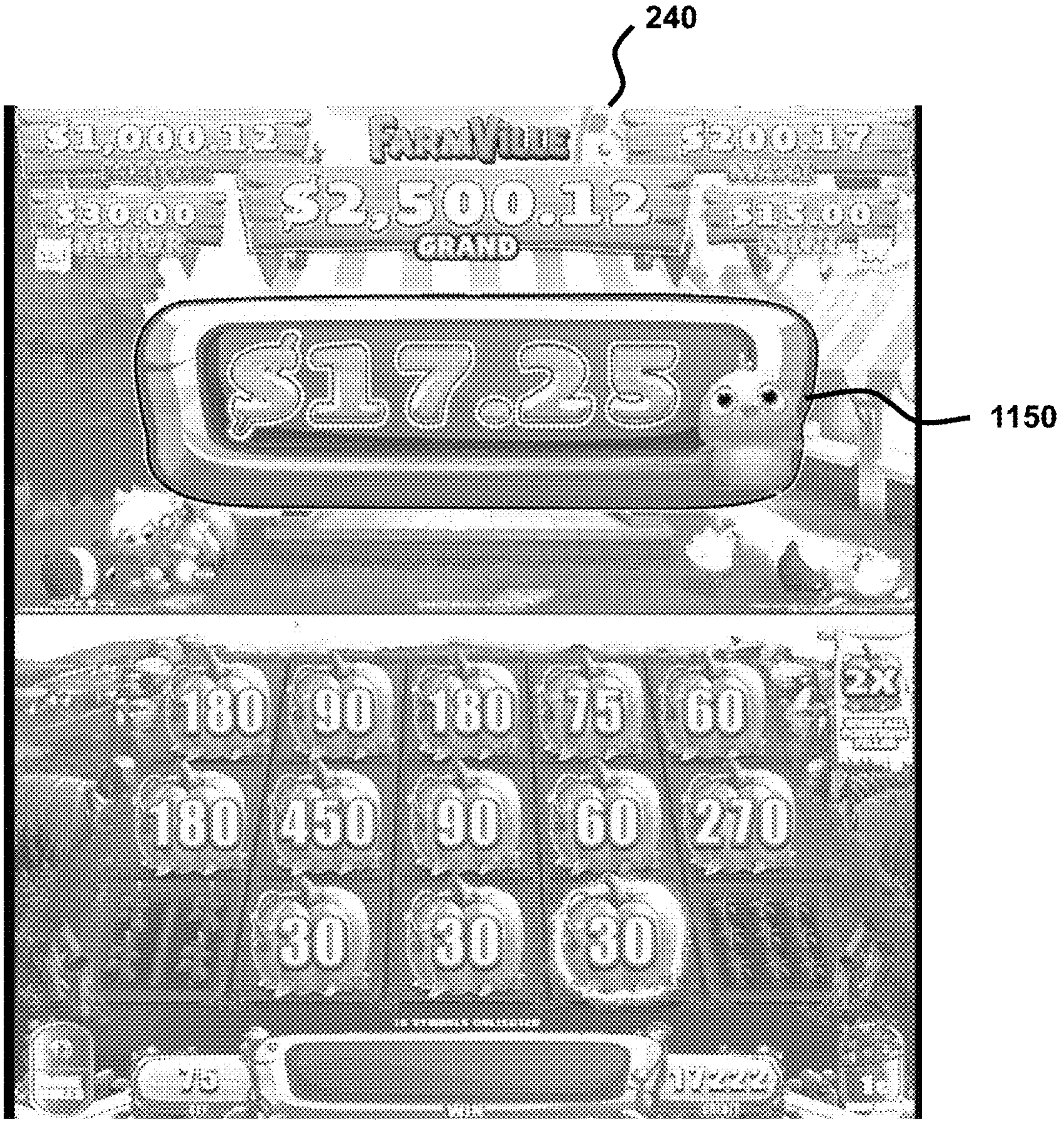

FIGS. 12C and 12D are screen shots illustrating play of feature game that was trigged in FIG. 12A. The feature game is in the form of a hold and spin game in which any configurable symbols from the triggering base game outcome are retained on the display matrix 1130 and the player is awarded an additional number of plays (e.g., 8 in the illustrated example) during which the player tries to accumulate more of the configurable symbols. FIG. 12C shows the display 240 at the start of the hold and spin feature and FIG. 12D shows the display following completion of the last play of the feature game. In this example, the player collected a total of 13 pumpkins, including seven during the triggering base game outcome and an additional six during the hold and spin feature game. Once the feature game is completed, the controller determines and pays out a feature game award. For example, if the matrix 1130 is not fully populated with configurable symbols, the player may be awarded a prize amount corresponding to the accumulated value of the displayed configurable symbols. In the illustrated example, the player is awarded $17.25 on a credit meter 1150 based on the 1750 credits that were collected during the hold and spin feature. (See FIG. 12E).

In some embodiments, multiple spin awards symbols may appear in a triggering base game outcome. In such embodiments, the appearance of multiple spin award symbols may result in the award of multiple instances of the hold and spin feature game. For example, if the triggering base game outcome includes a first, e.g., yellow, level spin award symbols and third, e.g., blue, level spin award symbol, two separate instances of the feature game may be initiated. Specifically, one game instance is using the progressive play meter and associated multiplier of the first feature level and a second instance using the progressive play meter and multiplier for the third feature level. In such embodiments, the triggering base game outcome may be fully replicated such that the hold and spin feature begins with at least two identical display matrices that may be played independently during the hold and spin feature game. In particular, separately for each game instance, the configurable symbols in a respective game instance may be held in place while any non-configurable symbols are replaced with a symbol selected from the set of configurable and non-configurable symbols.

In other embodiments, only a single hold and spin feature game may be awarded even when multiple spin award symbols are displayed in the triggering base game outcome. In such embodiments, the feature level may be randomly selected, either with or without player input. Alternatively, the highest level of the displayed spin award symbols may be used to select the feature level. For example, if the triggering base game outcome includes a first, e.g., yellow, level spin award and third, e.g., blue, level spin award symbol, the feature level may be played at the third feature level.

If a triggering base game outcome does not include any spin award symbols (see, e.g., FIG. 13A), the applicable feature level, and its corresponding progressive play meter, may be determined in a variety of ways. In some embodiments, the lowest feature level may be assigned for the hold and spin feature game. In other embodiments, the gaming device may randomly assign a feature level, either with or without player input. For example, in some embodiments, a spinning wheel game may be used to determine the feature level for the hold and spin game. In other embodiments, the gaming device may present the player with a plurality of picks, where each pick corresponds to one of the available feature levels. The controller may award a feature level to the player in response to the player's selection of one of the picks. In some embodiments, the feature level may be determined by the feature level with the feature level with the highest progressive play meter when the one or more triggering conditions is met, of the feature level with the lowest progressive play meter when the one or more triggering conditions is met. Once the feature level is determined, the feature game is configured to provide the number of plays indicated by the progressive play meter that corresponds to the determined feature level.

For example, FIG. 13B shows a screen shot where the player is prompted to select a pumpkin to determine what feature level will be awarded. In the illustrated example, the player's selection (see, e.g., FIG. 13B) results in the award of the first (yellow) feature level 1102A. At the time the feature level was triggered in this example, the first level progressive play meter 1104A was set at 12 spins. (See FIG.

13A). Accordingly, the player's selection results in a feature level with 12 plays and a 2× multiplier. FIGS. 13D and 13E are screen shots that may appear during transition to the hold and spin feature game. In FIG. 13D, the gaming device displays a message announcing that the yellow ribbon has been awarded and a 2× multiplier will be applied if all the symbol positions are filled. In FIG. 13E, the display provides a message indicating that the feature level will have 12 spins, i.e., plays of the feature game.

FIGS. 13F to 13S are screen shots illustrating play of the hold and spin feature game that was trigged in FIG. 13A. FIG. 13F shows the display prior to the first spin. At this time, the display matrix 1130 is populated with the configurable symbols (e.g., pumpkins) that were awarded in the trigger outcome from the base game.

In FIG. 13G, after completing 5 spins of the feature game the display matrix 1130 has been completely filled with configurable symbols, but the player still has 7 spins remaining in the feature. In some embodiments, the hold and spin feature game may end if the player fills the display matrix with configurable symbols, even if more spins remain in the feature. However, in the illustrated embodiment, the player may be allowed to continue playing the hold and spin feature until all of the awarded spins have been used. In this embodiment, if the display matrix 1130 is filled and spins remain, the gaming device may award the displayed credit values (subject to any applicable award enhancer, in this case which is 2×) and clear the held symbols from the display matrix before continuing with the remaining spins.

Figure 13H:
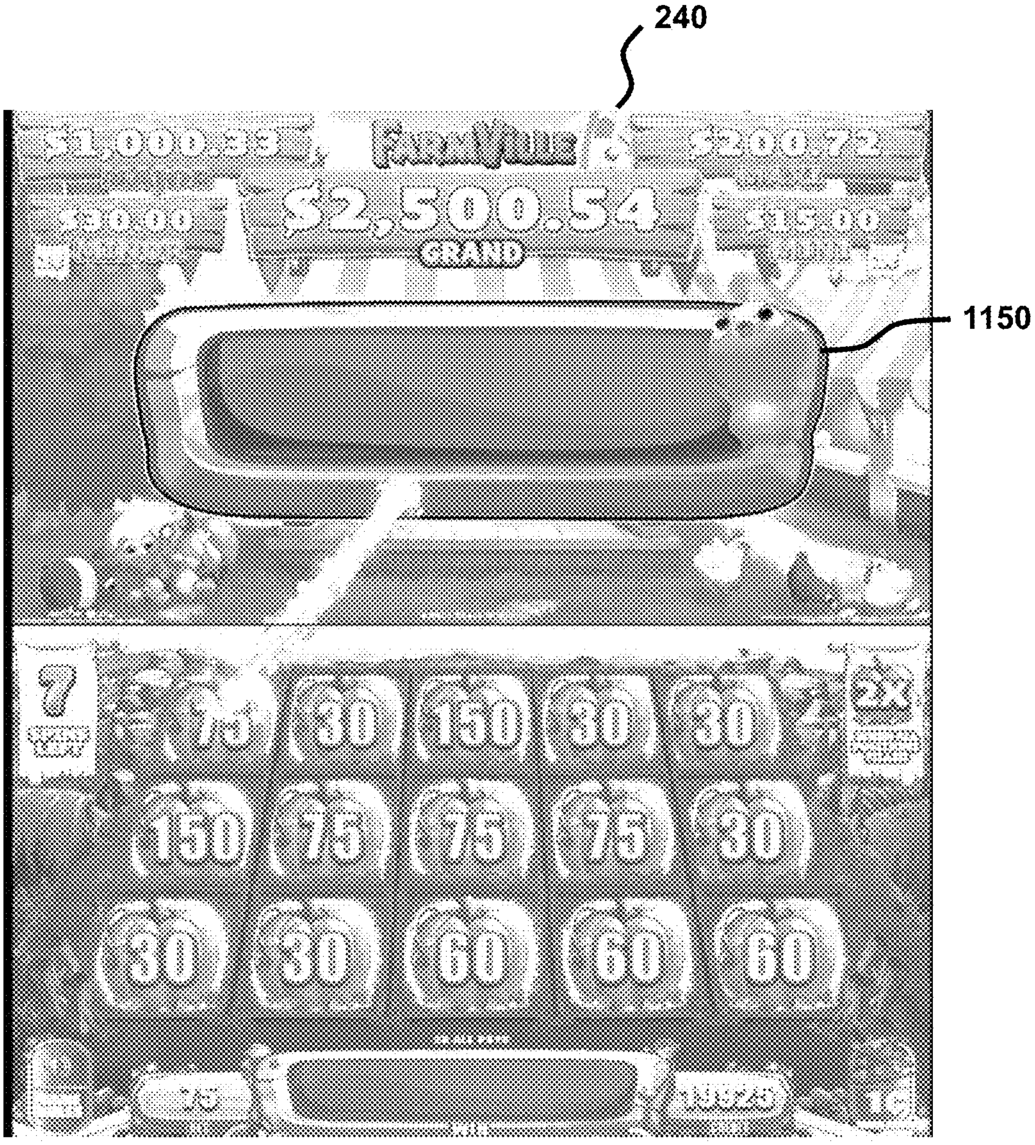
Figure 13I:
Figure 13J:

An animation may be provided to visually display the credits being accumulated (or summed) from the held configurable symbols before the display matrix 1130 is cleared. For example, as is shown in FIGS. 13H to 13J, the animation may display rockets (not shown) or other elements sequentially moving from each respective configurable symbol to the credit meter 1150. When a respective rocket reaches the meter, it may explode and the value from the originating configurable symbol may be added to the prize meter. In this example, the credit meter displays the monetary value of the awarded credits, e.g., 1 cent per credit in this example. In instances where a multiplier is applied, this process may be repeated a number of times corresponding to the multiplier, e.g., twice for a 2× multiplier, three times for a 3× multiplier, etc. The meter may show the collected credits or the cash equivalent to the collected credits. In the illustrated example, the player is awarded $19.20 which is twice the value of credits on the held symbols. (See FIG. 13J).

In some embodiments, the values carried by the configurable symbols may be increased each time the matrix 1130 is filled and cleared during the feature game. For example, the configurable symbols may initially carry values ranging from 25 to 150 credits. Following the matrix being filled and clears a first time, the values of the configurable symbols may range between 30 and 250 credits, for example. Additionally, in some embodiments, the multiplier may be increased each time the matrix is filled during the hold and spin feature. For example, a 2× multiplier may be applied for filling the matrix a first time, a 3× multiplier may be applied for filling the matrix a second time, a 5× multiplier may be applied for filling the matrix a third time, etc.

Figure 13K:
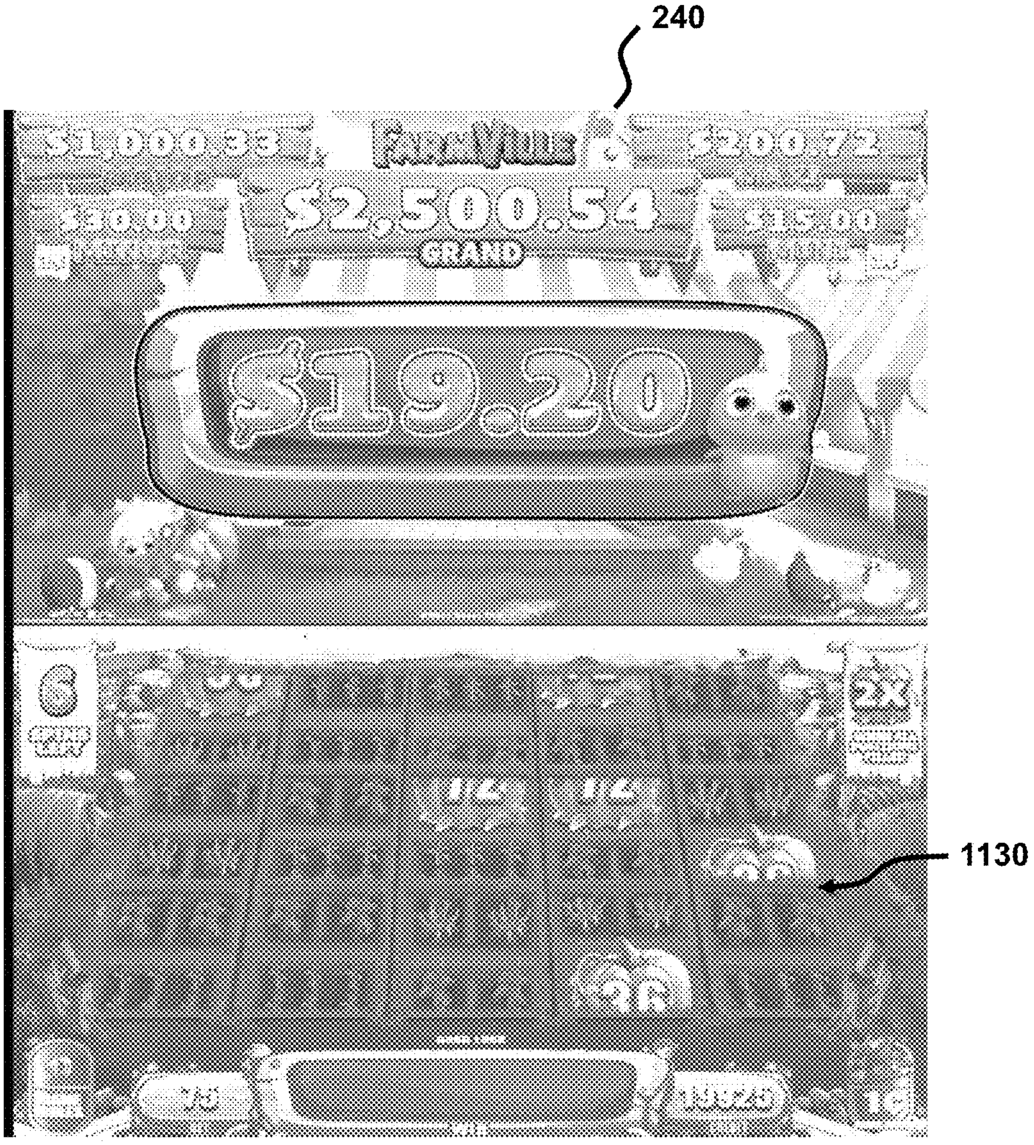
Figure 13L:
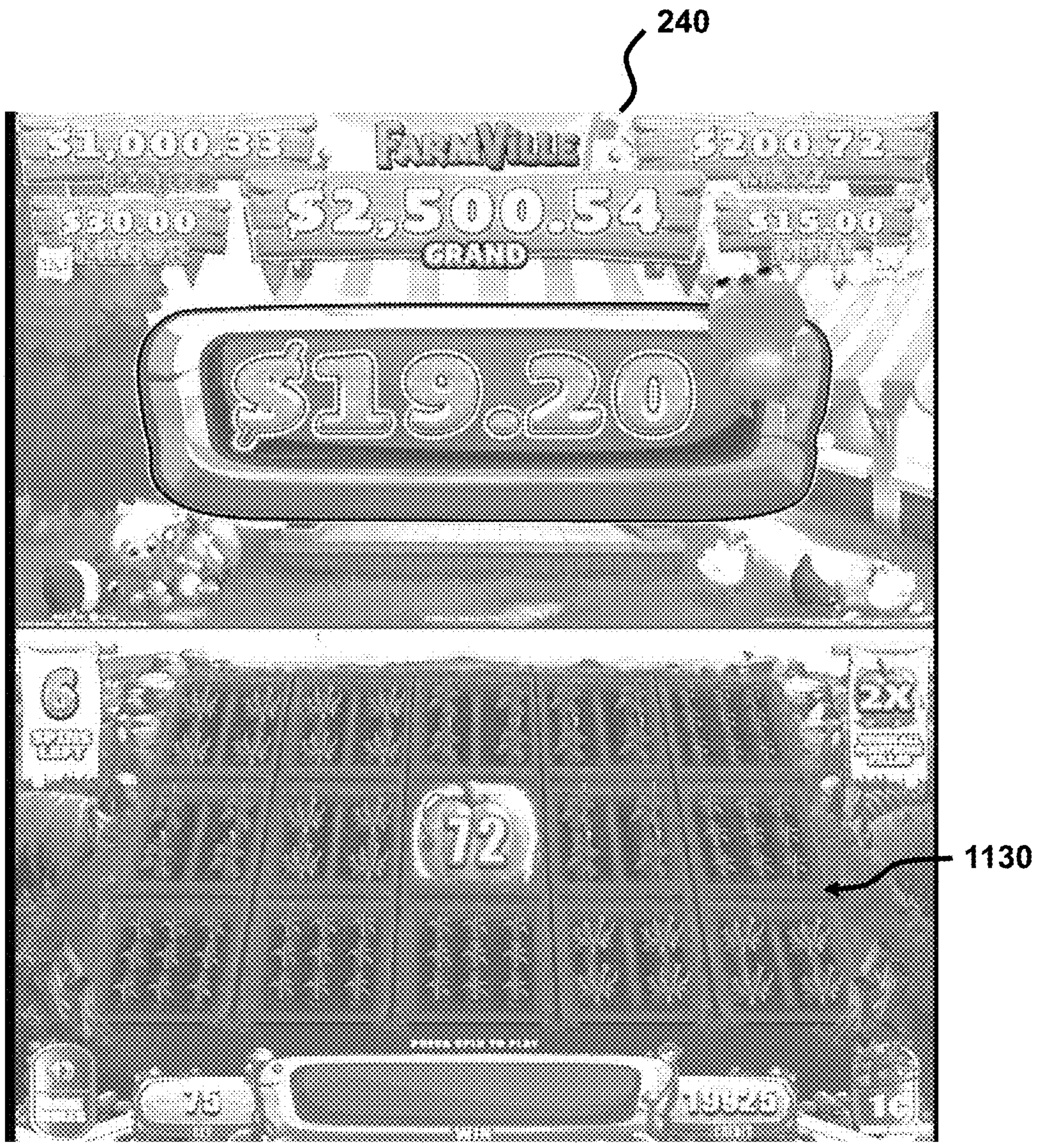
Figure 13M:
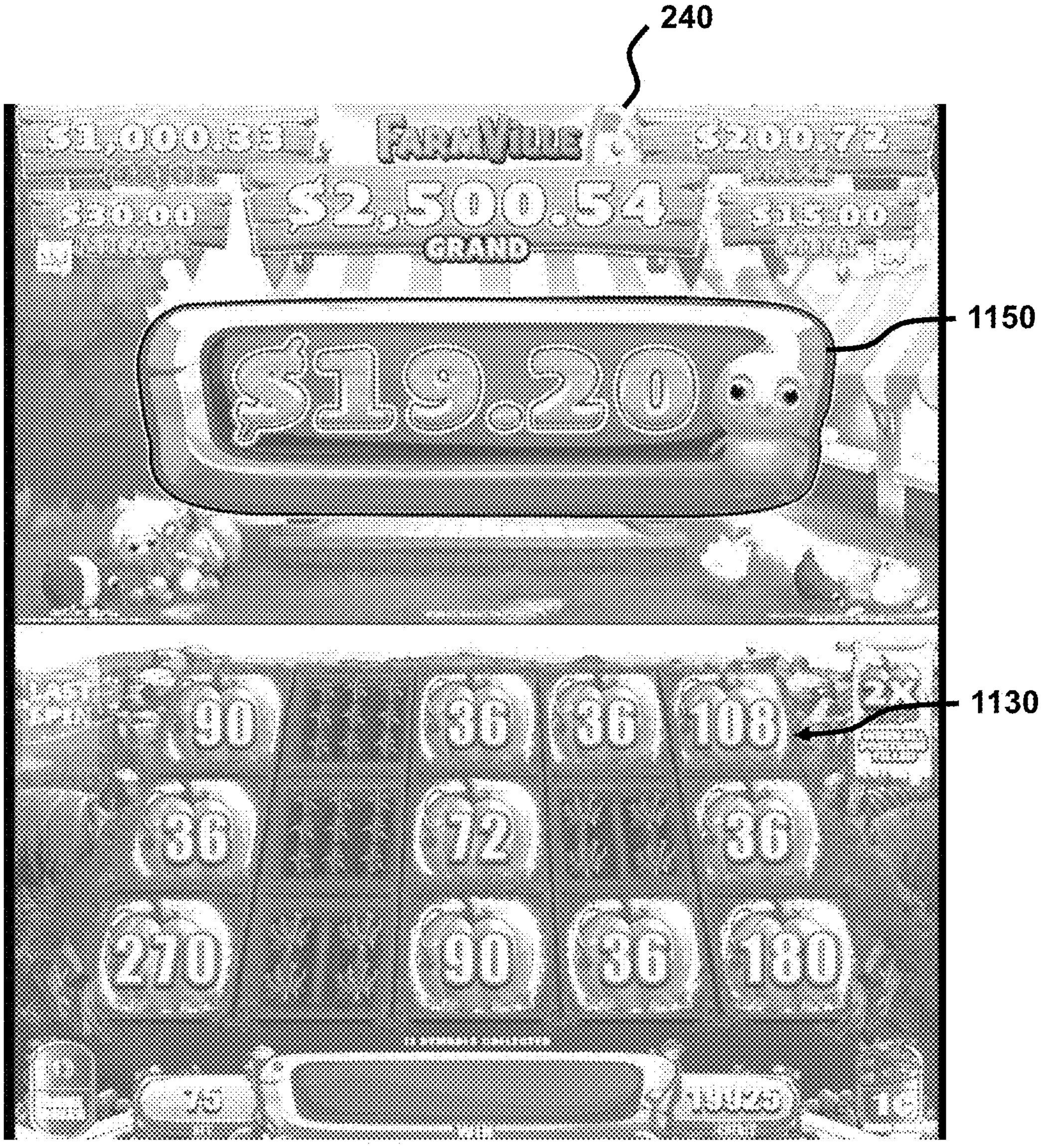
Figure 13N:
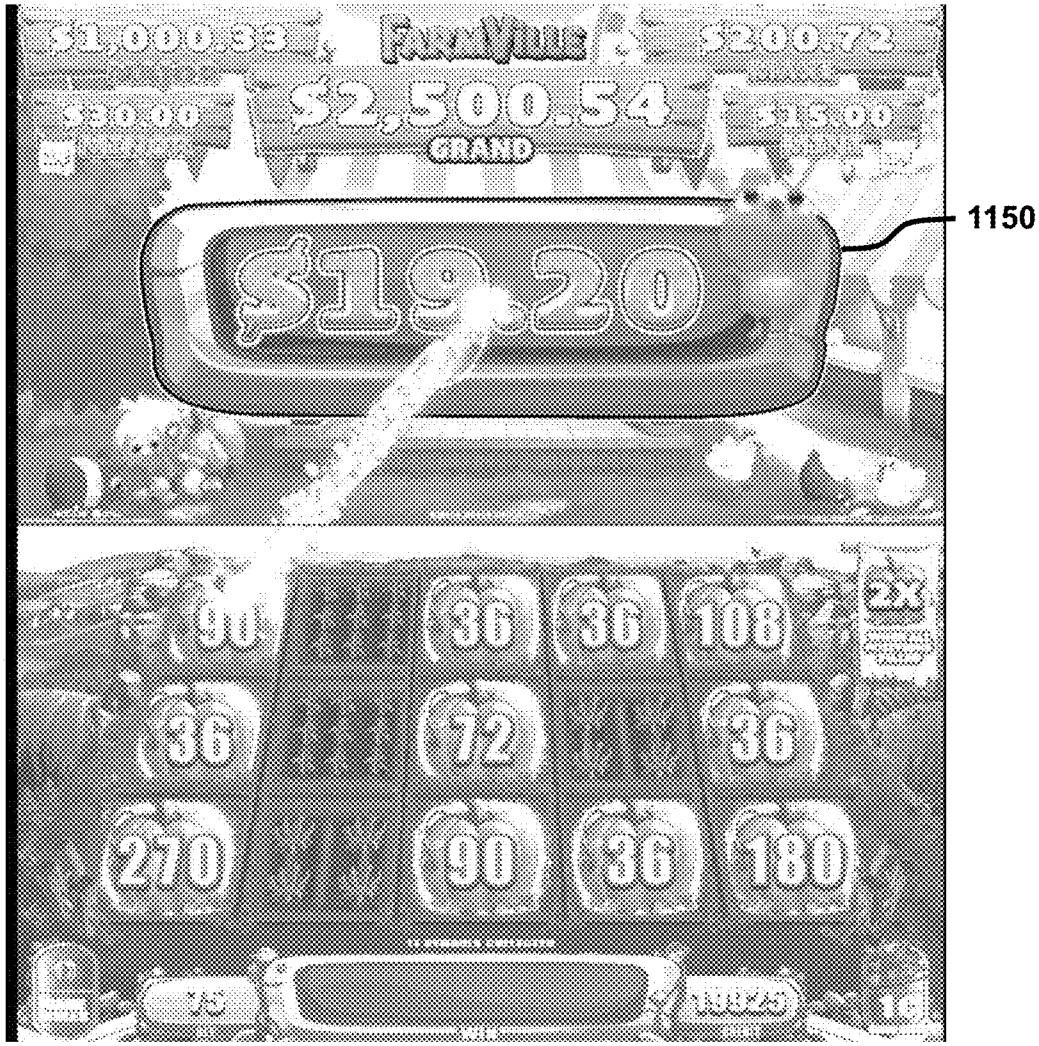
Figure 13O:
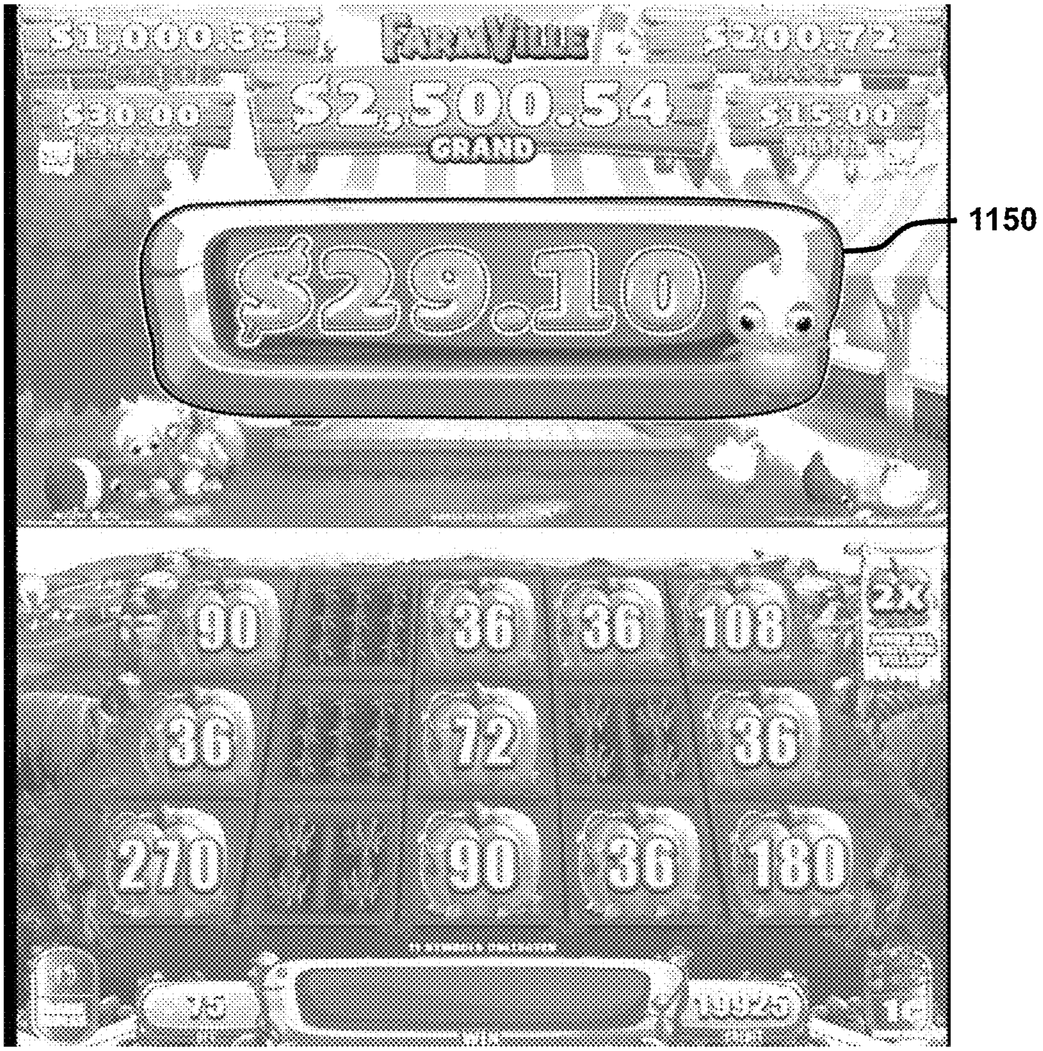

FIG. 13K shows the display during the ensuing spin after the matrix 1130 has been cleared of held symbols. FIG. 13L shows the game outcome after the spin of FIG. 13K is completed. As shown, the player has collected an additional pumpkin with a value of 72 credits. FIG. 13M shows the display after all of the remaining spins have been completed. In this example, the player collected an additional 11 pumpkins with a combined value of 990 credits. An animation may again be shown to visually display the credits being accumulated (or summed) from the configurable symbols that are held at the completion of the feature. (See FIG. 13N). FIG. 13O shows the display 240 after values from the hold symbols have been added to the credit meter 1150.

In some embodiments, separate progressive play meters may be maintained for each bet denomination and/or wager amount. For example, in some embodiments, the gaming device may provide for a plurality of different bet denominations, such as 1 cent, 2 cents, 5 cents and 10 cents. In such embodiments, respective sets of progressive play meters may be provided for each bet denomination. For example, in an embodiment with three feature levels, respective first, second, and third progressive meters may be separately provided for each bet denomination as described above. In some similar embodiments, one wager amount may correspond to one progressive play meter. The base game outcome and corresponding display symbols may be based, at least in part, on a wager amount selected from the plurality of wager amounts, and the progressive play meters corresponding to the selected wager amount may be adjusted.

It will be understood that hold-and-spin feature games, such as are discussed herein, provide an enticing new wagering game experience that allows a player to, collect (or gain equity in) various feature game parameters, e.g., the number of plays of the feature game, over time, e.g., by playing the base game, until the player is potentially rewarded for their efforts by winning an opportunity to benefit from the increased equity. Progressive play meters thus provide a mechanism to maintain player interest in a particular wagering game that they are playing—during the course of play, the progressive play meters may increment; the higher a progressive play meter is, the more the player that caused the progressive play meter to increase will be invested in the game. Due to such investment in the game, the player may be more likely to continue playing the base game in the hopes that they will be awarded with the experience of reaping the benefits of the progressive play meter in the feature game.

For hold-and-spin feature games in which there are multiple levels of progressive play meters, this effect may be much more pronounced, as the use of multiple levels of progressive play meters (especially if each set of levels is associated with a different wager level in the base game) may allow for different progressive play meters to be at different levels at different times, with a high chance that at least one progressive play meter, over time, will be at a significantly elevated value compared to the other progressive play meters. A player will be more likely to want to continue playing the base game in the hope of triggering the feature game using that high-value progressive play meter than if the progressive play meters are all around the same value. Additionally, including larger numbers of progressive play meters may allow for the frequency with which spin award symbols are provided in the base game to be increased, as the spin awards may be distributed amongst several levels of progressive play meters, thereby avoiding concentrating all of the spin awards in one progressive play meter and causing an imbalance in the feature game award outcomes.

The concepts regarding progressive play meters described herein may also be applicable to other embodiments and implementations. For example, a progressive meter may be used to indicate a number of wild symbols that may be presented during the feature game; this may be considered a progressive wild symbol meter and may be implemented in a manner similar to that of the progressive play meters discussed herein. In one such example, this may include the display of one progressive wild symbol meter displaying a number of wild symbols that may be presented or presentable during a feature game. In another example, this may include the display of a plurality of progressive wild symbol meters, similar to that described above. In some such embodiments, the progressive wild symbol meter that may be used if a feature game is triggered may be selected as described earlier for progressive play meters, such as with the display in the base game of a configurable symbol with a designation associated with one of the progressive wild symbol meters, or associated with a level that corresponds with each of the progressive wild symbol meters (e.g., the presentation of three levels, with each level having a corresponding progressive wild symbol meter). This selection may also be based on, at least in part a play selection, random selection, or a wager amount. For instance, the progressive wild symbol meter associated with a selected wager amount in the base game may be used if a feature game is triggered. In some embodiments, there may be a plurality of progressive wild symbol meters that each have a corresponding multiplier. This multiplier may be applied to a feature game award or the wild symbol that is displayed during the feature game. For instance, one progressive wild symbol meter may be associated with a 2× multiplier and a second progressive wild symbol meter may be associated with a 3× multiplier. These multipliers may be applied to one or more of a feature game award, a value of a wild, and a value of configurable symbols.

In some embodiments, some progressive play meters may be associated with multiple instances of the feature game that may be displayed, either sequentially or in parallel, and each of these instances of the feature game may be initially configured, when triggered, to allow a number of plays that is based on the progressive play meter associated therewith. For example, there may be three levels of progressive play meters available for a wager amount in the base game; if the feature game is triggered in association with the first level, then one instance of the feature game may be provided for play and using the value of that progressive play meter to initially configure the feature game. If the feature game is triggered in association with the second level, then two instances of the feature game may be provided for play using the value of that progressive play meter to initially configure both instances of the feature game. Similarly, if the feature game is triggered in association with the third level, then three instances of the feature game may be provided for play using the value of that progressive play meter to initially configure all three instances of the feature game. Thus, a player may, if triggering the feature game in association with the third level of progressive play meter, be provided with the ability to play three separate feature games, either in parallel or sequentially. In such instances, the initial pattern of configurable symbols used in each instance may be the same, e.g., based on the triggering outcome in the base game, but each play of an instance of the feature game may have an independent outcome, so the player may win different amounts in each instance.

In some embodiments, the displayed feature game may be a different type of bonus game that is not a hold-and-spin type of game. For example, in some embodiments, the bonus game may be a "Treasure Hunt" or "Pick X Game" in which a grid of locations are displayed and a player is provided with the ability to select a subset of those locations. Each selection of a grid location may cause a hidden symbol to be displayed and each hidden symbol may be associated with an award or no award (although in some instances of such games, every location may have a symbol indicating an award, although the awards associated with various symbols may have different values, generating uncertainty as to the total award that the player will obtain). Thus, once all of the available player selections in a feature game have been used up, the total award based on the revealed symbols may be awarded to the player. These bonus games may have one or more corresponding progressive play meters, such as described earlier, except here the first progressive play meters may provide the number of selections that the player is allowed to make in the feature game. In some instances, there may be levels of progressive play meters as described earlier.

In some embodiments, a progressive award meter may be displayed during the base game that may be indicative of a progressive award that may be provided if all positions of the display matrix are filled with a configurable symbol during the feature game; this progressive award meter may operate similar to the progressive play meter displayed above. The number of the progressive award meters may be based on the value of symbols shown during the base game, such as configurable symbols including jackpot, repeater, and mystery symbols. In some instances, the progressive award meter may be a running total of value of the symbols shown during one or more base game plays. The applicable progressive award meter for the feature game may be determined in any of the ways described above.

Those of ordinary skill will appreciate that (1) the number of configurable symbols required to trigger the feature game; (2) the number of free games awarded; (3) number of decrements of free game counter; (4) the number of configurable symbols that have to be displayed to win a prize or jackpot in the feature game; (5) the multiplier to apply; (6) the value of the mystery symbol; (7) the additional quantity of spins; (8) the prize value of the configurable symbols; (9) the number of increments or decrements of the progressive free spin counter or (10) any other determination or variable described or contemplated in the present disclosure may at least in part be (a) randomly determined; (b) predetermined; (c) determined based on a wager amount and/or level; (d) centrally determined; (e) determined based on a generated symbol or symbol combinations; (f) determined based on player selection; (g) determined based on player skill; (h) determined based on a side wager or ante bet; (i) determined based on a status of the player; (j) determined as a combination of two or more determinations disclosed herein; etc.

It is to be understood that, if any prior art is referred to herein, such reference does not constitute an admission that the prior art forms a part of the common general knowledge in the art in any country.

In the claims which follow and in the preceding description, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the disclosure.

What is claimed is:

1. An electronic gaming system comprising:

one or more displays; and a game controller that includes one or more processors and one or more memory devices, wherein:

the one or more processors, the one or more memory devices, and the one or more displays are operably connected, and the one or more memory devices store computer-executable instructions for controlling the one or more processors to:

cause a base game to be presented on the one or more displays, determine a base game outcome and corresponding display symbols for the base game, the display symbols selected from a first symbol set, cause, during the base game, the one or more displays to present the corresponding display symbols in a display matrix having a plurality of display positions, cause, during the base game, the one or more displays to present a plurality of progressive play meters, wherein each progressive play meter is representative of a number of plays available in a feature game and each progressive play meter corresponds to a feature level of a plurality of feature levels, adjust at least a first of the plurality of progressive play meters based, at least in part, in response to at least one spin award symbol being selected in the base game outcome, the at least one spin award symbol corresponding to at least the first of the plurality of progressive play meters and at least a first feature of the plurality of feature levels, cause, in response to a first triggering condition being met in the base game outcome, the one or more displays to present the feature game comprising a bonus matrix having a plurality of display positions and, in association with such presentation of the feature game, initially configure the feature game to provide the number of plays indicated by the first progressive play meter of the plurality of progressive play meters, cause, during one or more plays of the feature game, configurable symbols associated with any previous feature game outcome to be held in the display positions of the bonus matrix and select and display symbols in other display positions of the bonus matrix, and cause the one or more displays to present information regarding one or more feature game awards, wherein one feature game award is based, at least in part, on the configurable symbols displayed in the feature game.

2. The electronic gaming system of claim 1, wherein:

the plurality of progressive play meters includes a plurality of sets of progressive play meters, each set of progressive play meters corresponds with one wager amount of a plurality of wager amounts available in the base game, the computer-executable instructions for controlling the one or more processors to cause, during the base game, the one or more displays to present the plurality of progressive play meters further include:

causing, during play of the base game in association with a first wager amount, the one or more displays to present the one or more progressive play meters associated with the set of progressive play meters corresponding to the one wager amount, and the computer-executable instructions for controlling the one or more processors to adjust one or more progressive play meters during the base game further include:

adjusting the one or more displayed progressive play meters that are associated with the one wager amount.

3. The electronic gaming system of claim 1, wherein:

the one or more memory devices further store computer-executable instructions for controlling the one or more processors to:

determine that a spin award symbol corresponding to one of the progressive play meters is presented by the one or more displays during one of the triggering conditions, and the computer-executable instructions for controlling the one or more processors to cause the one or more displays to present the feature game further include:

configuring the feature game to provide the number of plays indicated by the corresponding progressive play meter.

4. The electronic gaming system of claim 1, wherein:

the one or more memory devices further store computer-executable instructions for controlling the one or more processors to, during the one or more plays of the feature game, when all of the display positions of the bonus matrix present a configurable symbol, select and display symbols at all display positions of the bonus matrix for a subsequent play of the feature game.

5. The electronic gaming system of claim 1, wherein:

the one or more memory devices further store computer-executable instructions for controlling the one or more processors to cause, during the base game, the one or more displays to present a plurality of multipliers, wherein each progressive play meter corresponds to one of the multipliers, and the one or more feature game awards is further based, at least in part, on the multiplier that corresponds to one of the feature levels when all of the display positions of the bonus matrix present a configurable symbol during the feature game.

6. The electronic gaming system of claim 1, wherein the triggering conditions are selected from the group consisting of: the display of a number of configurable symbols during the base game and a random selection.

7. The electronic gaming system of claim 1, wherein the adjustment of one or more progressive play meters during the base game includes increasing or decreasing at least one of the one or more progressive play meters.

8. A method of providing a wagering game on an electronic gaming system, the method comprising:

causing a base game to be presented on one or more displays;

determining a base game outcome and corresponding display symbols for the base game, the display symbols selected from a first symbol set;

causing, during the base game, the one or more displays to present the corresponding display symbols in a display matrix having a plurality of display positions;

causing, during the base game, the one or more displays to present a plurality of progressive play meters, wherein each progressive play meter is representative of a number of plays available in a feature game and each progressive play meter corresponds to a feature level of a plurality of feature levels;

adjusting at least a first of the plurality of progressive play meters based, at least in part, in response to at least one spin award symbol being selected in the base game outcome, the at least one spin award symbol corresponding to at least the first of the plurality of progressive play meters and at least a first feature of the plurality of feature levels;

causing, in response to a first triggering condition being met in the bas game outcome, the one or more displays to present the feature game comprising a bonus matrix having a plurality of display positions and, in association with such presentation of the feature game, initially configure the feature game to provide the number of plays indicated by the first progressive play meter of the plurality of progressive play meters;

causing, during one or more plays of the feature game, configurable symbols associated with any previous feature game outcome to be held in the display positions of the bonus matrix and select and display symbols in other display positions of the bonus matrix;

cause, for at least one subsequent play of the feature game, the one or more displays to present display symbols in each of the display positions without a held configurable symbol in the bonus matrix; and causing the one or more displays to present information regarding one or more feature game awards, wherein one feature game award is based, at least in part, on the configurable symbols displayed in the feature game.

9. The method of claim 8, wherein:

the plurality of progressive play meters includes a plurality of sets of progressive play meters, each set of progressive play meters corresponds with one wager amount of a plurality of wager amounts available in the base game, the causing, during the base game, the one or more displays to present the plurality of progressive play meters further includes:

causing, during play of the base game in association with a first wager amount, the one or more displays to present the one or more progressive play meters associated with the set of progressive play meters corresponding to the one wager amount, and the adjusting the one or more progressive play meters during the base game further includes:

adjusting the one or more displayed progressive play meters that are associated with the one wager amount.

10. The method of claim 8, further comprising determining that a spin award symbol corresponding to one of the progressive play meters is presented by the one or more displays during one of the triggering conditions, wherein the causing the one or more displays to present the feature game further includes configuring the feature game to provide the number of plays indicated by the corresponding progressive play meter.

11. The method of claim 8, further comprising:

during the one or more plays of the feature game, when all of the display positions of the bonus matrix present a configurable symbol, selecting and displaying symbols at all display positions of the bonus matrix for a subsequent play of the feature game.

12. The method of claim 8, further comprising causing, during the base game, the one or more displays to present a plurality of multipliers, wherein each progressive play meter corresponds to one of the multipliers, wherein:

the one or more feature game awards is further based, at least in part, on the multiplier that corresponds to one of the feature levels when all of the display positions of the bonus matrix present a configurable symbol during the feature game.

13. The method of claim 8, wherein the triggering conditions are selected from the group consisting of: the display of a number of configurable symbols during the base game and a random selection.

14. The method of claim 8, wherein the adjustment of one or more progressive play meters during the base game includes increasing or decreasing at least one of the one or more progressive play meters.

15. A non-transitory, computer-readable storage device storing computer-executable instructions for controlling one or more processors to provide a wagering game on an electronic gaming system and to:

cause a base game to be presented on one or more displays of the electronic gaming system, determine a base game outcome and corresponding display symbols for the base game, the display symbols selected from a first symbol set, cause, during the base game, the one or more displays to present the corresponding display symbols in a display matrix having a plurality of display positions, cause, during the base game, the one or more displays to present a plurality of progressive play meters, wherein each progressive play meter is representative of a number of plays available in a feature game and each progressive play meter corresponds to a feature level of a plurality of feature levels, adjust at least a first of the plurality of progressive play meters based, at least in part, in response to at least one spin award symbol being selected in the base game outcome, the at least one spin award symbol corresponding to at least the first of the plurality of progressive play meters and at least a first feature of the plurality of feature levels, cause, in response to a first triggering condition being met in the base game outcome, the one or more displays to present the feature game comprising a bonus matrix having a plurality of display positions and, in association with such presentation of the feature game, initially configure the feature game to provide the number of plays indicated by the first progressive play meter of the plurality of progressive play meters, cause, during one or more plays of the feature game, configurable symbols associated with any previous feature game outcome to be held in the display positions of the bonus matrix and select and display symbols in other display positions of the bonus matrix, and cause the one or more displays to present information regarding one or more feature game awards, wherein one feature game award is based, at least in part, on the configurable symbols displayed in the feature game.

16. The non-transitory, computer-readable storage device of claim 15, wherein:

the plurality of progressive play meters includes a plurality of sets of progressive play meters, each set of progressive play meters corresponds with one wager amount of a plurality of wager amounts available in the base game, the computer-executable instructions for controlling the one or more processors to cause, during the base game, the one or more displays to present the plurality of progressive play meters further include:

causing, during play of the base game in association with a first wager amount, the one or more displays to present the one or more progressive play meters associated with the set of progressive play meters corresponding to the one wager amount, and the computer-executable instructions for controlling the one or more processors to adjust one or more progressive play meters during the base game further include:

adjusting the one or more displayed progressive play meters that are associated with the one wager amount.

17. The non-transitory, computer-readable storage device of claim 15, wherein:

the computer-executable instructions further include controlling the one or more processors to:

determine that a spin award symbol corresponding to one of the progressive play meters is presented by the one or more displays during one of the triggering conditions, and the computer-executable instructions for controlling the one or more processors to cause the one or more displays to present the feature game further include:

configuring the feature game to provide the number of plays indicated by the corresponding progressive play meter.

18. The non-transitory, computer-readable storage device of claim 15, wherein:

the computer-executable instructions further include controlling the one or more processors to, during the one or more plays of the feature game, when all of the display positions of the bonus matrix present a configurable symbol, select and display symbols at all display positions of the bonus matrix for a subsequent play of the feature game.

19. The non-transitory, computer-readable storage device of claim 15, wherein:

the computer-executable instructions further include controlling the one or more processors to cause, during the base game, the one or more displays to present a plurality of multipliers, wherein each progressive play meter corresponds to one of the multipliers, and the one or more feature game awards is further based, at least in part, on the multiplier that corresponds to one of the feature levels when all of the display positions of the bonus matrix present a configurable symbol during the feature game.

20. The non-transitory, computer-readable storage device of claim 15, wherein the triggering conditions are selected from the group consisting of: the display of a number of configurable symbols during the base game and a random selection.

* * * * *